(12) United States Patent
Fitzgerald et al.

(10) Patent No.: US 7,422,910 B2
(45) Date of Patent: Sep. 9, 2008

(54) MANIFOLD DESIGNS, AND FLOW CONTROL IN MULTICHANNEL MICROCHANNEL DEVICES

(75) Inventors: Sean P. Fitzgerald, Columbus, OH (US); Anna Lee Tonkovich, Marysville, OH (US); Ravi Arora, Dublin, OH (US); Dongming Qiu, Dublin, OH (US); Thomas D. Yuschak, Dublin, OH (US); Laura J. Silva, Dublin, OH (US); Wm. Allen Rogers, Marysville, OH (US); Kai Jarosch, Bexley, OH (US); Matthew B. Schmidt, Columbus, OH (US)

(73) Assignee: Velocys, Plain City, OH (US)

( * ) Notice: Subject to any disclaimer, the term of this patent is extended or adjusted under 35 U.S.C. 154(b) by 845 days.

(21) Appl. No.: 10/695,400

(22) Filed: Oct. 27, 2003

(65) Prior Publication Data

US 2005/0087767 A1   Apr. 28, 2005

(51) Int. Cl.
*G01N 1/10* (2006.01)
(52) U.S. Cl. .................... 436/180; 422/99; 422/100; 422/101
(58) Field of Classification Search ............... 436/180; 165/80.4; 422/99–101
See application file for complete search history.

(56) References Cited

U.S. PATENT DOCUMENTS

| | | | |
|---|---|---|---|
| 3,847,211 A | 11/1974 | Fischel et al. |
| 4,041,591 A | 8/1977 | Noll et al. |
| 4,282,927 A | 8/1981 | Simmons |
| 4,343,354 A | 8/1982 | Weber |
| 4,401,155 A | 8/1983 | Royal et al. |
| 5,000,253 A | 3/1991 | Komarnicki |
| 5,482,680 A | 1/1996 | Wilkinson et al. |
| 5,544,700 A | 8/1996 | Shagoury |
| 5,915,469 A | 6/1999 | Abramzon et al. |
| 6,098,706 A | 8/2000 | Urch |
| 6,101,715 A * | 8/2000 | Fuesser et al. ............ 29/890.03 |
| 6,244,333 B1 | 6/2001 | Bergh et al. |
| 6,293,338 B1 | 9/2001 | Chapman et al. |
| 6,508,862 B1 | 1/2003 | Tonkovich et al. |
| 6,537,506 B1 | 3/2003 | Schwalbe et al. |
| 6,637,463 B1 | 10/2003 | Lei et al. |
| 7,190,580 B2 | 3/2007 | Bezama et al. |

(Continued)

FOREIGN PATENT DOCUMENTS

DE   2428964 A1   1/1976

(Continued)

OTHER PUBLICATIONS

Pan et al., "Optimal Design of Complex Manifold Geometries for Uniform Flow Distribution Between Microchannels," Chem. Eng. J. pp. 1-26 (2007).

(Continued)

*Primary Examiner*—Jill Warden
*Assistant Examiner*—Jyoti Nagpaul
(74) *Attorney, Agent, or Firm*—Frank Rosenberg

(57) ABSTRACT

Novel manifolds and methods of flow through manifolds are described. Apparatus and techniques are described in which flow from a relatively large volume header is equally distributed to process channels. Methods of making laminated, microchannel devices are also described.

16 Claims, 61 Drawing Sheets

U.S. PATENT DOCUMENTS

| | | | |
|---|---|---|---|
| 2002/0031471 | A1 | 3/2002 | Tonkovich et al. |
| 2002/0106311 | A1 | 8/2002 | Golbig et al. |
| 2002/0125001 | A1 | 9/2002 | Kelly et al. |
| 2002/0187090 | A1 | 12/2002 | Vanden Bussche et al. |
| 2003/0027354 | A1 | 2/2003 | Geli |
| 2003/0043544 | A1 | 3/2003 | Nelson et al. |
| 2003/0062149 | A1 | 4/2003 | Goodson et al. |
| 2003/0118486 | A1 | 6/2003 | Zhou et al. |
| 2003/0173650 | A1 | 9/2003 | Larsson et al. |
| 2004/0033455 | A1 | 2/2004 | Tonkovich et al. |
| 2004/0076562 | A1 | 4/2004 | Mazanec et al. |
| 2004/0104010 | A1 | 6/2004 | Kenny et al. |
| 2004/0234566 | A1 | 11/2004 | Qiu et al. |
| 2005/0087767 | A1 | 4/2005 | Fitzgerald et al. |
| 2005/0133457 | A1 | 6/2005 | Tonkovich et al. |
| 2006/0275185 | A1 | 12/2006 | Fitzgerald et al. |

FOREIGN PATENT DOCUMENTS

| | | |
|---|---|---|
| DE | 19935433 A1 | 1/1999 |
| DE | 10148926 A1 | 4/2003 |
| EP | 1038575 | 9/2000 |
| WO | WO 02/072252 | 9/2002 |
| WO | WO 03/043730 | 5/2003 |
| WO | WO 03/080233 | 10/2003 |
| WO | WO 03/097229 | 11/2003 |
| WO | WO 2004/042303 | 5/2004 |

OTHER PUBLICATIONS

PCT Search Report from PCT/US2006/012849 mailed Aug. 22, 2006 including Written Opinion of the International Searching Authority.

Amador et al., "Flow Distribution in different microreactor scale-out geometries and the effect of manufacturing tolerances and channel blockage," Chem. Eng. Journal, 101, pp. 379-390, 2004.

PCT International Preliminary Report on Patentability from PCT/US2004/035601.

PCT Search Report form PCT/US2004/035601 mailed Apr. 12, 2005 including Written Opinion of the International Searching Authority.

Zhao et al., "Microchannel Heat Exchangers with Carbon Dioxide," pp. 1-103 (2001).

Mas et al., "Scalable Microfabricated Multiphase reactors for Direct Fluorination Reactions," Transducers '03, 655-658 (2003).

Commenge et al., "Optimal Decisgn for Flow Uniformity in Microchannel Reactors," AIChE Journal, 345-358 (Feb. 2002).

Rebrov et al., "Header Design for Flow Equalization in Microstructured Reactors," AIChE Journal, 28-38 (2007).

Griffini et al., "Effect of Microchannel Plate Design on Fluid Flow Uniformity at Low Flow Rates," Chem. Eng. Technol. 395-406 (2007).

Bergles et al., "On the Nature of Critical Heat Flux in microchannels," J. Heat Transfer, 101-107 (Jan. 2005).

Balaji et al., "Improved Design of Microchannel Plate Geometry for uniform Flow Distribution," Can. J. Of Chem. Eng., 715-721 (Dec. 2006).

Delsman et al., "Microchannel Plate Geometry Optimization for Even Flow Distribution at High Flow Rates," Trans. IChemE Part A, 267-275 (Feb. 2004).

Jousse et al., "Compact model for multiphase liquid-liquid flows in microfuidic devices," Lab on a Chip, 646-656 (2005).

* cited by examiner

MANIFOLD DESIGNS, AND FLOW CONTROL IN MULTICHANNEL MICROCHANNEL DEVICES

In recent years there has been intense industrial and academic interest toward developing microscale devices for chemical processing. A recent review of microscale reactors, containing 236 citations, has been provided by Gavrilidis et al., "Technology And Applications Of Microengineered Reactors," Trans. IChemE, Vol. 80, Part A, pp. 3-30 (January 2002). Microscale chemical processors, which are characterized by fluid channel dimensions of about 5 mm or less, can provide unique advantages due to short heat and mass transfer distances, and, in some instances, different flow characteristics. Although these devices may offer many advantages, new designs and differing flow characteristics within these devices create challenges for creating new methods and designs for controlling flow, particularly flow through a manifold and several connecting channels. In particular, the small channel dimensions that give rise to improved heat and mass transport can often be in the laminar flow regime, which in turn carries a lower flow resistance than transition and turbulent flow regimes. A laminar regime can exist even for very high flow rates due to the small dimensions of the channels. Thus, a large microchannel processing device could have relatively small pressure drops at high overall flow rate, adding to the flow distribution challenge due to low flow resistance. Further, microscale devices are connected to macro pipes to bring in and remove fluids. Flow in the macro-pipes is often in the turburlent or transition regime, thus requiring flow manifolding solutions within the microdevice that distribute flow to many parallel microchannels under varying flow regimes.

The recent patent literature describes multiple types of microscale devices and/or methods of manufacture. For example, Wegeng et al., in WO 01/95237 A2, described novel types of integrated reactors that are made by laminated sheets of numerous different designs. Pence et al., in US 2002/0080563 A1, described devices with a network of branching microchannels for heat transport.

Golbig et al., in U.S. patent application Publication 2002/0106311 described plate microreactor designs in which the widths of connecting channels are varied in order to provide equalized residence time of fluids in the channels. Calculations based on this design, as described in the Examples section, show that this design is inadequate for obtaining highly equal flow from a header through all connecting channels.

Channel designs for controlling flow in compact heat exchangers and other compact devices, have been described in U.S. patents and patent applications Ser. Nos. U.S. Pat. Nos. 3,847,211, 5,482,680, 4,401,155, 2002/0043544, U.S. Pat. Nos. 4,343,354, 6,293,338, 4,041,591, 5,915,469, 6,098, 706, 4,282,927, 2003/0027354, 2002/0125001, 2002/0187090, U.S. Pat. Nos. 6,244,333, and 5,544,700.

Despite these and other efforts, there is still a need for methods of controlling flow and apparatus in which flow is controlled to obtain improved performance and efficiency.

SUMMARY OF THE INVENTION

In one aspect, the invention provides a method of separating phases, comprising: passing a mixture into a curve in a microchannel; wherein, after the curve, there is a separator plate in the microchannel; and wherein the micture separates into a denser phase and a less dense phase with the different phases on opposite sides of the separator plate. In preferred embodiments, flow is down substantially parallel to gravity into the curve. The invention also provides this apparatus.

In another aspect, the invention provides a fluid processor, comprising: a manifold comprising an inlet; a connecting channel matrix; and a gate disposed between the manifold and the connecting channel matrix. The length of the manifold and the length of the connecting channel matrix are disposed at a nonzero angle relative to each other. The connecting channel matrix served by the gate has a central axis; and the gate is offset so that the gate's opening is not bisected by the central axis of the connecting channel matrix. One example of this aspect is illustrated in FIG. 24. In some preferred embodiments, the length of the manifold is substantially perpendicular to the length of the connecting channels. Preferably, in this aspect the offset is at least 10% (in some preferred embodiments at least 25%) of the width of the connecting channel matrix.

As with all the apparatus described herein, the invention also provides methods of processing a fluid comprising passage of at least one fluid through the apparatus. As shown in the drawings, the manifold and connecting channel matrix can be coplanar; indeed substantially coplanar arrangements are common throughout many aspects of the present invention and it should be understood that a coplanar arrangement is preferred in many aspects of the invention. It should also be understood that the invention is intended to include combinations of the various aspects and features described herein. For example, in some preferred embodiments, the gates offsets described in the foregoing aspect are combined with the variance in the extension of connecting channel walls described in the aspect below. It should be further understood that the invention is intended to include multiple combinations of the described individual features and should not be limited to only the illustrated combinations or the combinations that are described herein.

In another aspect, also illustrated in FIG. 24, the invention provides a fluid processor, comprising: a manifold comprising an inlet; and a connecting channel matrix. The length of the manifold and the length of the connecting channel matrix are disposed at a nonzero angle relative to each other. The connecting channel matrix comprises multiple channel walls and channel walls further from the inlet extend further toward the manifold. In some preferred embodiments: the length of the manifold is substantially perpendicular to the length of the connecting channels; and/or, the offset is at least 10% (in some preferred embodiments at least 25%) of the width of the connecting channel matrix.

In another aspect, the invention provides a method of passing a fluid through a manifold of a microchannel device, comprising: flowing a first fluid stream through a first channel in a first direction; flowing a portion of the first fluid stream through an aperture to a second channel; and flowing a portion of the first fluid stream through the second channel; wherein the second channel extends at a nonzero angle relative to the first direction; wherein flow through the aperture has a positive momentum vector in the first direction; wherein the second channel comprises a microchannel and comprises at least one dividing wall that separates the second channel into at least a first and a second subchannel; wherein the second channel has an axis that is substantially parallel to net flow through the second channel; and wherein the aperture has a centerpoint that lies upstream of the axis relative to the first direction. Preferably, in this method, flow in the first and second subchannels is more equal than if the axis passed through the centerpoint. A preferred structure in which this method can be conducted is illustrated in FIG. 24.

In another aspect, the invention provides a method of passing a fluid through a manifold of a microchannel device, comprising: flowing a first fluid stream through a first channel in a first direction; flowing a portion of the first fluid stream through an aperture to a second channel; and flowing a portion of the first fluid stream through the second channel. The second channel comprises a microchannel and comprises at least one dividing wall that separates the second channel into at least a first and a second subchannel. The first and second subchannels comprise flow resistors that tend to equalize flow through the subchannels. A structure suitable for conducting this method is illustrated in FIG. 25b. As with all methods described herein, the invention also includes the apparatus in which the method is conducted. In some preferred embodiments, the second channel extends at a nonzero angle relative to the first direction. In other embodiments, the method can be conducted in a laminated device with frames or strips; and/or flow resistors (such as a foam); and/or where there is no straight through flow path; and/or where there is a discontinuity in the dividing wall downstream along the length of the dividing wall. It should be understood that, as with other inventive aspects, in some preferred embodiments, the manifold and connecting channels are substantially coplanar.

In another aspect, the invention provides microchannel apparatus, comprising at least two microchannels separated by a wall; and a flexible material projecting from the wall into at least into at least one of the microchannels. See FIG. 33. "Flexible" means that the material flexes when fluid flows through the microchannel. In one embodiment, the material extends through the wall into a second microchannel.

In another aspect, the invention provides microchannel apparatus, comprising: a first channel extending in a first direction; and a second channel extending in a second direction. In this apparatus, the first direction and second direction are substantially coplanar and extend at a nonzero angle relative to each other; the second channel comprises a microchannel; and the second channel comprises a first open portion and a second portion that comprises at least one dividing wall that separates the second channel into at least a first and a second subchannel. The first open portion provides for a length for flow to distribute more equally across the stream prior to entering the second portion. "Open" means no subchannels. An example is illustrated in FIG. 25a. The invention also includes methods of processing a fluid in this apparatus, preferably in which mixing occurs in the first portion. In a preferred embodiment, $L_2/D$ is greater than 10, where D is hydraulic diameter. In preferred embodiments, the subchannels are connecting channels in which a unit operation occurs.

In another aspect, the invention provides microchannel apparatus, comprising: a first channel comprising a first open portion and a second portion; the second portion comprising at least one dividing wall that separates the second portion into at least a first and a second subchannel; the first channel extending in a first direction; a second channel connected to first subchannel; wherein the second channel is substantially coplanar with the first channel and extends in a second direction; wherein the second direction is at a nonzero angle relative to the first direction; wherein the second channel comprises a microchannel and comprises at least one dividing wall that separates the second channel into at least a third and a fourth subchannel; a third channel connected to second subchannel; wherein the third channel is substantially coplanar with the first channel and extends in a third direction; wherein the third direction is substantially parallel to the second direction; wherein the third channel comprises a microchannel and comprises at least one dividing wall that separates the third channel into at least a fifth and a sixth subchannel. An example is illustrated in FIG. 3E. For purposes of this aspect, subchannels are formed by dividing a channel such as with a fin, but subchannels are not channels, such as formed by a T-joint, that are substantially separated in space.

In another aspect, the invention provides microchannel apparatus including a submanifold, comprising: a first channel comprising at least one dividing wall that separates the first channel into at least a first and a second subchannel; the first channel extending in a first direction; a second channel connected to the first subchannel; wherein the second channel is substantially coplanar with the first channel and extends in a second direction; wherein the second direction is at a nonzero angle relative to the first direction; wherein the second channel comprises a microchannel and comprises at least one dividing wall that separates the second channel into at least a third and a fourth subchannel; a third channel connected to the second subchannel; wherein the third channel is substantially coplanar with the first channel and extends in a third direction; wherein the third direction is parallel to the second direction; wherein the third channel comprises a microchannel and comprises at least one dividing wall that separates the third channel into at least a fifth and a sixth subchannel; wherein the first subchannel has a first length and a first width and the second subchannel has a second length and a second width; and wherein the second length is longer than the first length. In one preferred embodiment, the first channel comprises a first portion with no channel wall and a second portion that comprises the at least one dividing wall that separates the first channel into at least a first and a second subchannel; and the second width is wider than the first width. Some preferred embodiment comprise gates. In another embodiment, a fourth channel ia connected to the second subchannel; wherein the fourth channel is substantially coplanar with the first channel and extends in a fourth direction; wherein the fourth direction is at a nonzero angle relative to the first direction; wherein the fourth channel comprises a microchannel and comprises at least one dividing wall that separates the second channel into at least a seventh and an eighth subchannel; wherein the fourth direction is parallel to the second direction; and wherein the fourth channel has a fourth length that is longer than the second length.

In another aspect, the invention provides microchannel apparatus including a gated structure, comprising: a first channel extending in a first direction; a second channel extending in a second direction; and a third channel extending in the second direction; a fourth channel extending in the second direction; and a fifth channel extending in the second direction. The first and second directions are substantially coplanar. The second and third channels are adjacent and parallel. The first channel is not parallel to either the second or third channels. The first channel is connected to the second channel and the third channels via a first gate. The third channel is positioned farther in the first direction than the second channel. The third channel comprises a microchannel. The second channel comprises a microchannel. The second channel has an opening with a first cross-sectional area and the third channel has an opening with a second cross-sectional area. The first gate has a cross-sectional area that is smaller than the sum of first and second cross-sectional areas and the wall cross-sectional area between them. The fourth and fifth channels are adjacent and parallel. The first channel is connected to the fourth channel and the fifth channels via a second gate. The fourth and fifth channels are positioned farther in the first direction than the third channel. The fourth channel comprises a microchannel; wherein the fifth channel comprises a microchannel. The fourth channel has an opening with a third cross-sectional area and the fifth channel has an opening with a fourth cross-sectional area. The second gate has a cross-sectional area that is smaller than the sum of third and fourth cross-sectional areas and the wall cross-sectional area between them; and the cross-sectional area of the first gate differs from that of the cross-sectional area of the second gate. In a preferred embodiment, the first gate has a cross-sectional area between 2-98% of the combined cross-sectional areas of the connecting microchannels served by the first gate. In another embodiment, the apparatus is a laminate and the first gate comprises a sheet with a cross-bar.

In another aspect, the invention provides microchannel apparatus, comprising: a first channel extending in a first direction; a second channel extending in a second direction; and a third channel extending in a third direction. The first, second, and third directions are substantially coplanar. The second and third directions are parallel. The second channel connects to the first channel and the first and second directions extend at a nonzero angle relative to each other. The third channel connects to the first channel and the first and third directions extend at a nonzero angle relative to each other. The third channel is positioned farther in the first direction than the second channel. The third channel comprises a microchannel. The second channel has an opening with a first cross-sectional area and the third channel has an opening with a second cross-sectional area. The first cross-sectional area is of a different cross-sectional area than the second width; and the at least one of the openings is smaller in cross-sectional area then the connecting channel it connects to the manifold. This aspect is an example of a "grate" structure. In a preferred embodiment, the second and third channels have openings that are adjacent to an opening of the first channel. In another embodiment, the second and third channels are adjacent channels separated by a channel wall. In another embodiment, a second grate is disposed in the second and third channels. In preferred embodiments, the open area through a grate is smaller than the open areas of the channels which the grates open into; however, in some cases this area could be larger—for example, by etching the walls.

It should be understood that any of the apparatus, systems or methods can be characterized by the equations or quality factors discussed later in the text.

In another aspect, the invention provides a laminated device, comprising: a first layer comprising microchannels that end in a first crossbar; and a second layer comprising microchannels that end in a second crossbar; wherein the first crossbar defines at least a portion of one edge of an M2M manifold; wherein the second crossbar projects into the M2M manifold; and wherein an interface between the microchannels in the second layer and the manifold is formed by an open gap between the first and second crossbars. An example is shown in FIG. 3D. Preferably, the first layer is adjacent to the second layer. Also, in a preferred embodiment, the device includes microchannels in first and second layers that are aligned. In another embodiment, the laminated device further comprises: a second set of microchannels in the first layer that end in a third crossbar; and a second set of microchannels in the second layer that end in a fourth crossbar; wherein the third crossbar defines at least a portion of one edge of the M2M manifold; wherein the fourth crossbar projects into the M2M manifold; wherein a second interface between the microchannels in the fourth layer and the manifold is formed by an open gap between the third and fourth crossbars; and wherein the open gap between the third and fourth crossbars is smaller than the open gap between the first and second crossbars. The differing gap size allows systems to be designed to control flow though the microchannels (i.e., func-tion like a gate); for example to make flow more equal than if the gaps were equal. Systems including a macromanifold connected to at least two of the laminated devices and methods of conducting a unit operation comprising passing a fluid into the manifold and through the microchannels, are, of course, included.

In another aspect, the invention provides a method of distributing flow from a manifold through a connecting channel matrix, comprising:

passing a fluid through a manifold inlet and into a manifold having the following characteristics:

the height of the manifold ($h_{m2m}$) is 2 mm or less;

the length of the manifold ($L_{m2m}$) is 7.5 cm or greater;

the length of an optional straightening channel portion ($L_2$) divided by $L_{m2m}$ is less than 6;

passing the fluid into the manifold with a momentum (Mo) of at least 0.05;

maintaining the $DPR_2$ ratio at 2 or greater or maintaining a $DPR_3$ ratio of 0.9 or less;

and distributing the fluid from the manifold into at least 2 channels which are connected to the manifold, with a quality index factor as a function of connecting channel areas of equal to or less than Q(Ra), where:

$$Q(Ra)=0.0008135Ra^6-0.03114Ra^5+0.4519Ra^4-3.12Ra^3+11.22Ra^2-23.9Ra+39.09.$$

Preferably, $R_a$ is equal to or less than 12, or less than 3. In some embodiments, the fluid flow rate through the manifold is maintained such that the quantity $\{|0.058+0.0023(\ln Re)^2 (D)|/L_{M2M}\}$ is less than 0.01. In some embodiments, FA is less than 0.01

In another aspect, the invention provides a method of distributing flow from a manifold through a connecting channel matrix, comprising:

passing a fluid into a manifold having the following characteristics:

the height of the manifold is 2 mm or less;

the length of an optional straightening channel portion ($L_2$) divided by $L_{M2M}$ is less than 6;

with a FA value of less than 0.01

$$FA = \frac{[0.058+0.0023(\ln Re)^2]^2 D}{L_{M2M}} < 0.01$$

maintaining the $DPR_2$ ratio at 2 or greater or maintaining a $DPR_3$ ratio of 0.9 or less;

and distributing the fluid from the manifold into at least 2 channels, which are connected to the manifold, with a quality index factor as a function of connecting channel areas of $Q_2$ equal to or less than 85% of the $Q_c$ function of connecting channel area ratio Ra and $DPR_1$ of $$Q_c(Ra, DPR_1)=E1+E2+E4+E6+E8+E10+E12,$$

where $$E1 = \frac{112.9+1.261 DPR_1}{1+0.3078 DPR_1+0.003535 DPR_1^2}$$

-continued $$E2 = \frac{\left[\frac{(Ra-2)(Ra-4)(Ra-6)(Ra-8)(Ra-10)(Ra-12)}{(1-2)(1-4)(1-6)(1-8)(1-10)(1-12)}\right]}{\frac{91.73 - 1.571DPR_1 + 0.01701DPR_1^2}{1 + 0.2038DPR_1 + 0.00193DPR_1^2}}$$

$$E4 = \frac{\left[\frac{(Ra-1)(Ra-4)(Ra-6)(Ra-8)(Ra-10)(Ra-12)}{(2-1)(2-4)(2-6)(2-8)(2-10)(2-12)}\right]}{\frac{24.27 - 4.943DPR_1 + 0.3982DPR_1^2}{1 - 0.2395DPR_1 + 0.03442DPR_1^2 - 0.000006657DPR_1^3}}$$

$$E6 = \frac{\left[\frac{(Ra-1)(Ra-2)(Ra-6)(Ra-8)(Ra-10)(Ra-12)}{(4-1)(4-2)(4-6)(4-8)(4-10)(4-12)}\right]}{\frac{29.23 - 2.731DPR_1 + 0.09734DPR_1^2}{1 - 0.1124DPR_1 + 0.005045DPR_1^2}}$$

$$E8 = \frac{\left[\frac{(Ra-1)(Ra-2)(Ra-4)(Ra-8)(Ra-10)(Ra-12)}{(6-1)(6-2)(6-4)(6-8)(6-10)(6-12)}\right]}{\frac{25.98 + 11.26DPR_1 + 0.02201DPR_1^2 + 0.5231DPR_1^3}{1 - 0.8557DPR_1 + 0.00887DPR_1^2 + 0.02049DPR_1^3 - 0.000002866DPR_1^4}} \times$$

$$E10 = \frac{\left[\frac{(Ra-1)(Ra-2)(Ra-4)(Ra-6)(Ra-10)(Ra-12)}{(8-1)(8-2)(8-4)(8-6)(8-10)(8-2)}\right]}{\frac{20.75 - 3.371DPR_1 + 0.9026DPR_1^2 + 0.01277DPR_1^3}{1 - 0.1514DPR_1 + 0.03173DPR_1^2 + 0.0003673DPR_1^3}}$$

$$E12 = \frac{\left[\frac{(Ra-1)(Ra-2)(Ra-4)(Ra-6)(Ra-8)(Ra-12)}{(10-1)(10-2)(10-4)(10-6)(10-8)(10-12)}\right]}{\frac{51.67 + 18.94DPR_1 + 21.57DPR_1^2 + 21.57DPR_1^3}{1 + 1.183DPR_1 + 0.5513DPR_1^2 - 0.00004359DPR_1^3}}$$

$$\left[\frac{(Ra-1)(Ra-2)(Ra-4)(Ra-6)(Ra-8)(Ra-10)}{(12-1)(12-2)(12-4)(12-6)(12-8)(12-10)}\right]$$

and where Ra ranges from 1 to 12, and $DPR_1$ is greater than 0 and less than 300. Preferably, $Q_2 \leq 18\%$ if $DPR_1<1$; $Q_2 \leq 16.5\%$ if $1 \leq DPR_1<3$; $Q_2 \leq 15\%$ if $3 \leq DPR_1<5$; $Q_2 \leq 10\%$ if $5 \leq DPR_1<10$; $Q_2 \leq 7\%$ if $10 \leq DPR_1<15$; $Q_2 \leq 6\%$ if $15 \leq DPR_1<20$; $Q_2 \leq 4\%$ if $20 \leq DPR_1<30$; $Q_2 \leq 3\%$ if $30 \leq DPR_1<50$; $Q_2 \leq 2\%$ if $50 \leq DPR_1<100$; and $Q_2 1\%$ if $100 \leq DPR_1<200$. In preferred embodiments the fluid is passed into the manifold with a momentum (Mo) of at least 0.05.

In another aspect, the invention provides a louvered fluid processing device, comprising: an inlet to a chamber; a louver disposed within a chamber; and an outlet from the chamber. A louver is a movable flow director. An example is illustrated in FIG. 34B. Preferably, there are at least two louvers in the chamber that are connected to rotate simultaneously. Other options include: at least 3 coplanar inlets; further comprising a second chamber that is stacked adjacent to the chamber, wherein the first chamber comprises a heat exchanger. In one preferred method involving the two chamber process, flows are substantially perpendicular to flow through the heat exchanger biased to front of second (reaction) chamber. In some embodiments, the chamber has height of 5 micrometers or less.

In another aspect, the invention provides fluid processing apparatus comprising: a manifold; a connecting channel matrix; and a movable orifice plate disposed between the manifold and the matrix, wherein the movable orifice plate has orifices of varying sizes that are aligned with channels in the connecting channel matrix. An example is illustrated in FIG. 39. In a preferred embodiment, the movable orifice plate is held in place by screws. In some embodiments the movable plate has orifices that increase monotonically in size along the length of the plate. As in many of the other aspects, in some preferred embodiments, channels in the connecting channel matrix have the same cross-sectional area. The invention also provides a method of modifying a fluid processing apparatus comprising moving the position of a movable orifice plate in the above-described apparatus.

In another aspect, the invention provides a method of distributing flow from a manifold through a connecting channel matrix, comprising: passing a fluid through a manifold and into a connecting channel matrix, wherein the connecting channel matrix comprises repeating units of microchannels of differing cross-sectional areas, and wherein the manifold has an inlet disposed on one side of the connecting channel matrix so that fluid flow through the manifold is at a nonzero angle to flow in the connecting channel matrix; wherein the connecting channels in two or more repeating units do not change in cross-sectional area in the direction of length through the manifold; and wherein a fluid flows into the manifold with a momentum (Mo) of at least 0.05; and is distributed through the connecting channel matrix with a $Q_2$ of less than 30%, preferably $Q_2$ is less than 25%, and more preferably less than 10%. "Repeating units" are a coplanar set of adjacent channels of differing cross-sectional areas that repeat. For example, a first channel having a cross-sectional area of 1 um$^2$ adjacent to a second channel having a cross-sectional area of 2 um$^2$ which is, in turn, adjacent to a third channel having a cross-sectional area of 3 um$^2$; This sequence repeated three times: 1:2:3/1:2:3/1:2:3 would be three repeating units. In some embodiments, the manifold is substantially perpendicular to the connecting channels.

In method another aspect, the invention provides a method of distributing flow from a manifold through a connecting channel matrix, comprising: passing a fluid through a manifold inlet and into a manifold such that the fluid passes through a first portion of a manifold in a first flow regime and passes through a second portion of a manifold in a second flow regime; wherein the manifold has a height of the manifold ($h_{m2m}$) of 2 mm or less and a length of an optional straightening channel portion ($L_2$) divided by $L_{m2m}$ of less than 6. In this method, the $DPR_2$ ratio remains at 2 or greater or the $DPR_3$ ratio remains at 0.9 or less. In this method, the fluid from the manifold is distributed into at least two connecting channels, which are connected to the manifold, with a quality index factor as a function of connecting channel areas of equal to or less than Q(Ra), where $Q(Ra)=0.0008135Ra^6-0.03114Ra^5+0.4519Ra^4-3.12Ra^3+11.22Ra^2-23.9Ra+39.09.$ In a preferred embodiment, the first flow regime is turbulent and second flow regime is transitional. Preferably, $R_a$ is equal to or less than 12. In some embodiments, the fluid passes through a macromanifold and then passes through the manifold inlet.

In another aspect, the invention provides a method of passing a fluid through a manifold of a microchannel device, comprising: flowing a first fluid stream into a manifold and then through a first channel in a first direction; flowing a portion of the first fluid stream to a second channel; and flowing a portion of the first fluid stream through the second channel. In this method, the second channel extends at a nonzero angle relative to the first direction; the second channel comprises a microchannel and comprises at least one dividing wall that separates the second channel into at least a first and a second subchannel; the first layer and the manifold are each substantially planar; wherein the manifold is substantially contained within the first layer, and wherein the first layer and the manifold are substantially coplanar, and the first channel is disposed in the first layer and flow through the first channel is substantially parallel to the plane of the first layer; the first channel and the manifold are about the same height; the second layer is substantially planar, the second channel is disposed in the second layer and flow through the second channel is substantially parallel to the plane of the second layer; and the first layer and the second layer are substantially parallel and the nonzero angle refers to an angle within the second layer. One embodiment of a structure through which this method can be conducted is illustrated in FIG. 26a. In a preferred embodiment, the second layer is adjacent (i.e., no intervening layers) to the first layer and the only flow into the second layer is from the first layer. In another preferred embodiment, a plate comprising an opening is disposed between the first and second layers and flow from the first layer passes through the opening into the second layer. In another preferred embodiment, the first layer includes multiple adjacent parallel microchannels which are separated by channel walls; and the second layer comprises multiple adjacent parallel microchannels separated by continuous channel walls wherein the continuous channel walls traverse the width of the multiple adjacent parallel microchannels in the first layer. The second layer can be made from a sheet containing slots. In another embodiment, the first layer comprises multiple adjacent parallel microchannels separated by channel walls; and the second layer comprises multiple adjacent parallel microchannels separated by continuous channel walls; and a portion of the flow through the first layer passes into the second layer where it is redistributed into the microchannels in the first layer. In another preferred embodiment, the presence of the second layer tends to equalize flow through the multiple adjacent parallel microchannels in the first layer; this means that there is a lower Q than if not present; (as with any of the other methods, Q could be any of the preferred Qs described herein. In yet another embodiment of this method, the multiple adjacent parallel microchannels comprise a crossbar that forces flow into the second layer; and, other than contact with the first layer, the second layer does not have any inlets or outlets (an example is illustrated in FIG. 27). As with the any of the other methods, the invention includes the apparatus of this method.

In another aspect the invention provides a system (and corresponding methods utilizing the system) in which a macromanifold connects two or more microdevices, where each microdevice has an M2M as described herein. A "macromanifold" is a manifold that connects to at least two smaller manifolds. For example, a macromanifold can be a pipe (outside of a microchannel device) that connects to two or more M2M manifolds that are within a microchannel device. These systems, may include, for example, one, macro pipe or duct to two or more devices with M2M regions, then to two or more submanifolds in each device, then optionally to two or more connecting channels from each submanifold. Another example of a system includes, for example, a macropipe or duct, connected to two or more devices with M2M regions, then to two or more submanifolds, then finally to two or more connecting channels, or one device including an M2M, to two or more submanifolds, then to two or more connecting channels, then to subchannels within the connecting channels created by a fin structure.

In another aspect, the invention provides a method of passing a fluid through the manifold of a microchannel fluid processing device, comprising: passing a first fluid through a first inlet into a first manifold zone; passing a second fluid through a second inlet into a second manifold zone; wherein a wall is disposed between the first and second manifold zones, and wherein the wall comprises openings that permit mixing of the first and second fluids in the manifold; wherein the manifold is adjacent to a connecting channel matrix; forming a mixed fluid by combining the first and second fluids in the manifold; and wherein the mixed fluid passes into the connecting channel matrix. An example of this aspect is illustrated in FIG. 28.

In a further aspect, (see FIGS. 29 and 30) the invention provides a microchannel fluid processing device, comprising: a manifold connected to a connecting channel matrix; wherein the manifold and connecting channel matrix are coplanar; and further comprising a flow directing feature that comprises: an inclined manifold; or angled connections that connect the manifold and the connecting channel matrix. The angled connections, if present, comprise angles in the range from 10 to 80, or 100 to 170 degrees, relative to the central axis through the manifold. In a preferred embodiment, the angled connections that connect the manifold and the connecting channel matrix comprise angles in the range from 10 to 80 in the first half of the length of the manifold, and 100 to 170 degrees in the second half of the length of the manifold, relative to the central axis through the manifold. In cases in which the manifold is inclined, a preferred embodiment has the manifold inclined so that manifold volume decreases with increasing length away from a manifold inlet. In some embodiments, these features are etched into a substrate.

In another aspect, the invention provides a microchannel device, comprising: a manifold; a connecting channel matrix; at least three orifice plates disposed in the manifold such that flow through the entire manifold would pass through all of said at least three orifice plates. In this device the at least three orifice plates have orifices with differing cross-sectional areas; and the orifice plates divide the manifold into segments, wherein each segment is connected to at least one connecting channel in a connecting channel matrix. An example is illustrated in FIG. 38. In a preferred embodiment, the orifice area in the three plates decrease with increasing length down the manifold. In another embodiment, there are at least 3 connecting channels in each segment. Other preferred embodiments comprise grates and/or gates.

For any of the apparatus and methods, the heights of connecting channels and/or manifolds are preferably in the range of 20 μm to 5 mm, more preferably 2 mm or less. The thickness of walls separating channels or manifold walls are preferably in the range of 20 μm to 5 mm, more preferably 2 mm or less. Connecting channels preferably have a length of 1 cm to 10 m. In a stacked device, the web thickness between layers is preferably the thickness of a sheet (in other words, in some preferred embodiments, devices are made by cutting features through a sheet rather than etching). Throughout all aspects, the figures are merely illustrative and do not limit all aspects of the invention). In many preferred embodiments, the connecting channels are substantially parallel to the manifold to which the channels are connected.

According to the inventive methods, desired flow distributions can be achieved in microdevices containing multiple connecting channels fed by a manifold (or single connecting channels fed from a very high connecting channel aspect ratio manifold); and these desired flow distributions can be obtained even in high momentum conditions. In preferred methods of the invention, the momentum number, Mo, is preferably at least 0.1, more preferably at least 0.2, in some embodiments, at least 0.5 and in some embodiments at least 5. In some preferred embodiments, the manifold has an M2M manifold aspect ratio (defined below) of at least 10, or at least 20, or 50, or at least 100, and in some embodiments in the range of 30 to 1000. In preferred embodiments, FA (defined below) is 0.01 or less and more preferably less than 0.001. In some of the inventive methods, flow through the majority (by volumetric flow) of the connecting channels has a Reynolds number of 10,000 or less, 5000 or less, 2000 or less, 1000 or less, and in some embodiments, in the range of 500 to 5000. In some preferred embodiments, at least two, more preferably at least 5, in some embodiments at least 10 or at least 100 or, in some embodiments, 5 to 500 connecting channels are served by a single M2M manifold. In many preferred embodiments, flow is controlled to be distributed equally over multiple connecting channels with Q factors (as described below) of 30% or less, more preferably 20% or less, and in some embodiments, in the range of 0.1% to 15%.

Many of the inventions described herein have examples of flow from a header manifold to manifold connections and connecting channels, but that doesn't limit their application to the header. If the invention description for flow from manifold interfaces to connecting channel or is used for a manifold to single connection channel interface, it can be used for analogous and-reversed flow direction in the footer unless explicitly stated.

In some preferred embodiments, the laminated devices are chemical reactors that are capable of processing fluid streams. The invention also includes devices having any of the structural features or designs described herein. For example, the invention includes a device having exothermic reaction channels in an interleaved relationship with coolant and/or endothermic reaction channels; and having one or more flow modifiers in the reaction channels and/or being comprised of subassemblies at right angles to each other. In preferred embodiments, aspects of the invention are combined; for example, any of the catalysts described herein may be selected to be incorporated into a reaction channel in any of the laminate designs described herein.

For all of the methods of making devices that are described herein, the invention also includes laminated devices made by the method. The invention also includes processes of conducting a unit operation (or operations) using any of the devices, structural features, designs or systems described herein.

The use of the fabrication techniques described herein can be applied to all devices for all chemical unit operations, including chemical reactors, combustors, separators, heat exchangers, vaporizers, evaporators, and mixers. The applications may include both gaseous and liquid fluid processing or combinations of the two phases. Liquid fluid processing may also include the generation of suspended solids in continuous liquid fluid phases, such as the formation of an emulsion.

Any of the articles described herein may have multiple layers and repeating sets of layers (repeating units). For example, 2, 10, 50 or more repeating units within a laminate. This multiplicity, or "numbering up" of layers creates added capacity of microchannel laminated devices.

Various embodiments of the present invention may possess advantages such as: lower costs, more equal flow distribution in a multichannel array, lower manifold pressure drop, or additional heat transfer.

GLOSSARY

As is standard patent terminology, "comprising" means "including" and neither of these terms exclude the presence of additional or plural components. For example, where a device comprises a lamina, a sheet, etc., it should be understood that the inventive device may include multiple laminae, sheets, etc.

The "channel axis" is the line through the center of a channel's cross-section as it extends through the channel.

"Bonding" means attaching or adhering, and includes diffusion bonding, gluing, brazing and welding.

A "bump" is an obstruction or area of increased channel wall roughness that reduces mass flow rate through a channel under typical operating conditions.

Capacity of a manifold, $C_{man}$, is defined as the mass processed per unit volume of manifold:

$$C_{man} = \frac{m_{man}}{V_{man}} \quad (1)$$

where $m_{man}$[kg/sec]=Mass flow rate for a manifold $V_{man}$ [m$^3$]=The total volume of the manifold: the manifold channels; internal distribution features, such as sub-manifolds and gates, grates and other manifold connection channels, including their containment walls; the external containment walls of the manifold, including space between manifold channels not used for other manifolds or processing channels. The total volume of the manifold does not include the channel walls in the layers directly above or below the manifold channel. The external containment wall volume in an M2M manifold includes that volume that separates the manifold from the necessary device perimeter of a microchannel device, which occurs around the entire device. It includes the wall volume separating the channels of fractal distribution manifolds that aren't used by other connecting channels.

For microchannel devices with M2M manifolds within the stacked shim architecture, the M2M manifolds add to the overall volume of the device and so it is desirable to maximize the capacity of the manifold. In preferred embodiments of the invention, an M2M distributes 1 kg/m$^3$/s, preferably 10 kg/m$^3$/s, and in some preferred embodiments distributes 30 to 150 kg/m$^3$/s.

The connections between the manifold and the connecting channels (i.e., the M2M distribution structures) described herein preferably have thicknesses (i.e., heights) of 20 μm to 5 mm, more preferably 2 mm or less, and preferably have widths in the range of 100 μm to 5 cm and in some preferred embodiments have widths more than 250 micrometers and less than one millimeter. The lengths of the connecting channels have a lower limit of zero and an upper limit of 1 meter, and in some preferred embodiments a range of 2 millimeters to 10 cm.

The cross-sectional area of a channel is that cross-sectional plane normal to the channel axis. It excludes the cross-sectional area of the wall and any applied coatings (catalyst, bonding, metal protection) to the wall. A layer typically includes plural channels that are separated by channel walls. The cross-sectional area of a channel includes area taken up by catalyst, if present.

Channels are defined by channel walls that may be continuous or may contain gaps. Interconnecting pathways through a monolith foam or felt are not connecting channels (although a foam, etc. may be disposed within a channel).

"Connecting channels" are channels connected to a manifold. Typically, unit operations occur in connecting channels. Connecting channels have an entrance cross-sectional plane and an exit cross-sectional plane. Although some unit operations or portions of unit operations may occur in a manifold, in preferred embodiments, greater than 70% (in some embodiments at least 95%) of a unit operation occurs in connecting channels. A "connecting channel matrix" is a group of adjacent, substantially parallel connecting channels. In preferred embodiments, the connecting channel walls are straight.

The "connection to manifold cross-sectional area ratio" is the ratio of the cross-sectional area of open area of the manifold connection (such as a gate or grate) to the cross-sectional area (perpendicular to the central axis) of the manifold at the position immediately upstream of the connection (for a header) or immediately downstream of a connection (for a footer).

The connecting channel pressure drop ($\Delta P_{CCdP}$) is the static pressure difference between the center of the entrance cross-sectional plane and the center of the exit cross-sectional plane of the connecting channels. In some preferred embodiments, connecting channels are straight with substantially no variation in direction or width. The connecting channel pressure drop for a system of multiple connecting channels is the arithmetic mean of each individual connecting channel pressure drop. That is, the sum of the pressure drops through each channel divided by the number of channels. For the examples, pressure drops are unadjusted; however, in the claims, pressure are defined based on the channels that comprise 95% of the net flow through the connecting channels, the lowest flow channels are not counted if the flow through those channels is not needed to account for 95% of the net flow.

The FA dimensionless number is a means of distinguishing high momentum flow from creeping flow in manifolds:

$$FA = \frac{[0.058 + 0.0023(\ln Re)^2]^2 D}{L_{M2M}} < 0.01 \quad (2)$$

where Re is the manifold Reynolds number, D is the manifold hydraulic diameter and $L_{M2M}$ is the manifold zone length. The header manifold Reynolds number and hydraulic diameter for FA are defined at the position on the channel axis where the wall plane closest to the header entrance belonging to the connecting channel closest to the entrance in the manifold connects with the channel axis. The footer manifold Reynolds number and hydraulic diameter for FA are defined at the position where the wall plane closest to the footer exit belonging to the connecting channel closest to footer exit connects with the channel axis. FA should be below 0.01 and for some preferred embodiments less than 0.001.

A "flow resistor" is a bump, grate, or porous body. A flow resistor is not a simple straight channel, and is not a gate at the start of a channel.

A "footer" is a manifold arranged to take away fluid from connecting channels.

A "gate" comprises an interface between the manifold and two or more connecting channels. A gate has a nonzero volume. A gate controls flow into multiple connecting channels by varying the cross sectional area of the entrance to the connecting channels. A gate is distinct from a simple orifice, in that the fluid flowing through a gate has positive momentum in both the direction of the flow in the manifold and the direction of flow in the connecting channel as it passes through the gate. In contrast, greater than 75% of the positive momentum vector of flow through an orifice is in the direction of the orifice's axis. A typical ratio of the cross sectional area of flow through a gate ranges between 2-98% (and in some embodiments 5% to 52%) of the cross sectional area of the connecting channels controlled by the gate including the cross sectional area of the walls between the connecting channels controlled by the gate. The use of two or more gates allows use of the manifold interface's cross sectional area as a means of tailoring manifold turning losses, which in turn enables equal flow rates between the gates. These gate turning losses can be used to compensate for the changes in the manifold pressure profiles caused by friction pressure losses and momentum compensation, both of which have an effect upon the manifold pressure profile. The maximum variation in the cross-sectional area divided by the minimum area, given by the Ra number, is preferably less than 8, more preferably less than 6 and in even more preferred embodiments less than 4.

In a preferred shim construction (shown in FIGS. 3E and 3F), a gate comprises two or more adjoining shims that have channel walls 32' connected at their respective ends. These end wall connections 34' fix the channel walls in space so that the ends do not move during manufacturing and handling. At least one shim has end wall connections continuous across the width of the gate's two or more connecting channels and walls to form the perimeter edge of the manifold 34'. The end wall connection in this shim creates a barrier for fluid flow between the manifold 36 and the two or more connecting channels 35'. The illustrated shim also has an intermediate wall connection 37' between the connecting channels and the end wall connections. The plane extending in the stacking direction from wall 37' is the connecting channel plane exit or entrance. The intermediate wall connection acts as a barrier for flow between the gate's two or more connecting channels, leaving an open volume between connections for flow distribution in the connection 38'. At least one other shim (the "gate opening" shim) has, where it interfaces the manifold perimeter, the end wall connection 42' only partially continuous across the width of the gate's two or more connecting channels and walls. There is one continuous section 44' of the end wall channel that is offset from the manifold perimeter, extending from the manifold 36' far enough to allow a flow to travel past the barrier created by the continuous end wall connections. The walls 44' and 34' form a connection 46' between the manifold and the connecting channels. The plane extending in the stacking direction from wall 34' is the manifold interface plane. Two or more connecting channels in the "gate opening" shim provide a flow connection 46' into the connecting channels.

In some preferred embodiments, connecting channels are aligned in adjacent shims (such as in region 47' of FIG. 3E)

A "grate" is a connection between a manifold and a single channel. A grate has a nonzero connection volume. In a shim construction (shown in FIG. 3D), a grate is formed when a cross bar in a first shim is not aligned with a cross bar in an adjacent second shim such that flow passes over the cross bar in the first shim and under the cross bar in the second shim.

The "head" refers to the dynamic head of a channel flow, defined by the following equation $$\text{head} = \frac{\rho U^2}{2} = \frac{G^2}{2\rho}, \quad (3)$$

where $\rho$ [kg/m$^3$]=density of the fluid

G [kg/m$^2$/s]=mass flux rate of the fluid

U [m/s]=specific velocity of the fluid

The head is defined at the position of interest.

A "header" is a manifold arranged to deliver fluid to connecting channels.

A "height" is a direction perpendicular to length. In a laminated device, height is the stacking direction. See also FIG. 1A.

A "hydraulic diameter" of a channel is defined as four times the cross-sectional area of the channel divided by the length of the channel's wetted perimeter.

An "L-manifold" describes a manifold design where flow direction into one manifold is normal to axes of the connecting channel, while the flow direction in the opposite manifold is parallel with the axes of the connecting channels: For example, a header L-manifold has a manifold flow normal to the axes of the connecting channels, while the footer manifold flow travels in the direction of connecting channels axes out of the device. The flow makes an "L" turn from the manifold inlet, through the connecting channels, and out of the device. When two L-manifolds are brought together to serve a connecting channel matrix, where the header has inlets on both ends of the manifold or a footer has exits from both ends of the manifold, the manifold is called a "T-manifold".

A "laminated device" is a device made from laminae that is capable of performing a unit operation on a process stream that flows through the device.

A "length" refers to the distance in the direction of a channel's (or manifold's) axis, which is in the direction of flow.

"M2M manifold" is defined as a macro-to-micro manifold, that is, a microchannel manifold that distributes flow to or from one or more connecting microchannels. The M2M manifold in turn takes flow to or from another larger cross-sectional area delivery source, also known as macro manifold. The macro manifold can be, for example, a pipe, a duct or an open reservoir.

A "macromanifold" is a pipe, tube, or duct that connects multiple microdevices to a single inlet and/or outlet. Flow in the macromanifold is in either the transition or turbulent regime. Each microdevice further comprises a manifold for distributing flow to multiple parallel microchannels (i.e., a connecting channel matrix).

A "manifold" is a volume that distributes flow to two or more connecting channels or to a very large aspect ratio (aspect ratios$\geq$30:1) single connecting channel. Aspect ratio is defined as the width of the channel (the flow direction through the volume) over its height in the stacking direction. The entrance, or inlet, plane of a header manifold is defined as the plane in which marks a significant difference in header manifold geometry from the upstream channel. The header manifold includes any volume between the entrance plane and the $L_{M2M}$ header beginning point. The exit, or outlet, plane of the footer manifold is defined as the plane which marks a significant difference in the footer manifold channel from the downstream channel. A significant difference in manifold geometry will be accompanied by a significant difference in flow direction and/or mass flux rate: A manifold includes submanifolds if the submanifolding does not cause significant difference in flow direction and/or mass flux rate. The footer manifold includes any volume between the $L_{M2M}$ footer end point and the exit plane. For example, a microchannel header manifold's entrance plane is the plane where the microchannel header interfaces a larger delivery header manifold, such as a pipe or duct, attached to the microchannel device through welding a flange or other joining methods. Similarly, a header manifold starts at the plane where a tublike, non-microchannel header connects with a microchannel header space. In most cases, a person skilled in this art will readily recognize the boundaries of a manifold that serves a group of connecting channels.

A "manifold connection" is the plane between the manifold and one or more connecting channels. The manifold connection plane can have a volume associated with it for a single connecting channel, and must have a volume if connected through a gate to two or more channels.

A "manifold length" ($L_{M2M}$) is the length of the manifold over its connecting channels. For a header, $L_{M2M}$ is the distance between where the wall plane closest to the header entrance belonging to the connecting channel closest to the header entrance connects with the manifold channel axis, the "$L_{M2M}$ header beginning point", and the position where the wall plane farthest away from the header entrance belonging to the connecting channel farthest away from the header entrance connects with the manifold channel axis, the "$L_{M2M}$ header end point". For a header T-manifolds and header U-manifolds, the $L_{M2M}$ header end point is the midpoint on the line between the two opposite $L_{M2M}$ header beginning points if the channel has a constant cross-sectional area and the $L_{M2M}$ header end point is where the two sides's manifold channel axis lines cross, assuming symmetry between the two manifold sides. For a footer, the $L_{M2M}$ is the distance between the position where the wall plane farthest away from the footer exit belonging to the connecting channel farthest away from the footer exit connects with the channel axis, the "$L_{M2M}$ footer beginning point", and the position where the wall plane closest to the footer exit belonging to the connecting channel closest to the footer exit connects with the channel axis, the "$L_{M2M}$ footer end point". For a header T-manifolds and header U-manifolds, the $L_{M2M}$ header end point is the midpoint on the line between the two opposite $L_{M2M}$ header beginning points if the channel has a constant cross-sectional area and the $L_{M2M}$ header end point is where, the two sides's manifold channel axis lines cross, assuming symmetry between the two manifold sides. An example of $L_{M2M}$ is seen in FIG. 1A.

For a header the "manifold pressure drop" ($\Delta P_{manifold}$) is the static pressure difference between the arithmetic mean of the area-averaged center pressures of the header manifold inlet planes (in the case where there is only one header inlet, there is only one inlet plane) and the arithmetic mean of each of the connecting channels' entrance plane center pressures. The header manifold pressure drop is based on the header manifold entrance planes that comprise 95% of the net flow through the connecting channels, the header manifold inlet planes having the lowest flow are not counted in the arithmetic mean if the flow through those header manifold inlet planes is not needed to account for 95% of the net flow through the connecting channels. The header (or footer) manifold pressure drop is also based only on the connecting channels' entrance (or exit) plane center pressures that comprise 95% of the net flow through the connecting channels, the connecting channels' entrance (or exit) planes having the lowest flow are not counted in the arithmetic mean if the flow through those connecting channels is not needed to account for 95% of the net flow through the connecting channels. For a footer, the manifold pressure drop is the static pressure difference between the arithmetic mean of each of the connecting channel's exit plane center pressures and the arithmetic mean of the area-averaged center pressures of the footer manifold outlet planes (in the case where there is only one header outlet, there is only one outlet plane). The footer manifold pressure drop is based on the footer manifold exit planes that comprise 95% of the net flow through the connecting channels, the footer manifold outlet planes with the lowest flow are not counted in the arithmetic mean if the flow through those exit planes is not needed to account for 95% of the net flow through the connecting channels.

For a header manifold the "manifold to interface pressure drop" ($\Delta P_{M21}$) is the static pressure difference between the point of the "header manifold pressure at the interface", where the header manifold channel axis crosses the plane that bisects the manifold connection width through the manifold connection channel axis, where that plane goes through the bottom and top of the manifold connection channel in the stacking direction, and the center of the connecting channel inlet plane or the arithmetic mean of the connecting channel plane centers connected to the manifold connection. For a footer manifold the manifold to interface pressure (i.e., the "footer manifold pressure at the interface") is defined as the absolute value of the pressure difference between the arithmetic mean of the connecting channel's exit plane center pressures and the point where the footer manifold channel axis crosses the plane that bisects the manifold connection width through the manifold connection axis, where that plane goes through the bottom and top of the manifold connection channel in the height (stacking for laminated device) direction. Examples of the manifold connection include a grate, a gate or orifices. The manifold connection can only be the entrance or exit of a connecting channel if the manifold connection is a plane between the connection and the manifold.

The mass flux rate G is the mass flow rate per unit cross-sectional area of the channel in the direction of the channel's axis.

A "microchannel" has at least one internal dimension of 5 mm or less. A microchannel has dimensions of height, width and length. The height and/or width is preferably about 5 mm or less, and more preferably 2 mm or less. The length is typically longer. Preferably, the length is greater than 1 cm, more preferably in the range of 1 cm to 5 m. A microchannel can vary in cross-section along its length, but a microchannel is not merely an orifice such as an inlet orifice.

The ratio of the manifold's head to its friction loss, Mo, is defined by the following equation:

$$Mo = \frac{\frac{1}{2\rho}[G^2 - 0]}{\frac{4fL_{M2M}}{D}\frac{G^2}{2\rho}} = \left\{\frac{4fL_{M2M}}{D}\right\}^{-1} \tag{4}$$

where,

D [m]=manifold hydraulic diameter at the M2M reference point f [dimensionless]=Fanning friction factor for the M2M reference point G [kg/m²/s]=mass flux rate at the M2M reference point The reference point of header manifold Reynolds number and hydraulic diameter for Mo are defined at the position on the channel axis where the wall plane closest to the header entrance belonging to the connecting channel closest to the entrance in the manifold connects with the channel axis. The footer manifold Reynolds number and hydraulic diameter for Mo are defined at the reference point at the position where the wall plane closest to the footer exit belonging to the connecting channel closest to footer exit connects with the channel axis.

A module is a large capacity microchannel device, made up of multiple layers of repeating unit combinations.

An "open channel" is a gap of at least 0.05 mm that extends all the way through a microchannel such that fluids can flow through the microchannel with relatively low pressure drop.

The "pressure drop ratio #1" ($PDR_1$) is defined as the ratio of connecting channel pressure drop over the representative head of the manifold (the $L_{M2M}$ header beginning point" for a header, the $L_{M2M}$ footer end point" for the footer):

$$DPR_1 = \frac{\Delta P_{CCdP}}{h} = \frac{\Delta P_{CCdP}}{\frac{G^2}{2\rho}} \tag{5}$$

If a manifold has more than one sub-manifold, the head is based upon the arithmetic (number average) mean of the individual sub-manifold G and ρ values.

The "pressure drop ratio #2" ($PDR_2$) is defined as the ratio of connecting channel pressure drop over the manifold pressure drop:

$$DPR_2 = \frac{\Delta P_{CCdP}}{\Delta P_{manifold}} \tag{6}$$

If a manifold has more than one sub-manifold, the manifold pressure drop is based upon the number average of sub-manifold values.

The "pressure drop ratio #3" ($DPR_3$) is defined as the ratio of manifold to interface pressure drop over the manifold pressure drop, $$DPR_3 = \frac{\Delta P_{M2I}}{\Delta P_{manifold}} \tag{7}$$

In preferred embodiments, the arithmetic mean of $DPR_3$ for a manifold is less than 0.9, based on the manifold connections that comprise 95% of the net flow through the connecting channels, the lowest flow manifold connections are not counted if the flow through those channels is not needed to account for 95% of the net flow through the connecting channels. More preferable embodiments have $DPR_3$ values based on the same criteria of less than 0.75, more preferably less than 0.50, more preferably still 0.25 and most preferably less than 0.10.

"Process channel volume" is the internal volume of a process (i.e., connecting) channel. This volume includes the volume of the catalyst (if present) and the open flow volume (if present). This volume does not include the channel walls. For example, a reaction chamber that is comprised of a 2 cm×2 cm×0.1 cm catalyst and a 2 cm×2 cm×0.2 cm open volume for flow immediately adjacent to the catalyst, would have a total volume of 1.2 cm³.

Quality Index factor "$Q_1$" is a measure of how effective a manifold is in distributing flow. It is the ratio of the difference between the maximum and minimum rate of connecting channel flow divided by the maximum rate. For systems of connecting channels with constant channel dimensions it is often desired to achieve equal mass flow rate per channel. The equation for this case is shown below, and is defined as $Q_1$.

$$Q_1 = \frac{m_{max} - m_{min}}{m_{max}} \times 100\% \qquad (8)$$

where $m_{max}$[kg/sec]=maximum connecting channel mass flow rate $m_{min}$[kg/sec]=minimum connecting channel mass flow rate For cases when there are varying connecting channel dimensions it is often desired that the residence time, contact time, velocity or mass flux rate have minimal variation from channel to channel such that the required duty of the unit operation is attained. For those cases we define a quality index factor $Q_2$:

$$Q_2 = \frac{G_{max} - G_{min}}{G_{max}} \times 100\%,$$

where G is the mass flux rate. For cases when all the connecting channels have the same cross sectional area, the equation for $Q_2$ simplifies to $Q_1$. The quality index factor gives the range of connecting channel flow rates, with 0% being perfect distribution, 100% showing stagnation (no flow) in at least one channel, and values of over 100% indicating backflow (flow in reverse of the desired flow direction) in at least one channel. For the examples, $Q_1$ and $Q_2$ are unadjusted; however, in the claims, $Q_1$ and $Q_2$ are defined based on the channels that comprise 95% of the net flow through the connecting channels, the lowest flow channels are not counted if the flow through those channels is not needed to account for 95% of the net flow through the connecting channels.

Ra ($=A_{max}/A_{min}$) is the cross-sectional area ratio of the biggest to the smallest connection between a manifold and connecting channels. These areas can belong to gates or grates.

The Reynolds number, Re, is the commonly used ratio of the inertial over the viscous forces seen by flow in a channel. Its definition is the ratio of the mass flux rate (G) times the hydraulic diameter (D) divided by the dynamic viscosity (i), $$Re = \frac{GD}{\mu} = \frac{\rho U D}{\mu} \qquad (9)$$

The value of the Reynolds number describes the flow regime of the stream. While the dependence of the regime on Reynolds number is a function of channel cross-section shape and size, the following ranges are typically used for channels:

Laminar: Re<2000 to 2200

Transition: 2000-2200<Re<4000 to 5000

Turbulent: Re>4000 to 5000

"Sheets" or "shims" refer to substantially planar plates or sheets that can have any width and length and preferably have a thickness (the smallest dimension) of 5 millimeter (mm) or less, more preferably 0.080 inch (2 mm) or less, and in some preferred embodiments between 50 and 1000 µm. Width and length are mutually perpendicular and are perpendicular to thickness. In preferred embodiments, a sheet has length and width that are coextensive the length and width of the stack of laminae in which the sheet resides. Length of a sheet is in the direction of flow; however, in those cases in which the direction of flow cannot be determined, length is the longest dimension of a sheet.

A "subchannel" is a channel that is within a larger channel. Channels and subchannels are defined along their length by channel walls.

A "sub-manifold" is a manifold that operates in conjunction with at least one other submanifold to make one large manifold in a plane. Sub-manifolds are separated from each other by continuous walls.

"Thickness" is measured in the stacking direction.

In a "U-manifold," fluid in a header and footer flow in opposite directions while being at a non zero angle to the axes of the connecting channels. When two U-manifolds are brought together to serve a connecting channel matrix, with entrances on both open ends of the header manifold and exits on both open ends of the footer, the manifold is called an "I-manifold".

"Unit operation" means chemical reaction, vaporization, compression, chemical separation, distillation, condensation, mixing, heating, or cooling. A "unit operation" does not mean merely fluid transport, although transport frequently occurs along with unit operations. In some preferred embodiments, a unit operation is not merely mixing.

In a "Z-manifold," fluid in a header and footer flow in the same direction while being at a non zero angle to the axes of the connecting channels. Fluid entering the manifold system exits from the opposite side of the device from where it enters. The flow essentially makes a "Z" direction from inlet to outlet.

BRIEF DESCRIPTION OF THE FIGURES

FIG. 25$b$ illustrates a manifold with a straightening zone.

FIG. 25$c$ is an exploded view of the laminate of FIG. 25$b$.

DETAILED DESCRIPTION OF THE INVENTION

Figure 1A:
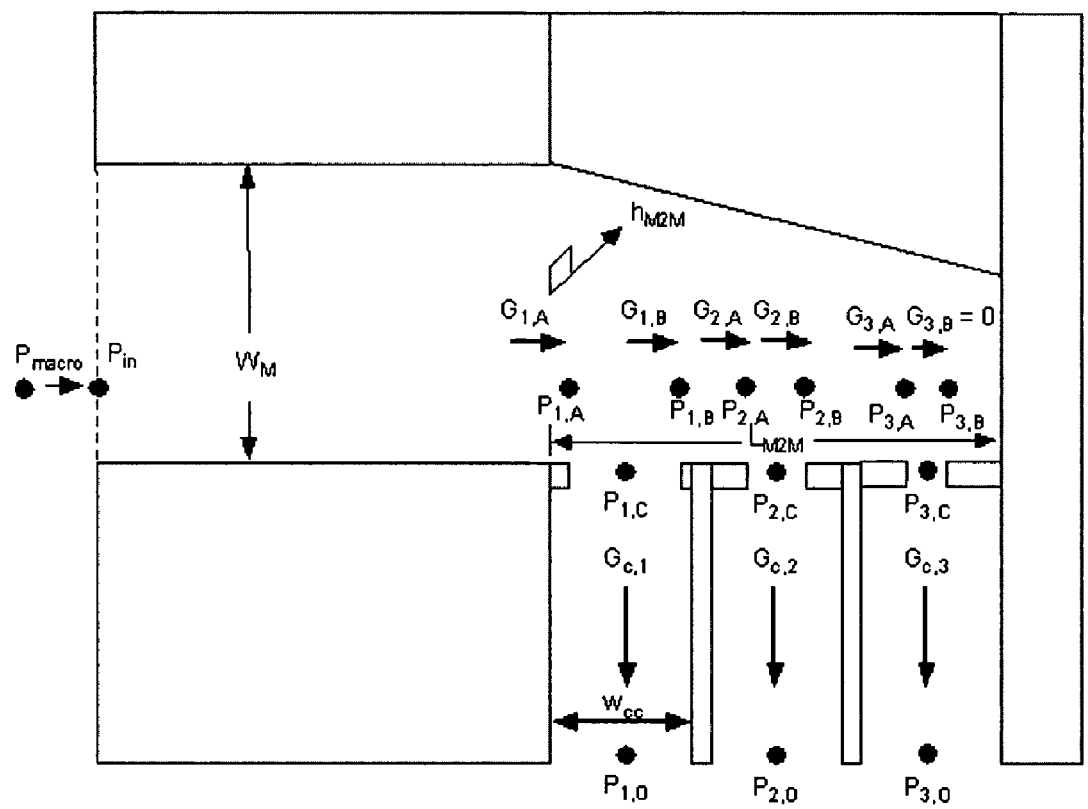
FIG. 1A shows a three opening manifold with mass flux rates (G), static pressures (P) and constant connection channel widths ($W_{cc}$).

Flow Distribution in a Plane
Discussion of Manifold Fluid Dynamics

This section will describe manifold physics important to manifold design and begin to describe how M2M manifolds differ from larger scale manifold systems. The following section will describe experimentally obtained M2M parameters relevant to the invention. Fried and Idelchik in "Flow resistance: A design guide for engineers," Hemisphere Publishing Corporation, 1989, and Idelchik Dekker in "Fluid Dynamics of Industrial Equipment: Flow distribution Design Methods", Hemisphere Publishing Corporation, 1991 have described means of designing conventionally-sized pipe and duct manifolds with large cross-sectional area connections. These ducts are characterized by large hydraulic diameters for the manifold and the connecting channels. Because of the large hydraulic diameters even small specific velocities or mass flux rates can lead to turbulent Reynolds numbers that dominate the friction losses and the other manifold physics. In M2M manifolds, the manifold channels are built into the layers of the device, so they often have hydraulic diameters on the same order of the connecting channels, much smaller than many conventional pipe or duct based manifold systems. Due to the M2M manifold having small hydraulic diameters, fairly large specific velocities or mass flux rates can have transition and even laminar flow characteristics which can affect flow distribution in ways different from fully turbulent manifolds.

In large pipe and duct manifolds the relative cross-sectional areas of delivery manifolds compared to the connecting channels are often limited by the size of the delivery manifold. As the delivery manifold's hydraulic diameter is sized to lower the pressure drop of the system, its cross-sectional area is typically larger than the interface with the connecting channel to make fabrication of the connection (welding, joining or flanging) easier. For this reason the connection to manifold cross-sectional area ratio of the connecting channel interface to the delivery manifold is equal to or less than one for most cases. For M2M manifolds, the connection from the manifold to the connecting channels is fabricated in the same manner as the connecting channels, so the fabrication limitations of size of the connecting channel opening to delivery manifold is taken away. The in plane fabrication methods could allow one or more connecting channels with a manifold interface that has a larger area than the manifold, and its connection to manifold cross-sectional area ratio could be larger than unity.

For large pipe and duct manifolds the effect of friction losses in the length of the manifold directly adjacent to the connecting channel interface is usually negligible because the length over hydraulic diameter are on the order of unity (L/D~1). Because of the small L/D ratio, one only accounts for momentum compensation, discussed later, in that zone. As discussed in the previous paragraph, the length of the M2M manifolds adjacent to the connecting channel interfaces can be large due to channel geometry resulting in length over diameter ratios much larger than unity, so that one can't always assume that the friction losses can be ignored.

Figure 1B:
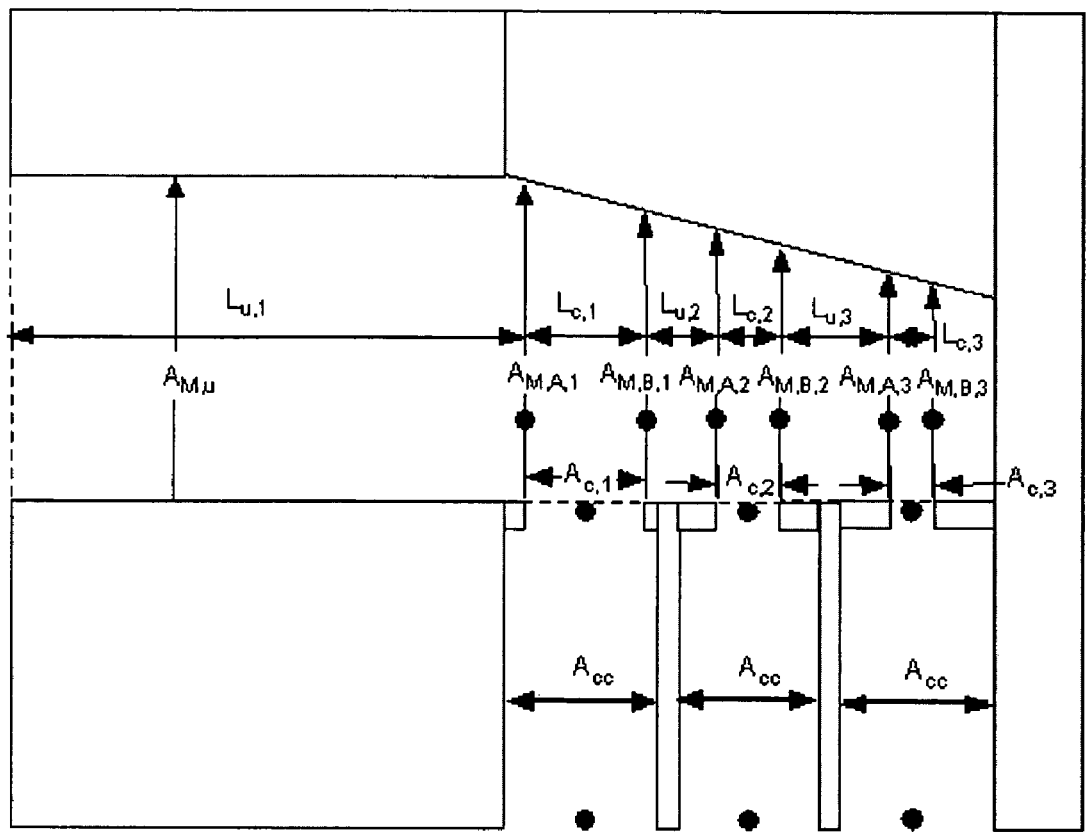
FIG. 1B shows dimensions for a three opening header manifold.

To design a manifold for a set of connecting channels, it is useful to use one-dimensional coefficients to describe complex three-dimensional flow resistances wherever possible, and this analysis will use equations similar to those used by Fried and Idelchik. Using one-dimensional coefficients allows a designer to solve for local momentum balances and mass continuity in a manner akin to electrical circuit analysis, which is very useful when evaluating design changes for flow distribution. By using one-dimensional coefficients, the source of major flow maldistributions can be identified and manifold physics compensated for in ways discussed later in the patent. To design using the circuit analysis, the representative equations that need to be solved are defined. This description will be illustrated using a case of three connecting channels, shown in FIG. 1. The channels have three manifold connecting areas, where the cross-sectional areas are $A_{c,i}$ [m²]. The connecting channel cross sectional areas are $A_{cc}$, [m²]. The local mass flux rates G [kg/m²/s] and the local, absolute static pressures P [Pa] are shown. $A_{c,i}$ [m²] (can be a gate, or any other orifice design), which may or may not be different than the channel area ($A_{cc}$, [m²]). The cross-sectional area in the manifold can change in the direction of flow, as shown in FIGS. 1A and 1B with changing width.

In many embodiments of the present invention, distribution is preferred to be equal, or nearly so, in all connecting channels. However, it should be noted that a small amount of flow maldistribution may be acceptable and not noticeable from the overall device performance. In some embodiments, the amount of acceptable flow maldistribution may be equivalent to a quality index factor of 5%, 10%, or up to 30%. By equal, is meant that one of the following conditions hold:

Constant mass flow rate, m [kg/s]: all connecting channels have the same cross-sectional area, $A_{cc}$ [m²], as a design basis. This leads to a $Q_1$ value of zero. This is the basis for the channels in FIGS. 1A and 1B.

Constant mass flux rate, G: for cases when the connecting channels have different channel sectional areas, but the total contact time is the same. This leads to a $Q_2$ value of zero.

For cases when all cross sectional areas are equal, the constant mass flux rate simplifies to constant mass flow rate case.

For the design of the manifold and connecting channels, a set of equations are solved to determine mass flux rates and pressures.

The momentum balance from the inlet to the outlet of connecting channel i in FIGS. 1A and 1B is $$\Delta P_{cc,i} = P_{i,c} - P_{i,o} = r_{cc} \frac{G_{c,i}^2}{2\rho} \tag{10}$$

where $r_{cc}$ [−]=Connecting channel flow resistance $G_{c,i}$[kg/m²/s]=Connecting channel i's mass flux rate, based upon $A_{cc}$.

$P_{i,c}$ [Pa]=Pressure of the header manifold connection plane center $P_{i,o}$ [Pa]=Pressure of the footer manifold connection plane center $\Delta P_{cc,i}$ [Pa]=Connecting channel i pressure differential $\rho$[kg/m³]=Density of fluid A resistance function representing several flow resistance terms may be used instead of a series of individual momentum balances for the connecting channels, such as friction losses, cross-sectional area changes and other losses. The resistance can be a function of mass flux rate, geometry, molar composition changes, and temperature changes among others. Either resistance or a series of individual momentum balances can be used, and resistance is used here to simplify the system. A resistance function is obtained by taking the sum of the connecting channel pressure drops for a a range of flow rates and dividing each pressure drop by its representative head value ($G_{c,i}^2/2/\rho$), then correlating by the head value.

To generate pressure drops in the connecting channels, the pressure drops have to be calculated from known correlations or estimated experimentally. Friction pressure losses for straight sections of connecting channels can be calculated using the Fanning friction factors. Sources of Fanning friction factors and their manner of use include Rohsenow et al ["Handbook of Heat Transfer", 3$^{rd}$ ed. McGraw Hill, 1998] for a wide range of channel geometries, and Shah and London ["Laminar Flow forced convection in ducts," Supplement 1 to Advances in Heat Transfer, Academic Press, New York, 1978] for laminar flows. Care should be placed in using appropriate Reynolds numbers, channel geometry factors (such as aspect ratios), and hydrodynamic dimensionless lengths ($x^+$=L/D/Re, where L is the section's length, D is channel's hydraulic diameter and Re is the channel's Reynolds number) for laminar flows for the Fanning friction factor. If friction factors aren't available for the connecting channels considered, experimental values can be obtained from fabricated channels fitted with pressure taps placed in well developed flow zones. If the connecting channels have pressure drops from sudden changes in cross-sections or changes in plane, Fried and Idelchik ["Flow resistance: A design guide for engineers," Hemisphere Publishing Corporation, 1989] have a number of equations and references.

To set a perfect distribution, solving for the $G_{c,i}$ then results in $$G_{c,i} = G_{c,perf} = \sqrt{2\rho \frac{\Delta P_{cc,i}}{r_{cc}}} \quad (11)$$

$G_{c,perf}$ [kg/m²/s]=Connecting channel perfect mass flux rate, i.e. the design point.

If the fluid is incompressible, the fluid density is an average of the connecting channel conditions. If the fluid is an ideal gas and the connecting channel pressure drop is less than 10% of the inlet pressure, the density can be approximated by the local average pressure, temperature and molecular weight of the gas as follows $$G_{c,i} = G_{c,perf} = \sqrt{\frac{P_{i,c}^2 - P_{i,o}^2}{r_{cc}}\left(\frac{Mw_e}{RT_e}\right)} \quad (12)$$

where we use an equivalent set of parameters to describe changing connecting channel conditions:

$Mw_e$ [kg/gm-mole]=Average mole fraction for the gas in the connecting channel

R [J/gm-mole/K]=Gas constant $T_e$ [K]=Average gas temperature

The following six factors characterize the system:
1. The outlet pressure profile, $P_{i,o}$ for i from 1 to N total channels
2. Either one of the following:
    a. The inlet pressure of the macro manifold, $P_{macro}$
    b. Or the inlet pressure of the M2M manifold, $P_{in}$
    c. Or the inlet manifold mass flux rate, $G_1$.
3. Connecting channel geometries (heights, widths, lengths)
4. Connecting channel conditions (temperature, mole fractions, adding/losing fluids)
5. Manifold geometries
6. Manifold conditions (temperature)

With the above information and the three-channel (N=3) system in FIG. 1A, there are seventeen (6N−1) unknowns for a header system:

Six (2N) header pressures ($P_{1,A}$, $P_{1,B}$, $P_{2,A}$, $P_{2,B}$, $P_{3,A}$, $P_{3,B}$)

Three (N) connecting channel inlet pressures ($P_{1,c}$, $P_{1,c}$, $P_{1,c}$)

Three (N) header M2M manifold mass flux rates at the connection inlet ($G_{1,A}$, $G_{2,A}$, $G_{3,A}$)

Two (N−1) header M2M manifold mass flux rates at the connection outlet ($G_{1,B}$, $G_{2,B}$)

Three (N) connecting channel mass flux rates ($G_{c,1}$, $G_{c,2}$, $G_{c,3}$)

The exact position of the pressures A and B for the manifold are defined as follows: For the header, Position A at the manifold connection i is defined as the intersection of the manifold channel axis and the plane made by the manifold connection i's wall closest to the header manifold inlet. The header Position B at the manifold interface i is defined as the intersection of the manifold channel axis and the plane made by the manifold connection i's wall farthest from the header manifold inlet.

For the footer, Position A at the manifold connection i is defined as the intersection of the manifold channel axis and the plane made by the manifold connection i's wall farthest from the footer manifold outlet. For the footer, Position B at the manifold connection i is defined as the intersection of the manifold channel axis and the plane made by the manifold connection i's wall closest to the footer manifold outlet. The plane "made" by the manifold's connection wall is a plane, perpendicular to the central axis of the manifold, that intersects an edge of the manifold connection.

The last mass flux rate in the M2M manifold header is zero, because the manifold ends.

$$G_{3,B} = 0 \quad (13)$$

The 6N−1 unknowns are linked by the following 6N−1 equations:

Momentum balance for connecting channel i (N total), from equation (9)

Momentum balance between connecting channel i and the manifold (N total), also known as the "turning loss", the resistance to flow between the manifold and the manifold interface (can be a gate or a grate):

$$\left[\frac{P_{i,A} + P_{i,B}}{2}\right] - P_{i,C} = \zeta\left(\frac{G_{cc}A_{c,i}}{G_{i,A}A_{M,A,i}}, \frac{A_{c,i}}{A_{M,A,i}}\right)\frac{G_{i,A}^2}{2\rho_{Mc,i}} \quad (14)$$

where $A_{c,i}$ [m²]=Cross-sectional area of the connecting channel i, at the manifold interface (not necessarily the area of the connecting channel)

$A_{M,A,i}$ [m²]=Cross-sectional area of the manifold at connecting channel i $\zeta$ [dimensionless]=Turning loss function from the M2M manifold to the connecting channel $\rho_{Mc,i}$ [kg/m³]=Average density of the fluid between the manifold and connecting channel i The turning losses can be considered as part of a connecting channel's total pressure drop and can have a strong effect on flow distribution. The values of the turning loss are positive for the header, and can possibly be positive or negative for the footer, resulting in a pressure drop for the former and a net static pressure increase for the latter. If the manifold geometry and manifold connection geometry affect upon the turning loss is well understood, such as large pipes, you can use a correlation for the turning loss as those described in Fried and Idelchik ["Flow resistance: A design guide for engineers," Hemisphere Publishing Corporation, 1989]. If that isn't an option, another means of obtaining the turning loss coefficient $\zeta$ for specific manifold geometry is obtaining from experiment the pressures, upstream mass flux rate, the average density and solving for $\zeta$ using equation 14. The header manifold pressure at the interface can be used instead of the average of $P_{i,A}$ and $P_{i,B}$ in equation (14), as it represents the average pressure in the manifold across the manifold connection interface.

Mass continuity equation between connecting channel i and the manifold (N total)

$$A_{M,A,i}G_{i,A} - A_{M,B,i}G_{i,B} = A_{cc}G_{c,i} \quad (15)$$

where $A_{M,B,i}$ [m²]=Cross-sectional area of the manifold at connecting channel i, downstream of the connecting channel Mass continuity in the manifold between connecting channels i and i+1 (N−1 total)

$$A_{M,A,i+1}G_{i+1,A} = A_{M,B,i}G_{i,B} \quad (16)$$

Manifold momentum balance at the connecting channel i, which includes friction losses and momentum compensation terms (N total)

$$P_{i,A} - P_{i,B} = k_M \left( \frac{A_{M,B,i} G_{i,B}}{A_{M,A,i} G_{i,A}} \right), \quad (17)$$

$$Re\left(\frac{G_{i,A} + G_{i,B}}{2}\right)\right)[G_{i,B}^2 - G_{i,A}^2]\frac{1}{\rho_{M,i}} +$$

$$4f\left(Re\left(\frac{G_{i,A} + G_{i,B}}{2}\right)\right)\frac{L_{i,c}}{D_i}\left[\frac{G_{i,A} + G_{i,B}}{2}\right]^2 \frac{1}{\rho_{M,i}}$$

where $D_i$ [m]=Hydraulic diameter of the manifold at connection i
f [dimensionless]=Fanning friction factor for the manifold
$k_M$ [dimensionless]=Momentum compensation factor
$L_{i,c}$ [m]=Length of the connecting channel opening in the manifold at connection channel i
$\rho_{M,i}$ [kg/m$^3$]=Average density of the fluid in the manifold at connection channel i The momentum compensation coefficient $k_M$ always has a positive value in the header, which can lead to leading to an increase in static pressure across the manifold connection if that effect is stronger than friction losses. Average mass flux rates based on the upstream and downstream values are used for this analysis. The effect of momentum compensation can vary the pressure profiles in the header and footer greatly. If the manifold geometry and manifold connection geometry affect upon the momentum compensation coefficient $k_M$ is well understood, such as large pipes, you can use correlation for the turning loss as those described in Pigford et al ("Flow distribution in piping manifolds", INDUSTRIAL & ENGINEERING CHEMISTRY RESEARCH, v.22, INDUSTRIAL & ENGINEERING CHEMISTRY RESEARCH, pp. 463-471, 1983). If that isn't an option, another means of obtaining the momentum compensation coefficient $k_M$ for specific manifold geometry is obtaining from experiment the pressures, upstream and downstream mass flux rates, the average manifold density and solving for $k_M$ using equation (17).

Manifold momentum balance upstream of connecting channel i (N total)

$$P_{i,B} - P_{i+1,A} = \frac{4f\left(Re\left(\frac{G_{i,A} + G_{i,B}}{2}\right)\right)L_{u,i}\left(\frac{G_{i,A} + G_{i-1,B}}{2}\right)^2}{D_{u,i} \quad 2\rho_{u,i}} \quad (18)$$

where $D_{u,i}$ [m]=Average hydraulic diameter of the manifold's upstream section prior to connection channel i
$L_{i,c}$ [m]=Length of the connecting channel opening in the manifold at connection channel i
$\rho_{u,i}$ [kg/m$^3$]=Average density of the fluid in the manifold upstream connection channel i Thus, there are 6N−1 equations for 6N−1 unkowns. These nonlinear equations can be solved simultaneously using a number of solution strategies. If the manifold channel width is constant in the manifold, the equations simplify. Note that, for gases, the local average density is a function of local pressure.

A similar set of 6N−1 equations can be written for the footer manifold. The direction of manifold flow is from A to B. The footer $G_{1,A}$ value is zero, as it is there is no flow prior to the first manifold connection. The manifold connection to manifold pressure drop in equation (14) would change the sign of the equation (14)'s right hand side, along with the head term's mass flux basis to $G_{i,B}$. The value of the footer turning loss coefficient in (14) would be dependent upon $G_{i,B}$, also. The footer manifold pressure at the interface can be used instead of the average of $P_{i,A}$ and $P_{i,B}$ in the footer version of equation (14), as it represents the average pressure in the manifold across the manifold connection interface. The sign on the right hand side of equation (15)'s continuity equation would change to negative while the continuity equation in (16) would be the same. Equation (17)'s form is the same, leading to a net decrease in static pressure from A to B caused by the combined friction and momentum compensation losses. The only change to equation (17) is that the ratio $$\frac{A_{M,B,i} G_{i,B}}{A_{M,A,i} G_{i,A}}$$

is inverted so the footer manifold mass flow rate ratio is correct for the footer. Equation (18) stays as is for the footer.

For footer Z-manifolds and footer L-manifolds the number order of manifold connection i increases follows in the same direction as the header. The direction of G can be in the opposite direction of the header for U-manifolds. This means the manifold interface numbering scheme goes in the opposite direction of the header.

M2M Manifold Physics

The flow of fluid takes the path of least resistance to leave a manifold. If the connecting channels have large pressure drop at the design flow rate compared to the manifold physics described in the last section, the flow distribution in the connecting channels will be mostly equivalent and sophisticated manifold designs become less necessary. If the connecting channels pressure drop at the design flow rate is low compared to the manifold pressure drops, then depending on the manifold header and footer pressure profiles there is potential for poor flow distribution. The manifold physics versus the connecting channel pressure drop must be balanced to obtain the necessary connecting channel flow distribution for a given manifold.

For low relative flow rates, friction losses dominate the static pressure profiles in the manifolds because the small head values don't give rise to large turning losses or momentum compensation static pressure changes. Examples of such cases include lab-on-a-chip analytical devices and reactions with relatively long contact times. To distribute flow to microsecond contact time reactors and fast liquid phase reactions, a manifold can potentially see very high mass flux rates or velocities, even at low Reynolds numbers. These large head values can give rise to not only large friction losses but also substantial turning and momentum compensation static pressure changes. The latter two pressure changes can strongly affect flow distribution in manifolds.

Momentum compensation refers to the change in manifold static pressure based on flow leaving and entering a manifold from a connecting channel. Momentum compensation increases the header static pressure each time fluid leaves the header to join the connecting channel, and it is possible that the static pressure rise associated with momentum compensation can be larger than friction losses at the connection. The rise in static pressure can be thought of as the means of "pushing" the fluid into the connecting channel. Momentum compensation acts to decrease static pressure in the footer, with the loss in static pressure attributed to accelerating the connecting channel's flow in the direction of the manifold flow. The combination of momentum compensation and friction losses can greatly decrease the footer static pressure in the direction of M2M footer manifold flow.

Figure 2A:
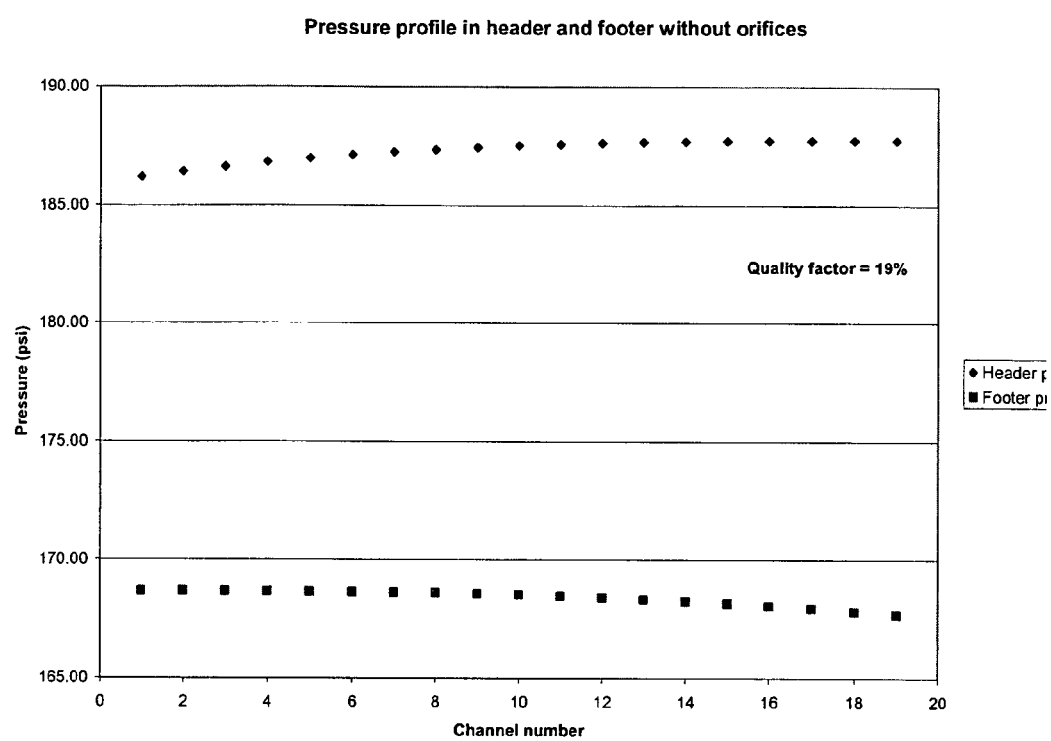
FIG. 2A illustrates the static pressure profile in an M2M based on turbulent pipe turning loss and momentum compensation coefficients for the Z-manifold. Channel #1 is the first channel seen in the header, #19 the last channel seen by the footer. The diamonds show pressure in the header and the squares show pressure drop in the footer.

Momentum compensation is a function of the mass flow rate ratio, the ratio of the manifold flow rates just downstream to just upstream of a distribution point, and the flow regime of the fluid in the manifold. The mass flow rate ratio ranges from zero to one, and the mass flow rate ratio is the ratio of the downstream to upstream mass flow rates for the header and the ratio of the upstream to downstream flow rates for the footer. Microchannel M2M manifolds with high enough heads can see momentum compensation static pressure increases large enough to increase the static pressure in the header despite frictional static pressure losses, resulting in an increase of the static pressure driving force for flow to the connecting channels in the direction of flow. An example of the static pressure increase is seen in FIG. 2A, where the static pressures in a header or footer calculated for a large M2M Z-manifold system based upon turbulent pipe turning loss and momentum compensation coefficients. Channel 1 is the first connecting channel that the header manifold interacts with, while channel 19 is the last connecting channel the footer interacts with. The momentum compensation effect in the header drives the static pressure up with increasing channel number (direction of flow), despite frictional losses, while the combined frictional and momentum compensation losses in the footer drive the static pressure down with increasing channel number. The resulting pressure profile drives more flow to the higher number channels due to the larger pressure differential driving force with the same connecting channel flow resistance.

Figure 2B:
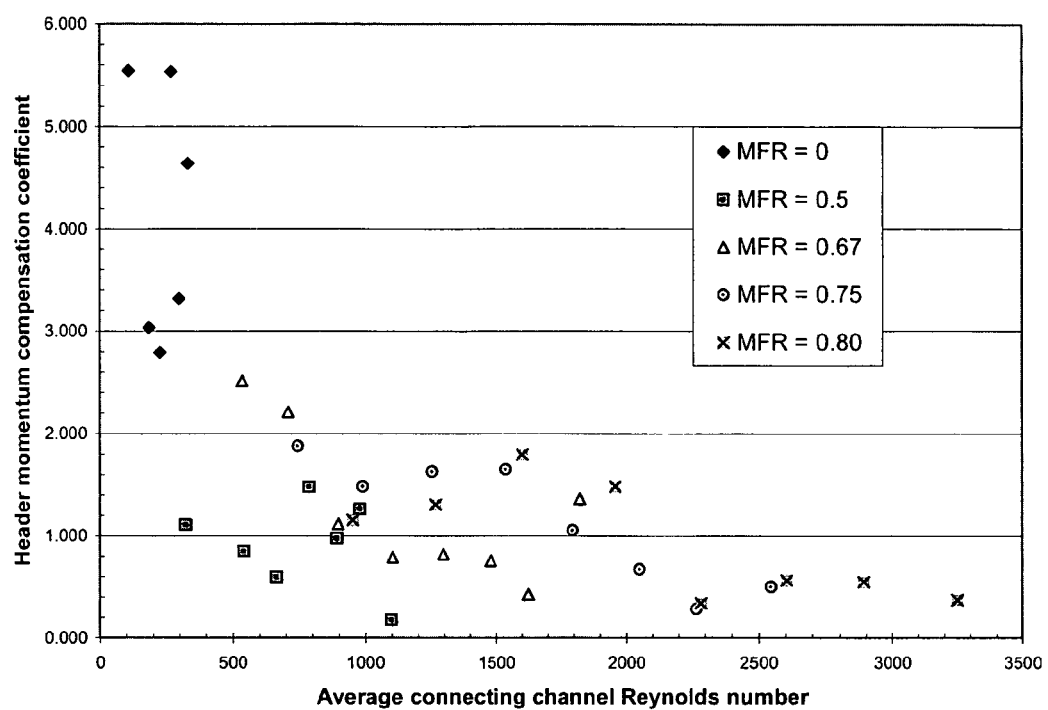
FIG. 2B illustrates M2M header manifold momentum compensation coefficients for an connection to manifold cross-sectional area ratio of 0.09 for several M2M header manifold mass flow rate ratios (MFR), the ratio of the mass flow rates downstream to upstream of a connecting channel.

Experimental data for the microchannel header momentum compensation coefficients versus local average Reynolds numbers are plotted in FIG. 2B. The solid shapes show different manifold mass flow rate ratios (downstream over upstream). The header manifold mass flow rate ratio of zero represents the last channel in the header, while one half represents the second to last channel, assuming equal mass flow in both connecting channels. The value of the ratio increases as the channels increase in number from the end of the header manifold, up to a value approaching unity. As can be seen, the turning losses show a dependence upon Reynolds number, as the headers see values in the laminar (Re<2200) to transition (2200<Re<4000-5000). For many curves a change in the M2M header momentum compensation coefficient can be seen at the transition from laminar to transition flow. The M2M header momentum compensation coefficient values tend to be on the same order or higher than seen in pipes from Pigford et al ("Flow distribution in piping manifolds", INDUSTRIAL & ENGINEERING CHEMISTRY RESEARCH, v.22, INDUSTRIAL & ENGINEERING CHEMISTRY RESEARCH, pp. 463-471, 1983) (values of 0.4-0.7). These M2M header momentum compensation values have experimentally lead to increases in header static pressure, even at inlet Reynolds numbers below 1000.

The average header Reynolds number is used as a basis of the M2M momentum compensation coefficient because this coefficient is obtained from the experimental change in the static pressure from the beginning of the connecting channel to the exit by subtracting the frictional pressure drop from it, which is based upon the average Reynolds numbers. As the connecting channel openings can be quite long in the direction of flow in the M2M manifold and spaced close together, the pressure can change appreciably in the manifold, as mentioned in the previous section.

The Reynolds number in the header can change appreciably in an M2M manifold due to its small hydraulic diameter and large mass flux rates needed to supply fast reactions, high effectiveness heat exchangers and other unit operations aided by microchannel architecture. Some preferred embodiments have operational contact times (contact times through the connecting channels) of fifty milliseconds and less, and some have contact times of ten milliseconds and less. The value of the Reynolds numbers in preferred embodiments can vary across the M2M manifold from turbulent flow, to transition flow to laminar flow; in other preferred embodiments it can vary from transition flow to laminar flow. In other preferred embodiments it can vary from transition flow to turbulent flow. For M2M manifolds where the flow regime changes, the friction losses and the M2M momentum compensation losses, the latter seen in FIG. 2B, change with it. These flow regime changes affect the pressure profiles in the M2M manifold and can contribute to poor flow distribution.

The turning loss is defined as the static pressure change the connecting channel pays to divert the flow to and from the manifold to the connecting channel. The turning loss is a function of 1. The cross-sectional area ratio of the connecting channel interface over that of the manifold;
2. The local ratio of the mass flow rate of the connecting channel to that of the highest manifold mass flow rate at the connection, upstream or downstream; and
3. The shape of the manifold cross section. For rectangular cross sections, the shape is quantified with the manifold aspect ratio.

For constant values of the cross-sectional area of both the manifold and the connecting channel interface, the header turning loss tends to be higher for the connecting channels closest to the header entrance than to those farther downstream. This change in the turning loss with position in the manifold is based upon the change in the manifold head: The head value decreases in the direction of header flow, so diverting a fraction becomes less energy intensive.

Figure 2C:
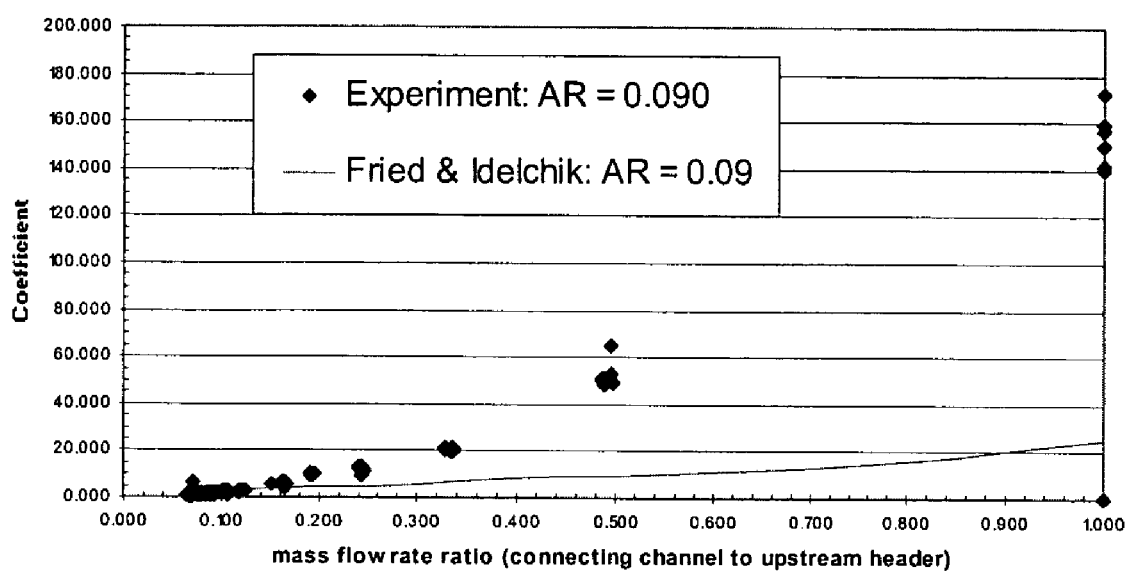
FIG. 2C illustrates experimentally obtained M2M header manifold turning loss coefficients versus the channel mass flow rate ratio (connecting channel to manifold upstream of connecting channel) for a connection to manifold cross-sectional area ratio of 0.09. Also plotted are the header manifold turning loss coefficients for conventional turbulent circular pipes (solid line for the same connection to manifold cross-sectional area ratio).

FIG. 2C shows the experimental values of the M2M header manifold turning loss coefficient measured in a microchannel M2M header manifold with an grate interface to manifold area ratio of 0.09, plotted versus the connecting channel to upstream M2M header manifold mass flow rate ratio of the grate interface to the manifold just upstream of the grate interface. Also in FIG. 2C are the turning loss coefficients for large dimension manifold from Fried and Idelchik ("Flow resistance: A design guide for engineers," Hemisphere Publishing Corporation, 1989) shown in solid line. In general, microchannel M2M (macro to micro) turning loss coefficients follow a similar trend to that of the Fried and Idelchik turning loss coefficients: the values increase with decreasing connection to manifold cross-sectional area ratio. This implies that a larger pressure drop is needed to turn manifold flow into a smaller connecting channel opening. The turning loss coefficient increases with increasing connecting channel to upstream M2M header manifold mass flow rate ratio (or increase with position down the manifold, 0 being for the first channel, 1 for the last channel). However, the turning losses, based upon the product of the manifold head upstream of the grate interface and the turning loss coefficient, are higher for the first channel in the header than for the last channel if the connection to manifold cross-sectional area ratios are constant. This is because the increase in the turning loss coefficient's value with connecting channel to upstream M2M header manifold mass flow rate ratio approaching one (i.e. the end of the header) isn't as large as the decrease in the manifold head ($G^2/2/\rho$) as the manifold loses mass flow rate The microchannel turning losses in FIG. 2C are a factor of 2 to 5 higher than turbulent pipe values, making the turning losses even higher than pipes for connecting channel to upstream M2M header manifold mass flow rate ratios greater than 0.2. The manifold aspect ratio (largest side of the rectangle over the smallest) of the M2M manifold causes the high header turning losses. M2M manifold channel heights are constrained by stacking limitations, as there is often a limited amount of height available between repeating layers. Faced with the restriction of channel height, the M2M manifold can increase its width to increase the overall manifold cross-sectional area for flow. By increasing the manifold cross-sectional area for flow, one can lower both frictional losses and momentum compensation static pressure changes. By increasing the cross-sectional area, the local manifold head is also decreased. As the M2M manifold channel aspect ratio increases, the flow turning from the manifold into the connecting channel sees increasing shear stress from the channel walls above and below. These wall shear stresses increase the turning loss pressure drop with increasing M2M manifold aspect ratio, where circular pipes and nearly square cross-sectioned ducts have much less of this. For example, the M2M manifold channel aspect ratio for the M2M turning loss coefficient in FIG. 2C is roughly 16:1.

Figure 2D:
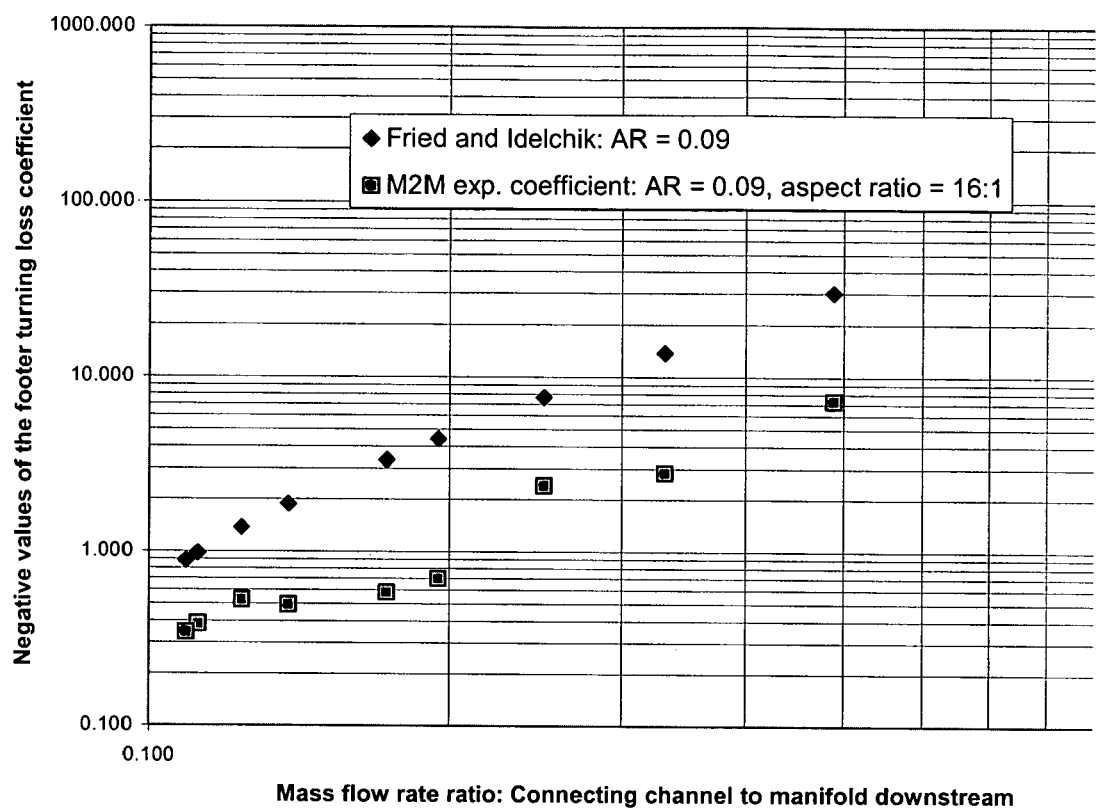
FIG. 2D illustrates negative footer turning loss coefficients for a connection to manifold cross-sectional area ratio of 0.09 in conventional pipes and an M2M manifold.

For the footer turning losses, there is further interesting phenomena. FIG. 2D shows the negative values of the experimental M2M footer turning loss coefficients for the footer manifold plotted versus the local connecting channel connecting channel to upstream M2M header manifold mass flow rate ratio of the connecting channel to that of the highest manifold flow rate at the connection, downstream of the footer connection. The M2M footer turning loss coefficients in FIG. 2D are for a connecting channel interface to manifold area ratio of 0.09 and an M2M manifold aspect ratio of 16:1, and the large manifold numbers from Fried and Idelchik ("Flow resistance: A design guide for engineers," Hemisphere Publishing Corporation, 1989) for the same connection to manifold cross-sectional area ratio are plotted. The negative value footer turning coefficients for the pipe manifolds (from Fried and Idelchik) show a monotonic increase in the footer turning loss coefficient with increasing connecting channel to upstream M2M header manifold mass flow rate ratio. These negative footer turning loss coefficients in FIG. 2D for both cases means that these coefficients have a negative value, so when the footer turning loss coefficient is multiplied by the manifold head downstream of the connecting channel there will be a net increase in the static pressure from the connecting channel outlet to the manifold. This static pressure increase compensates for the static pressure header turning loss to some degree. The footer turning loss coefficient for the 16:1 M2M manifold aspect ratio is a factor of two or three smaller than that of the Fried and Idelchik footer turning loss coefficients. The M2M manifold aspect ratio is probably a strong contributor to the difference in footer turning loss coefficient values, with wall shear stress lowering the net static pressure increase compared to the large manifold system in Fried and Idelchik.

In summary, the experimental M2M manifold momentum compensation and M2M manifold turning losses coefficients diverge strongly in value from reported values used for large pipe and duct systems, mostly due to the effect of large M2M manifold aspect ratio manifold channels. These large M2M manifold aspect ratios are needed to slow down the velocities in the M2M manifold, which in turn decrease local head values which drive the friction, turning and momentum effects. To avoid making larger M2M manifold aspect ratios than the values described above and their associated turning losses, a wide M2M channel can be split into several smaller manifolds of smaller widths that distribute flow to a fraction of the total connecting microchannels. These smaller manifolds are referred to as sub-manifolds. If the coefficients of momentum compensation and turning losses are well understood for a given M2M manifold aspect ratio in a M2M manifold, it is possible to manipulate the manifold and connecting channel cross-sectional areas to tailor the turning losses to compensate for other manifold static pressure changes from friction losses and momentum compensation static pressure changes. By tailoring the turning losses in a manner that will make the driving force for flow equal across the connecting channels despite the other changes in manifold pressure profiles, it is possible to reach an equivalent distribution of flow in each connecting channels. From this desire for controlling turning losses came the invention of variable cross-section grates and gates. Sub-manifolds, grates and gates are discussed in the next section, in addition to other novel means of controlling flow distribution in M2M manifolds.

M2M Distribution Layers

Flow into the M2M of a microdevice is usually routed through a large pipe, tube, or duct. Each large pipe or duct may further serve to connect multiple microdevices operating in parallel. Flow distribution occurs through multiple layers. One large pipe or duct meters flow to one or two or more microdevices. Once flow enters the microdevice, it may then be further segregated into submanifolds. Each submanifold serves to distribute flow to at least two or more connecting channels. Flow may then be further divided within a connecting channel into subchannels. Subchannels may be formed, for example, by the use of fins (either inserted before or after bonding) or integral (such as those formed from the laminae or shims). Flow in one microchannel may be divided into at least two subchannels and in some embodiments, 10 to 100 subchannels.

Improved Distribution in Micro-to-macro Manifolds

As discussed in the previous section, when the cross-sectional area ratio of the connecting channel to the manifold becomes small and the M2M manifold aspect ratio is high, the effect of turning pressure losses in manifolds can be dramatic for the first channel in a header manifold or the last channel in a footer manifold. If an M2M manifold distributes flow to a large number of connecting microchannels, the manifold width could be increased to slow the mass flux rate enough to avoid large turning losses. This in turn decreases the connection to manifold cross-sectional area ratio and increases the M2M manifold aspect ratio resulting in increasing turning losses. The turning losses add to the overall connecting channel pressure drop (which includes frictional and other losses) and can lead to poor flow distribution. This is seen in microchannel process technology (MPT) devices in which large flows are distributed across long distances to individual microchannels.

Figure 3A:
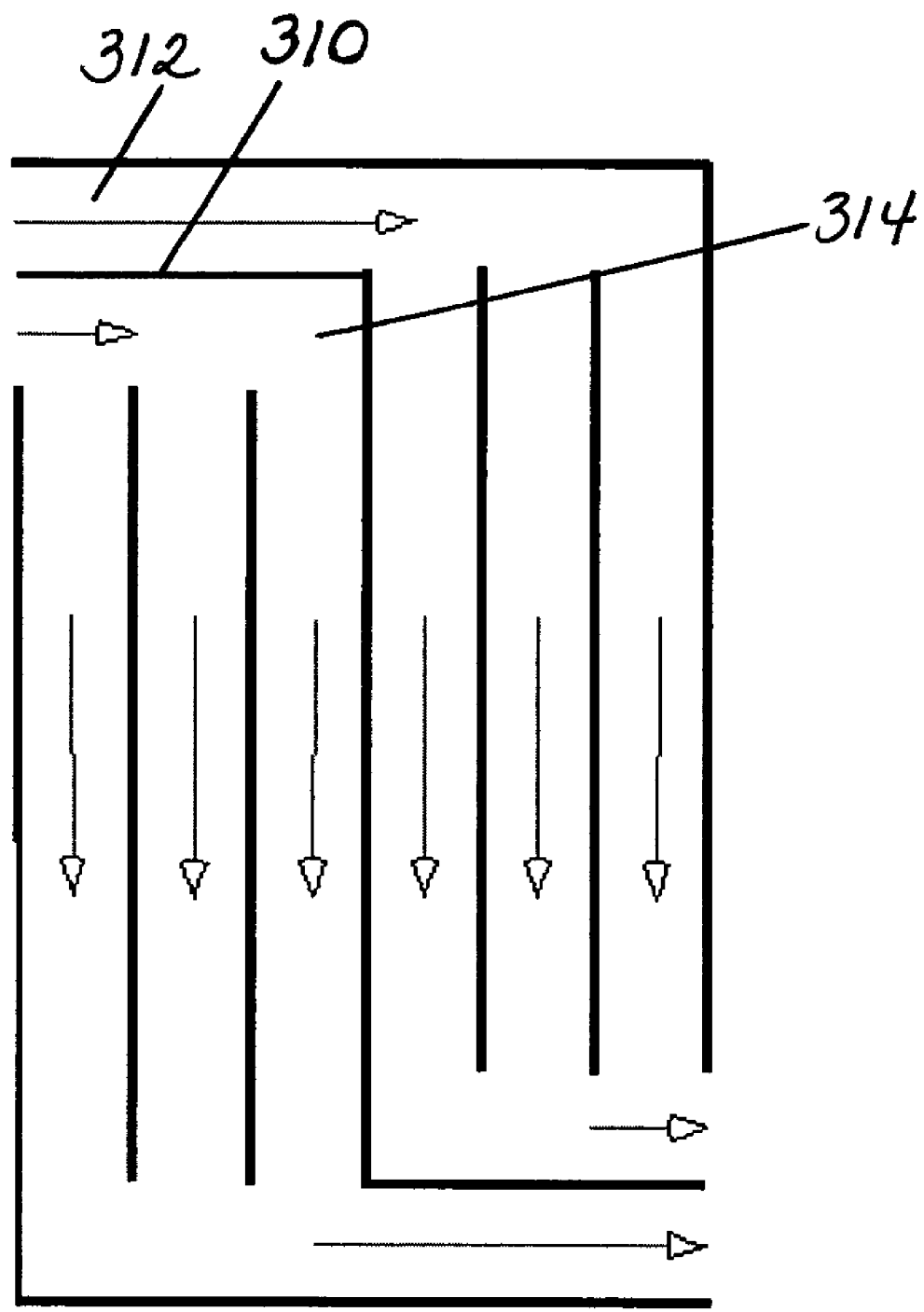
FIG. 3A illustrates a set of sub-manifolds for a Z-manifold system.

Splitting a larger M2M manifold into cascaded layers of smaller parallel M2M manifolds, each of which feed two or more connecting microchannels or one large M2M manifold aspect ratio connecting microchannel can improve flow distribution. A manifold can be split into separate manifolds with walls, with each sub-manifold handling a fraction of the total flow. This change increases the connection to manifold cross-sectional area ratio and lowers the cross-section's M2M manifold aspect ratio, making turning losses lower. FIG. 3A shows a M2M Z-manifold split into two separate M2M sub-manifolds 312, 314. The sub-manifold includes length in addition to the distribution zone of length $L_{M2M}$. This additional length can be used to tailor the pressure drop for the sub-manifold.

Figure 3B:
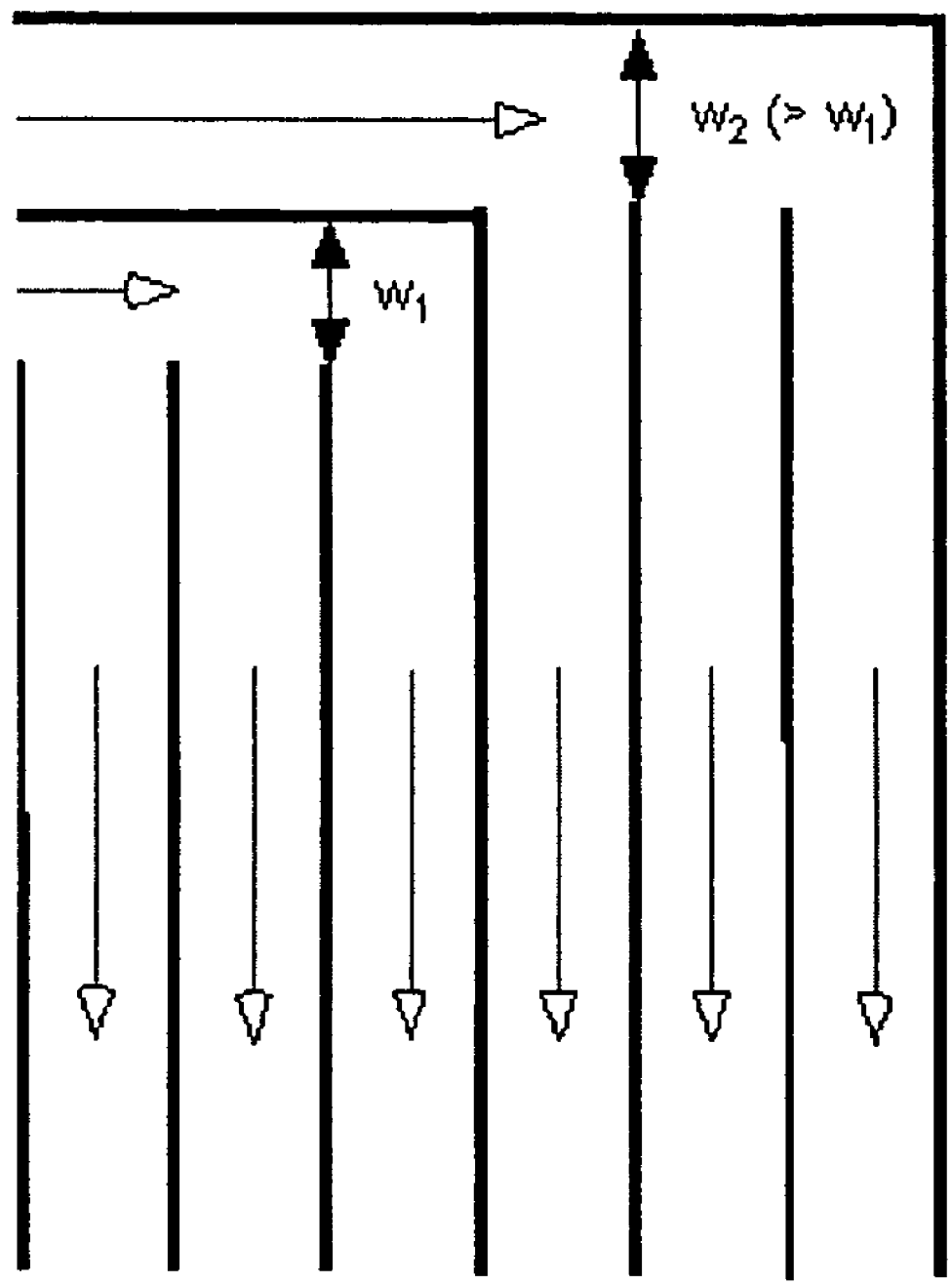
FIG. 3B illustrates a L-manifold system containing two submanifolds.

The width of the sub-manifold section between a macro manifold and a connecting channel distribution section can be changed to affect the sub-manifold's flow resistance. FIG. 3B shows a sub-manifold design for an L-manifold with two sub-manifolds and connecting channels of equivalent flow resistance. The width of the sub-manifold with the longer upstream flow path, $w_2$, is wider than the path for the sub-manifold with the shorter upstream flow path, $w_1$. This difference in upstream widths allows a means of decreasing the flow resistance for the longer flow path sub-manifold and increasing the flow resistance of the shorter flow path sub-manifold so that both sub-manifolds can meter the same amount of total flow. A similar method to this L-manifold's sub-manifold width design can be used for U-manifolds, which have a similar problem matching pressure drops in multiple sub-manifolds with the added burden of matching the total flow resistance between sub-manifold that include headers and footers of differing lengths. An additional benefit can be that the walls separating sub-manifolds can act as pillars of mechanical support to handle loads applied the wall shims directly above and below in the direction of stacking.

Figure 3C:
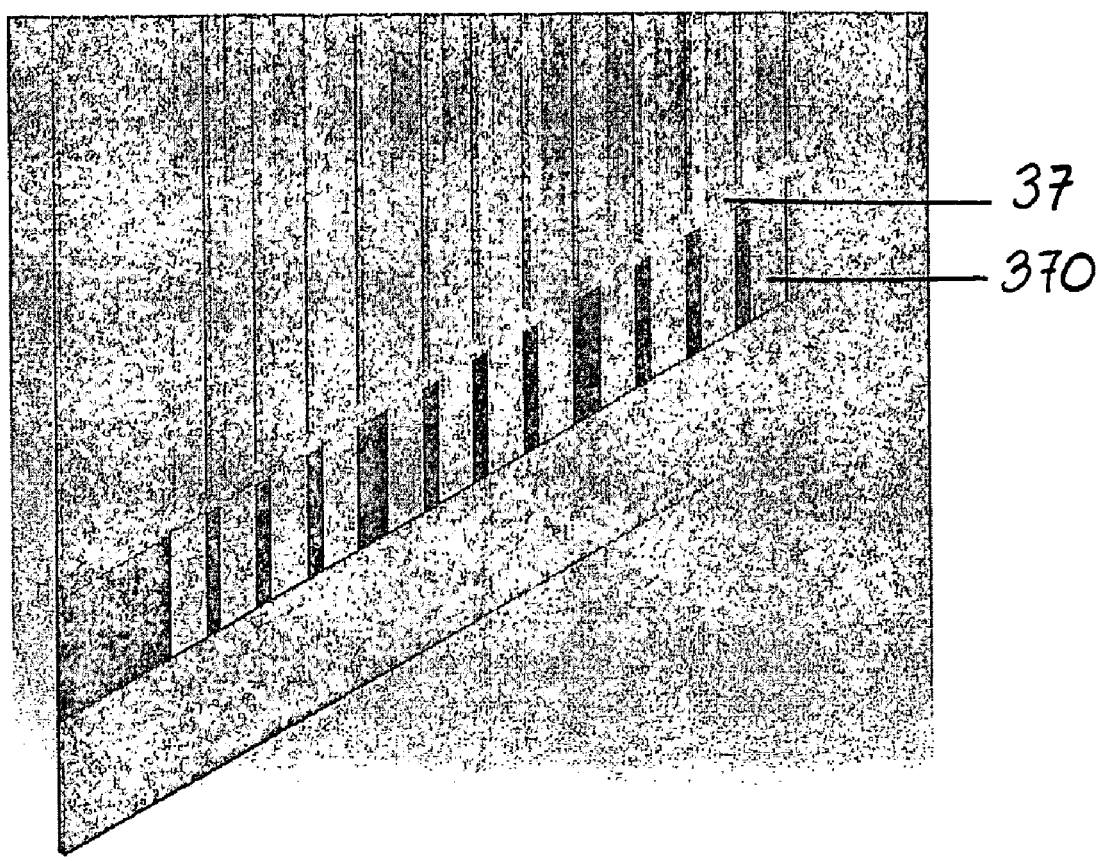
FIG. 3C illustrates an example of a grate for a stacked shim system with the grate extending across the M2M manifold channel's width.

Channel walls often need some material to hold the ends together in a way that avoids creating long and dangling features that could shift position during fabrication and/or operation. FIG. 3C shows an example in which one or more shims whose microchannels end in a bar 37 perpendicular to the channels' axes, signaling the end of the microchannel. In this example, the bar 37 forms a grate that defines one side of a manifold 370. The plane created by the bar 37 and the open space in the adjacent channel is the connecting channel plane exit or entrance. This connecting channel plane design is similar to that illustrated by Golbig et al and discussed in Example 1, except the connecting channel in Golbig's stays in the plane under 37 and doesn't extend into the plane of 37.

Figure 3D:
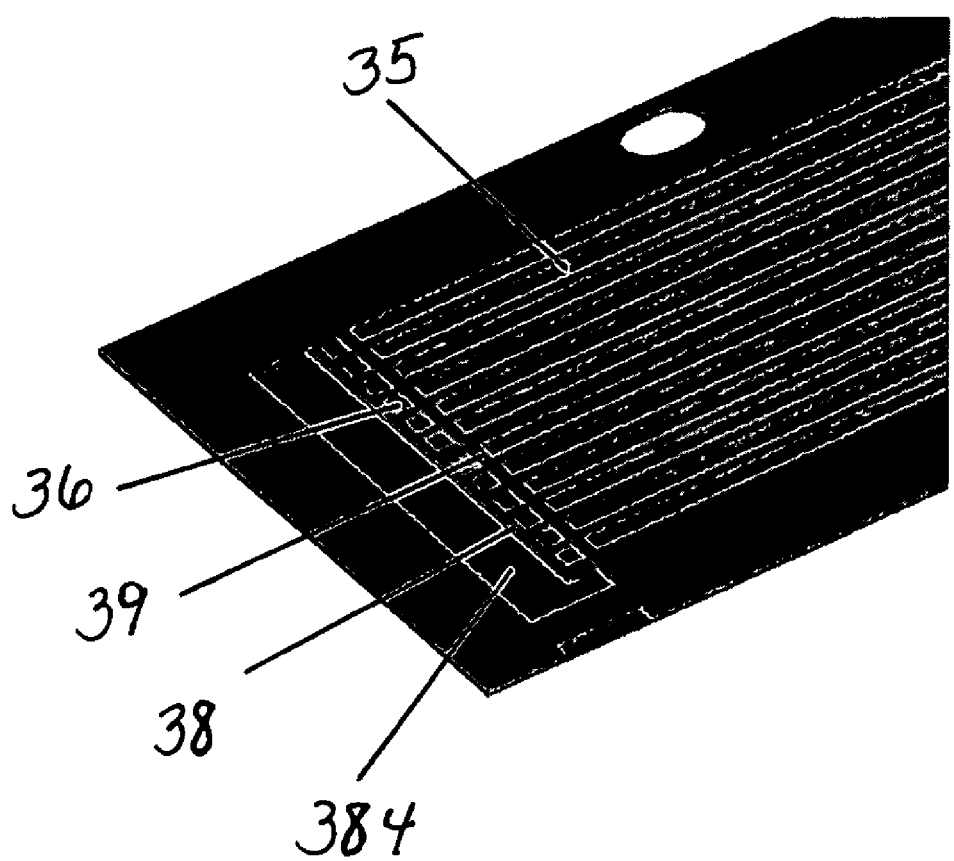
FIG. 3D illustrates a grate design with a grate pulled into the manifold.

An example is shown in FIG. 3D. In this example, each crossbar 39 (upper shim), 38 (lower shim) forms a portion of the grate. The opening 36 created by the differences in the shim channel's ends creates an interface for fluid flow between the microchannels 35 and the M2M manifold.

In some embodiments, it is better to have more of the M2M zone available for flow to lower the M2M mass flux rates, which in turn could lower the momentum compensation static pressure changes, turning and friction losses. FIG. 3D shows the "grate" concept for a single sub-manifold. For the header 384, fluids flows in the M2M and turns into and over the outstretched "grate" 38, entering the interface channel 36 created by the lower shim 38 and the upper shim 39 that marks the end of the microchannel. The flow then leaves the interface and enters the microchannels 35. The flow distribution can be tailored by varying the degree the "grate" sticks out into the manifold over the length of a M2M manifold and also by varying the width of the opening 36 under the crossbar 33. The design in FIG. 3D has been tested in a flow distribution test device.

A "gate" connects an M2M manifold to two or more connecting microchannels. Gate features can help distribute flow with a lower pressure drop than a conventional orifice, which seeks to obtain flow distribution by making all the flows pay an equally large sudden expansion and contraction pressure drop. The gate uses turning losses to meter flow to a connecting channel, set of connecting channels, or submanifold, and does so by varying the gate cross-sectional area. This tailoring of the turning loss allows the gate to compensate for changes in the manifold pressure profiles so that the connecting channel pressure drops are equivalent. Gates also use friction losses, expansion and other distribution features to add back pressure. By varying gate cross-sectional area it is possible to add back pressure to or remove backpressure from a sub-manifold in a larger manifold cascade as a means of controlling overall sub-manifold flow resistance.

Figure 3E:
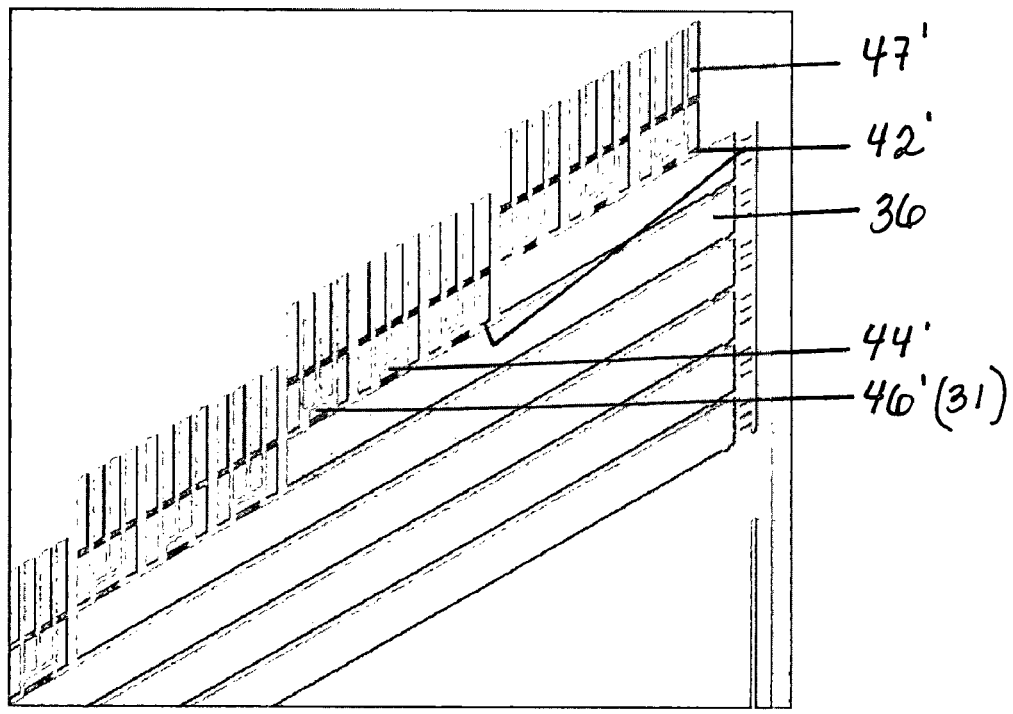
FIG. 3E illustrates a "Gate" design formed by an upper gate shim and a lower channel shim. The gray (upper) shim makes the opening with the M2M manifold and the lower "picture frame" shim makes a plane for distribution to the connecting channels, of which an example of four are shown here for each gate.
Figure 3F:
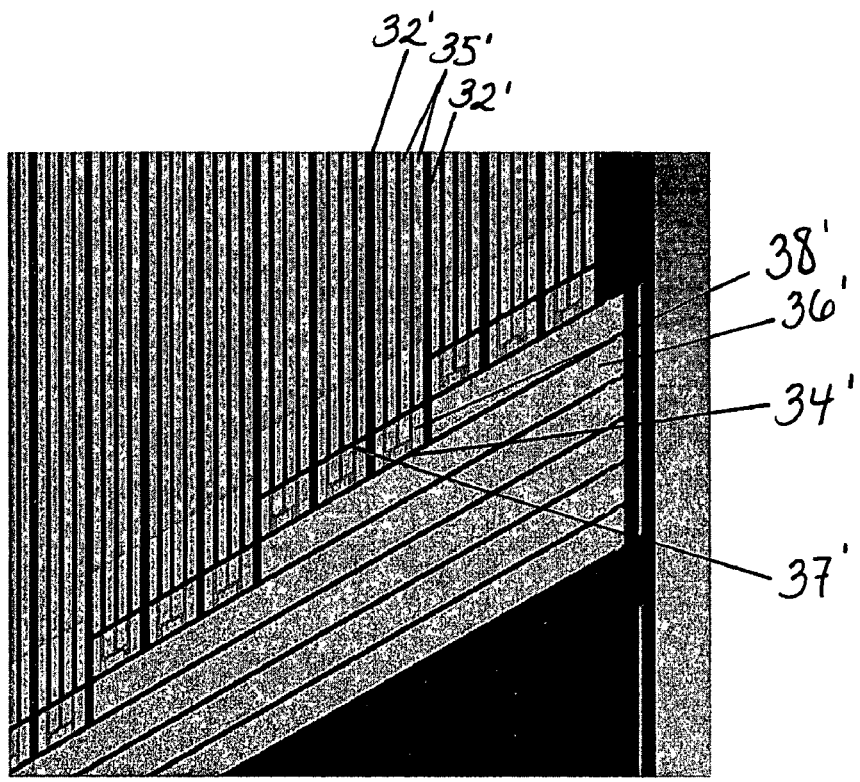
FIG. 3F illustrates the "Gate" design of FIG. 3E where the shims have been inverted across the major central plane.

In L-manifolds, orifice gates 31 in the connecting channel smooth out distribution by forcing flow through a narrowed opening in the entrance of the connecting channels. FIGS. 3E and 3F show an example of a gate, with an opening in the gray shim to let in flow through the wall created by the stacking of two or more shims. This "gate" is an extension of the "grate" design in that it brings an end to the connecting microchannels in shim geometry and allows access to the microchannels from the M2M manifold.

Gates and grates use the turning losses to equalize the static pressure profiles at the connecting channel interfaces, but the manner in which they do so are different from orifices. Orifices use constant small manifold connection cross-sectional areas to impose large flow resistances for each connection, and incur large operating costs in the form of higher overall pressure drops. The inventions described in gates and grates use two or more openings of varying cross-sectional area to use the naturally occurring turning losses to overcome the manifold static pressure profiles caused by manifold physics. In Example 3, the gate openings in the direction of flow decrease in size to compensate for the larger turning losses for the first opening and the increased static pressure driving force at the last two gates caused by momentum compensation. These gate sizes help control flow without the large pressure drops associated with orifice flow resistance. For gates and grates, the preferred value of $DPR_2$ is greater than two, more preferably greater than 5, in some preferred embodiments it is greater than 10, and in some embodiments 5 to 30. The higher the ratio, the less operational costs incurred by the manifold from pressure drop it gives.

Figure 3G:
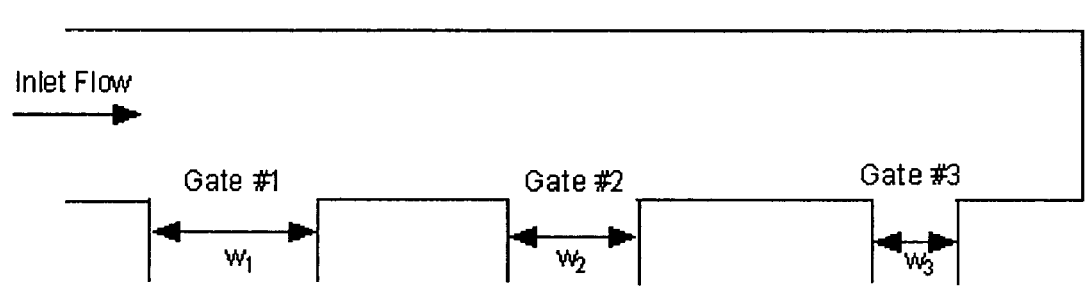
FIG. 3G illustrates decreasing cross-sectional area of the gates in the direction of flow.

Decreasing the cross-sectional area of the gates in the direction of flow (see FIG. 3G) in a header manifold improves distribution because (1) a large gate width at the first openings compensates for the larger relative turning losses seen for the first interface in the manifold; and (2) for gates downstream of the first gate, decreasing the gate size and increasing the turning loss penalty can counteract the increase in static pressure down the length of the manifold, caused by manifold momentum compensation.

Flow Regime

The relative momentum of the manifold stream flow plays an important part in manifold physics. For M2M manifolds with large head values, momentum compensation and turning losses become more pronounced, and can have greater influence on fluid flow distribution than manifold friction losses. However, if the manifold flow does not have a large head value, the friction losses become the dominant effect and the use of manifold features that compensate for the high momentum phenomena lose their effectiveness. As mentioned previously, microchannel M2M manifolds can achieve large head values at low Reynolds numbers because their small hydraulic diameters compensate for large velocities and mass flux rates. These large head values can occur in laminar flow regimes, well below the Reynolds number values of transition and turbulent flow. With large pipe and duct manifolds systems the same head values would be in the turbulent regime due to their inherently larger hydraulic diameters.

The regime of flow entering a macromanifold is typically turbulent or transition. The flow then undergoes additional regime change in the manifold within the microdevice from turbulent, to transition, to laminar. Alternatively, the flow may only undergo one regime change, from turbulent to transition or from transition to laminar.

As a means of determining if a M2M manifold has a large head value, we can use the ratio Mo:

$$Mo = \frac{\frac{1}{2\rho}[G^2 - 0]}{4fL_{M2M} \frac{G^2}{D} \frac{1}{2\rho}} = \left\{\frac{4fL_{M2M}}{D}\right\}^{-1} \quad (19)$$

where

D [m]=manifold hydraulic diameter at the M2M f [dimensionless]=Fanning friction factor for the M2M. The source of Fanning friction factors for channels is given in Rohsenow et al ["Handbook of Heat Transfer", $3^{rd}$ ed. McGraw Hill, 1998] for a wide range of channel geometries, along with references. Care should be placed in using appropriate Reynolds numbers, channel geometry factors (such as aspect ratios), and hydrodynamic dimensionless lengths ($x^+ = L_{M2M}/D/Re$ for laminar flows) for the Fanning friction factor.

G [kg/m$^2$/s]=mass flux rate at the M2M

Re [dimensionless]=Reynolds number at the M2M

The ratio Mo (see equation 18) compares the largest M2M manifold head value, the driving force for turning losses and momentum compensation static pressure changes, to the friction losses the manifold would see if the largest M2M manifold head was applied over the entire manifold length $L_{M2M}$. Small values of Mo would indicate that the M2M effects would be small in comparison to the friction losses, negating some of the effectiveness of sub-manifolds and all the effectiveness of grates and gates to control flow distribution. If the Mo value was greater than some small ratio, for example, Mo>0.05, the head driven turning losses and momentum compensation terms contribute to flow distribution. For cases when Mo is greater than 0.05 sub-manifolds, grates, gates and other architecture that manipulate the turning losses and manifold static pressure profiles can improve M2M manifold flow distribution. For cases when Mo is less than 0.05, manifold friction losses dominate flow distribution.

An alternate for the Mo number is the FA number. The purpose of FA number is to avoid the laminar creeping flow distributed over short manifold lengths. The FA expression is a function of flow rate/flow regime (or Reynolds number), hydraulic diameter of manifold and Length of manifold. Below is the expression of FA number:

$$FA = \frac{[0.058 + 0.0023(\ln Re)^2]^2 D}{L_{M2M}} < 0.01$$

where hydraulic diameter D in inches, manifold length $L_{M2M}$ in inches and Reynolds number Re have the same definition as that for Mo.

In preferred embodiments, FA<0.01. For example, if the hydraulic diameter of sub-manifold is 0.080" (0.20 cm), then the table below gives the length requirement of a sub-manifold with FA<0.01.

| Reynolds number | Length of sub-manifold (in) |
|---|---|
| 10 | $L_{M2M}$ > 0.04" |
| 100 | $L_{M2M}$ > 0.09" |
| 1000 | $L_{M2M}$ > 0.23" |
| 10000 | $L_{M2M}$ > 0.51" |
| 100000 | $L_{M2M}$ > 1.05" |

This means for Re=10 and D=0.08"(0.20 cm), any manifold design with sub-manifold length>0.04" (0.10 cm) will have FA<0.01.

Construction of a 5 Stream, Integrated Combustor and Reformer

A microchannel-based module was designed to perform steam-reforming of methane, with heat supplied by combustion of air and fuel. The combustion and steam reforming reactions are conducted in the same device, which has three zones:

Manifold: The manifold zone distributes flow into the channels. There are five streams that need to be manifolded. These streams are—Fuel, Air, Exhaust, Reactant and Product. Fuel and air comes into the device and leaves out as exhaust. The reactant comes in, gets processed and exits as Products.

Heat exchanger: The exhaust and the products leaving the device are at high temperature. The heat exchanger recuperates the heat from exhaust and product streams to fuel, air and reactant streams. This recuperation helps in achieving the necessary temperature of streams for chemical reactions in the reactor.

Reactor: The reactor zone is actually a reactor plus a heat exchanger. Most of the chemical reactions occur in the reactor zone. The reactions occurring in the device are: combustion in the fuel channel (both catalytic and homogeneous), and catalytic steam methane reforming reaction in reactant channel. In an optional embodiment, some pre-reforming of either the fuel or process feed may occur in a catalytically coated heat exchanger section.

The fuel channel is coated with different types of catalyst which promotes combustion at low temperatures (heterogeneous combustion). The heat of combustion is transferred through the wall to the reaction channel. This heat drives the steam-reforming reaction.

A module combustion M2M manifold was designed to achieve equal flow distribution of combustion reaction streams (fuel such as natural gas, hydrogen, carbon monoxide, and the like with or without air to the fuel side, air to the air side) to the array of combustion channels so that they would mix inside the connecting microchannels within the module. The air and fuel enter from opposite sides of the module, mix within the combustion section, and the combined exhaust makes a u-turn before traveling down the return microchannel and leaves the end of the module, forming header L-manifolds for both streams.

Since each M2M manifold feeds multiple separate millisecond contact time microchannel reactors (72 in this example, but could range from several to tens of hundreds), it has to distribute large flow rates that have high dynamic pressure ($G^2/(2\rho) = \rho U^2/2$) values. The total combined M2M and channel pressure drop was important, and achieving a good distribution of air and fuel in each channel was especially important due to the need to mix near stoichiometric mixtures of fuel and oxidant (air). The means of achieving equal flow distribution for this system was complicated by a number of fabrication and macro manifold constraints. The resulting design included innovations such as: multiple (six, in the illustrated example) sub-manifolds with multiple (12) channels per sub-manifold; and multiple (3) gates per sub-manifold with multiple (4) downstream connecting channels per gate.

Figure 4A:
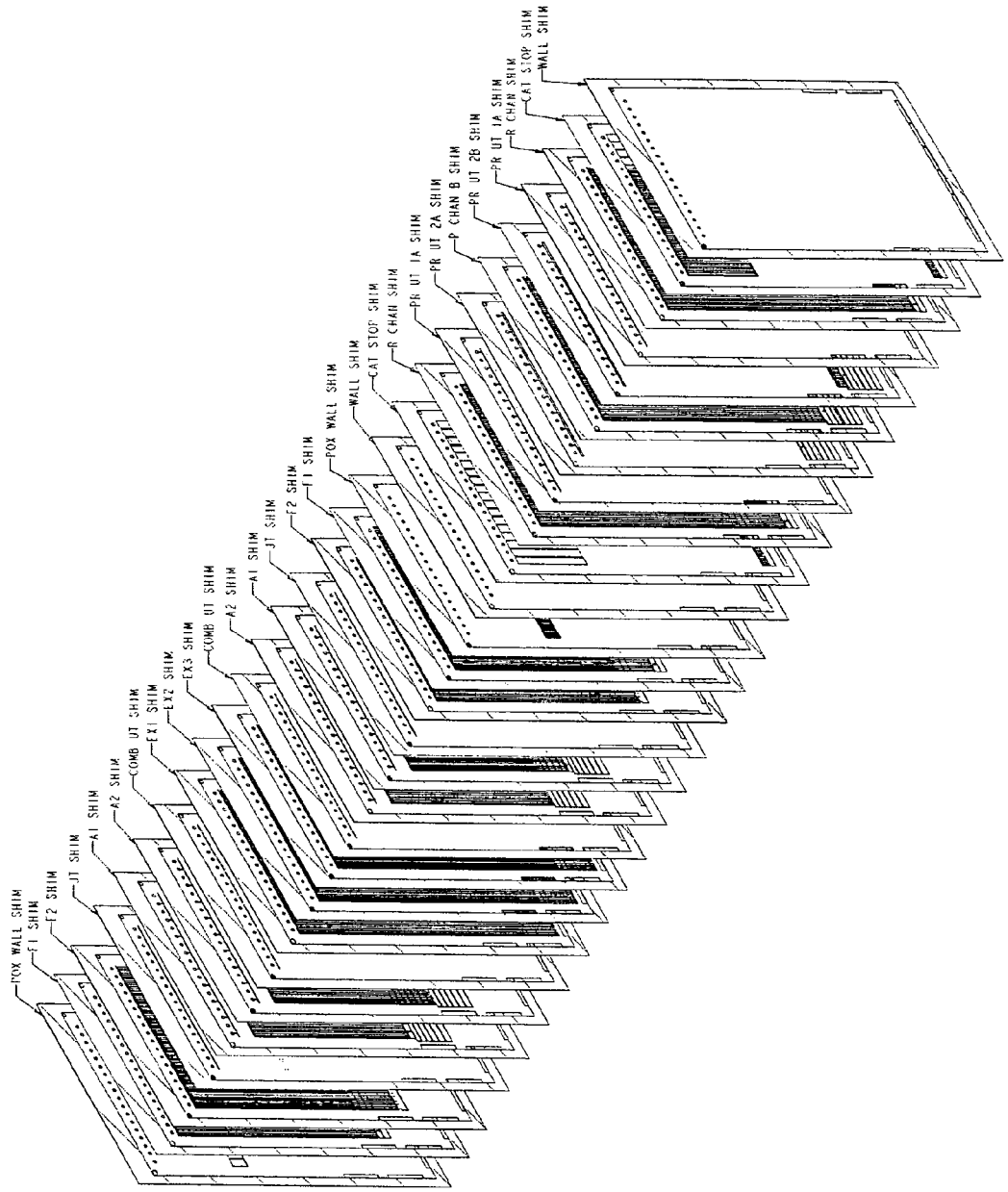
FIGS. 4-22 illustrate shim designs that were assembled to construct and integrated combustion reactor.

FIG. 4A is an exploded view of shims in the stacked device. FIGS. 4-22 are overhead views of shims that were assembled into the device. The overall size of all the shims is 31.47" (length)×22.00" (width). The shim length and width are as defined in FIG. 4B. The thickness of the shim is defined in the direction perpendicular to length and width. Shims from 1-28 were stacked on top of each other to form a repeating unit of the device. The stack height of the repeating unit is 0.43". There are total 49 repeating units in the device. The overall height of the device is 23.1". For all the shims, a perimeter margin of 1.00" along the length and 1.50" along the width has been marked. This marked perimeter metal does not become the part of final device and was provided only to enhance metal diffusion bonding. Toward the bottom and sides of all the shims, rectangular slots are made. The purpose of these slots is to provide a location indicator for opening sub-manifolds during post-bonding fabrication operations, such as plunge electrodischarge machining. The slots on the right side are for fuel stream 12 and reactant stream 14 sub-manifolds, the slots on the left side are for air stream 16 and product stream 18 and the slots at the bottom 19 are for exhaust stream.

All the openings in the shims are through slots or holes. Passages for the flow in the device are through slots or holes. The flow between the passages is separated either by ribs (within a shim for the same stream) or wall shims (between different streams)

Figure 4B:
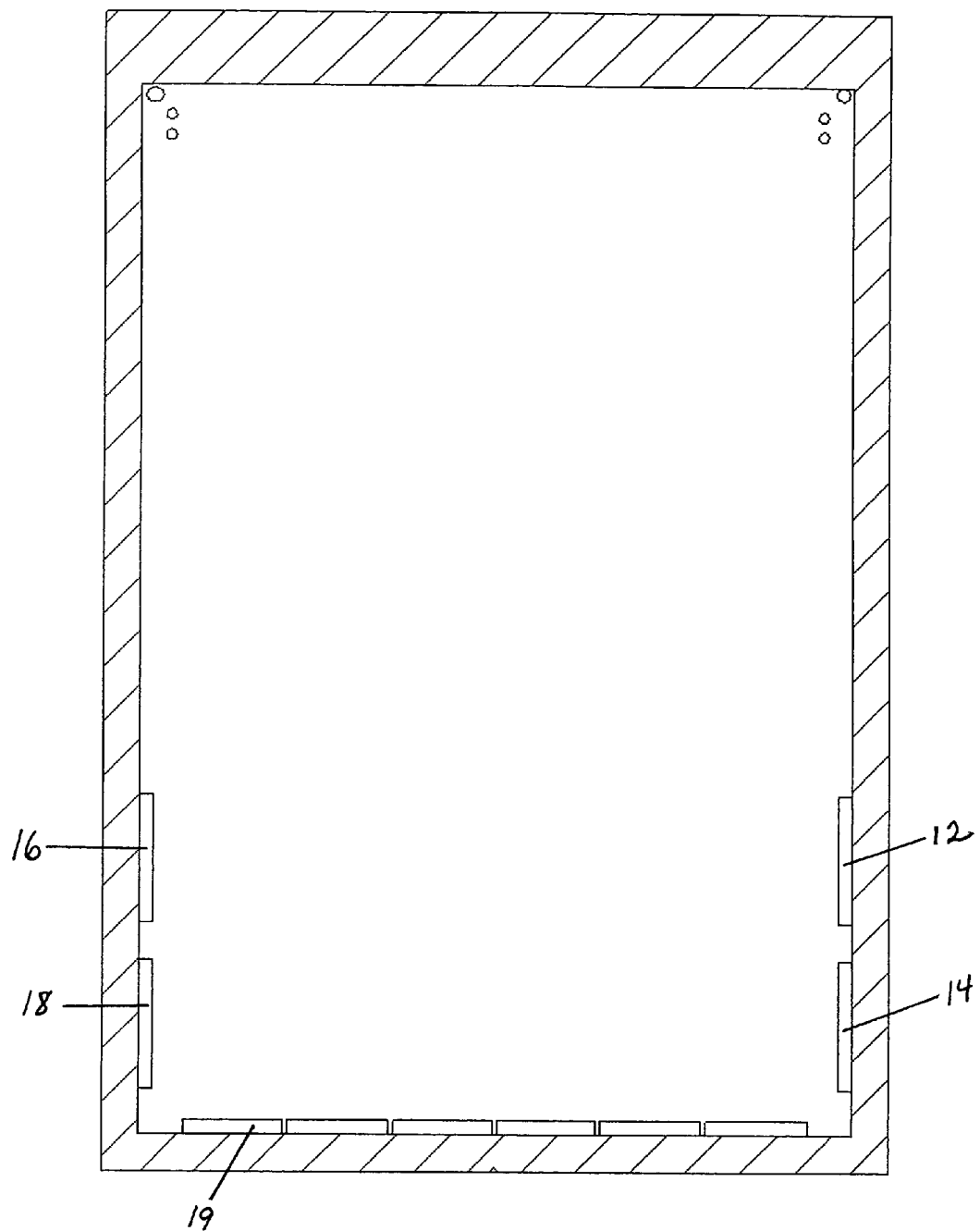

FIG. 4B shows a wall shim. The thickness of the shim is 0.020". This shim separates the reforming reaction stream from the fuel stream. The shim also transfers heat generated in combustion channels to the reaction channels for the steam reforming reaction.

Figure 5:
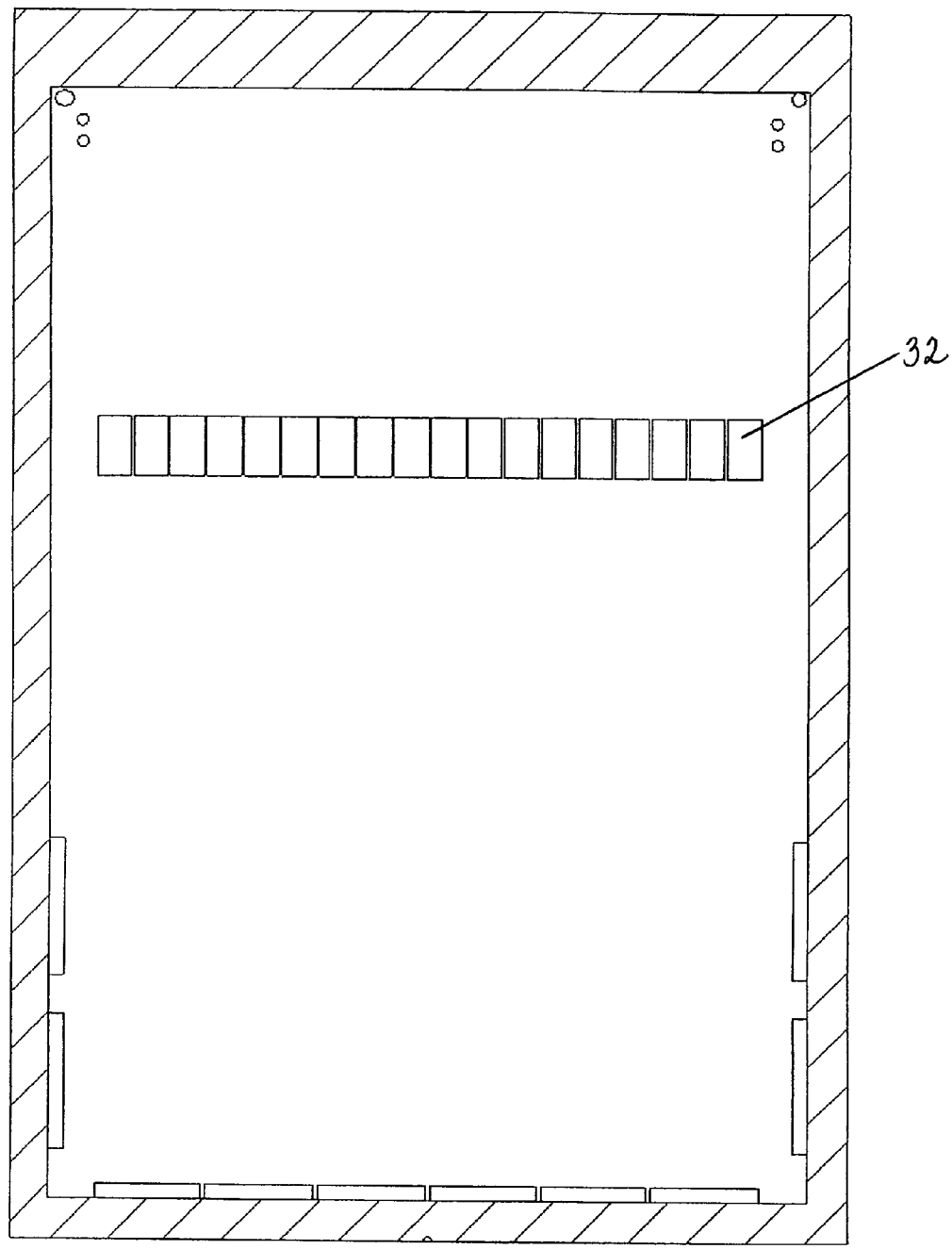

FIG. 5 shows a wall shim. The thickness of the shim is 0.020". This shim separates the reactant stream from fuel stream. The shim also transfers heat generated in combustion channels to the reactant channels for steam reforming reaction. The slots 32 in the shims are to hold catalyst support fins in the fuel channel.

Figure 6:
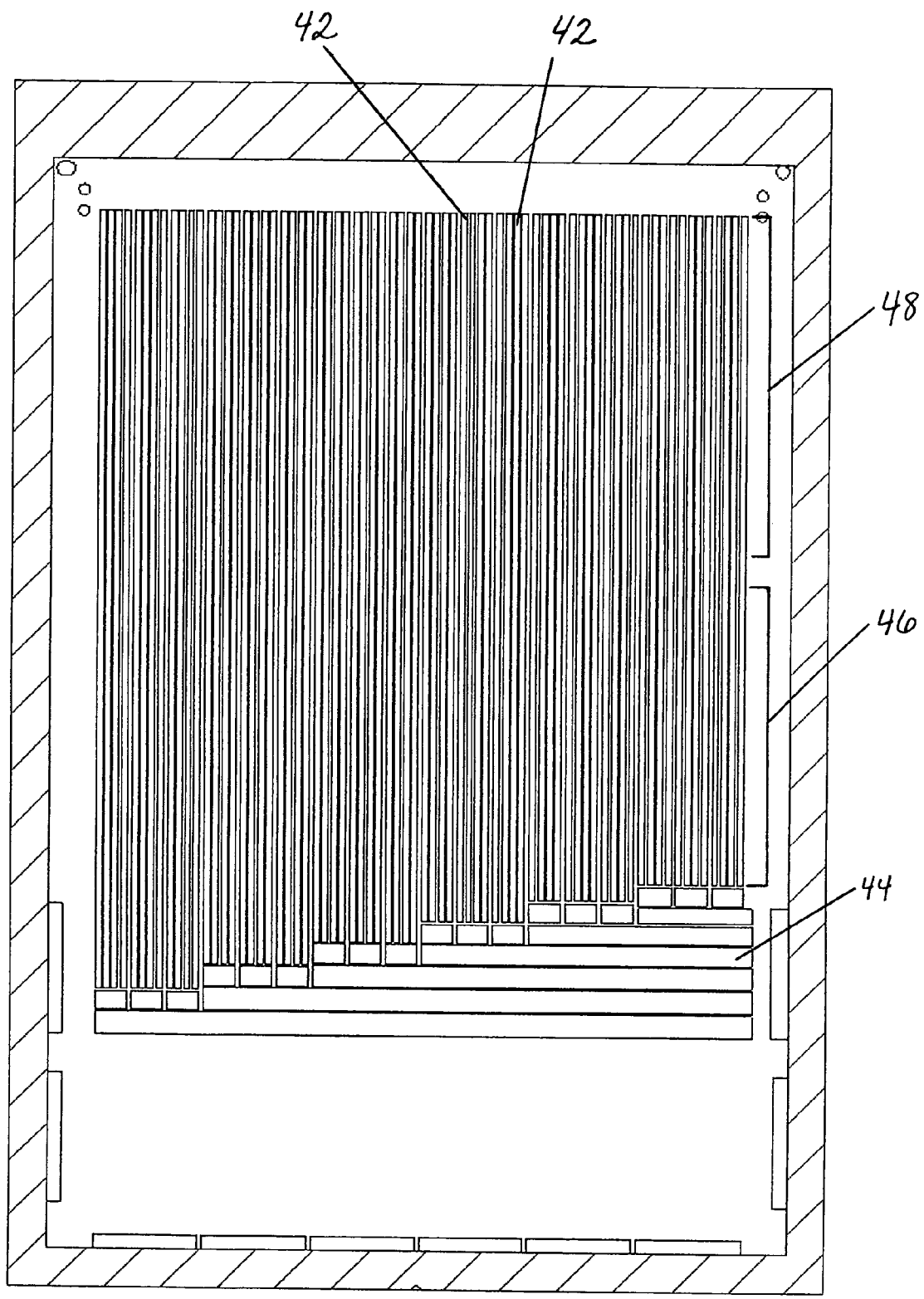

FIG. 6 shows a shim that forms the passage for fuel stream. The thickness of the shim is 0.012". The slots on the shims form features for the fuel stream. The fuel enters from the right end of the shim through 6 inlets 44 (referred as sub-manifolds). The widths of these sub-manifolds perpendicular to the direction of flow, starting from the bottom are 0.60", 0.60", 0.55", 0.50", 0.50" and 0.40". All six sub-manifolds are separated by 0.060" rib. The lengths of the sub-manifolds in the flow direction, starting from the bottom are 16.93", 14.11", 11.29", 8.47", 5.65", and 2.83". The flow from each sub-manifold distributed into three super-channels as shown in the drawing. The flow goes over a 0.060" rib to enter the super-channel from sub-manifolds. The length of super-channels in the direction of flow is 0.50". Each super-channel further divides the flow into four channels. the numerous thin channels 42 are separated by 0.060" ribs except for every 4th rib which is 0.120". All the channels 42 are 0.160" wide. The flow passes through the heat exchanger zone 46, receiving heat from exhaust and product stream and enters combustion zone 48. In the combustion zone, fuel mixes with air and combusts in the presence of combustion catalyst.

Figure 7:
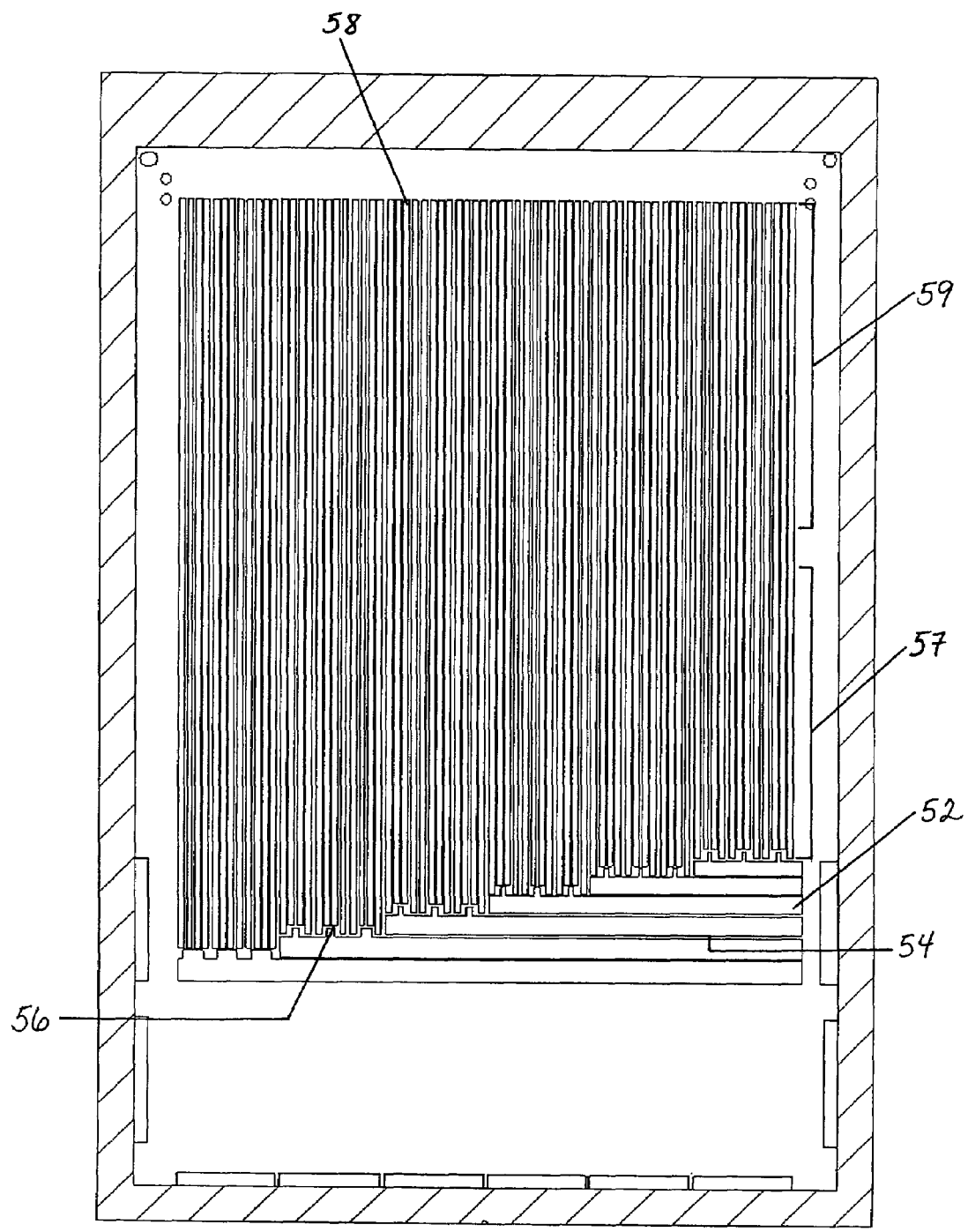

FIG. 7 shows another shim that forms the passage for fuel stream in conjunction with the shim shown in FIG. 6. The thickness of this shim is 0.025". The slots on the shims form features for fuel stream. The fuel enters from the right end of the shim through 6 inlets 52 (referred as sub-manifolds). The widths of these sub-manifolds perpendicular to the direction of flow, starting from the bottom are 0.60", 0.60", 0.55", 0.50", 0.50" and 0.40". All six sub-manifolds are separated by 0.060" ribs 54. The lengths of the sub-manifolds in the flow direction, starting from the bottom are 16.93", 14.11", 11.29", 8.47", 5.65", and 2.83". The sub-manifolds have small openings 56 (gates) to meter the flow into the channels. Each sub-manifold has 3 gates. There are a total of 18 gates to meter the flow into the channels. The length of the gates in the flow direction is 0.060". The widths of the gates starting from the right are −0.105", 0.102", 0.094", 0.122", 0.199", 0.103", 0.143", 0.142", 0.127", 0.160", 0.161", 0.145", 0.299", 0.230", 0.152", 0.560", 0.555", and 0.550". The channels 58 are separated by 0.060" ribs except for every 4th rib which is 0.120". All the channels are 0.160" wide. The flow passes through the heat exchanger zone 57, receiving heat from exhaust and product stream and enters combustion zone 59. In the combustion zone, fuel mixes with air and combusts in the presence of combustion catalyst.

Figure 8:
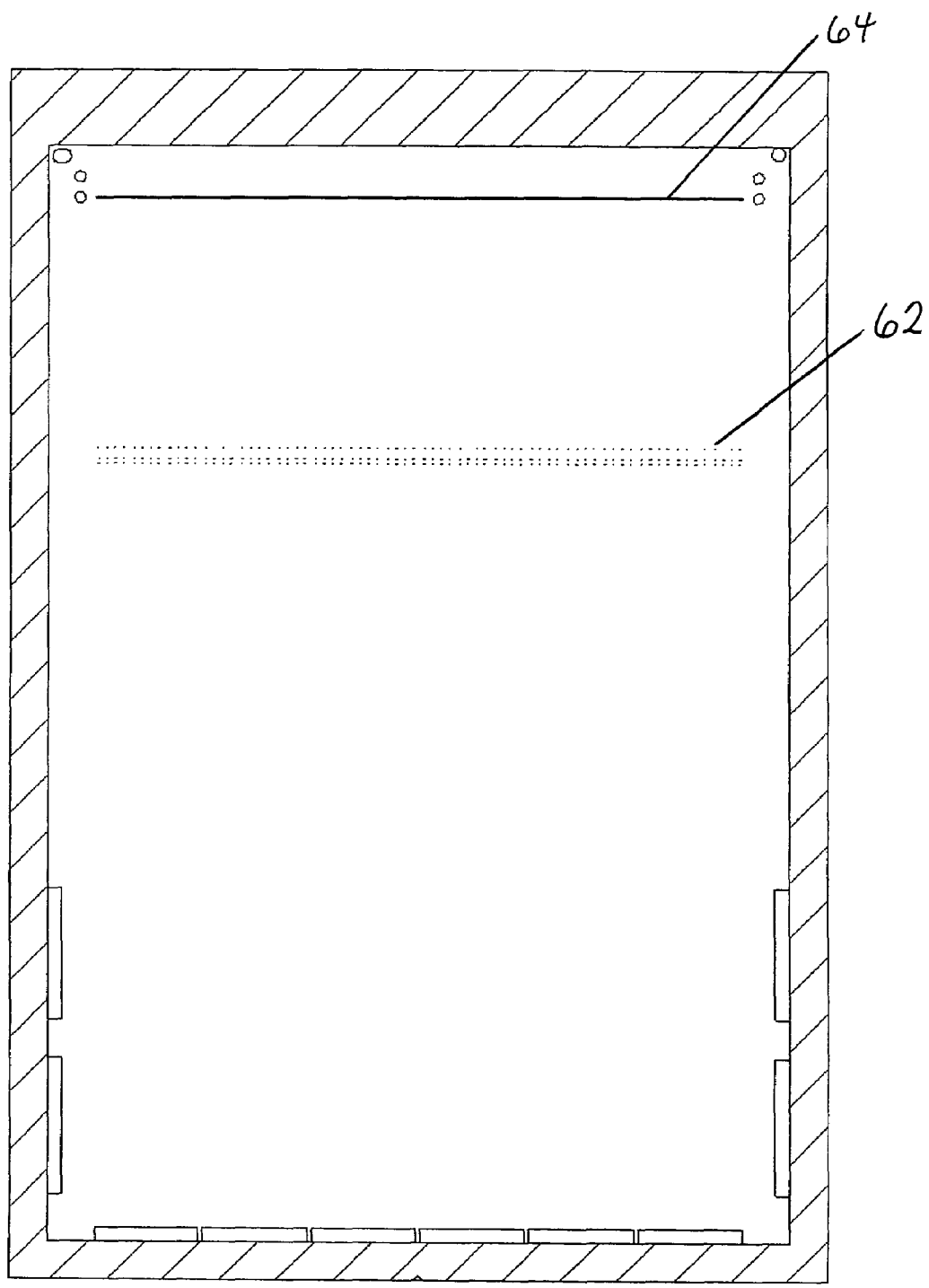

FIG. 8 illustrates a jet shim that acts as a wall shim between fuel and air stream in the manifold and heat exchanger zone. The thickness of this shim is 0.010". In the combustion zone, this shim provides passages 62 (referred as orifices) to mix air into fuel. For every channel (fuel or air), there are 18 orifices to mix air into fuel. Beginning from the bottom, the first orifice is rectangular slots with semi-circular ends of diameter 0.012". The longest length of the slot is in the direction of flow. The second orifice is equilateral triangular in shape with 0.012" side length and is placed at a distance of 0.133" from first orifice. The third & fourth orifices are of 0.012" diameter holes placed 0.267" from the first orifice. The fifth orifice is again a same triangular slot placed 0.386" from the first orifice. Orifice six to fifteen are circular holes with diameter 0.012" and are placed at 0.594", 0.769", 0.969", 1.168", 1.615", 2.112", 2.658", 3.257", 3.257", 3.857", 4.624" from the first orifice. Orifice sixteen and seventeen are 0.012" diameter holes place 5.392" from first orifice.

A continuous 0.050" slot 64 is made on the top of the shim to transport combusted fuel (exhaust) over to exhaust channel. This slot allows flow to travel between connecting channels in between the header and the footer.

Figure 9:
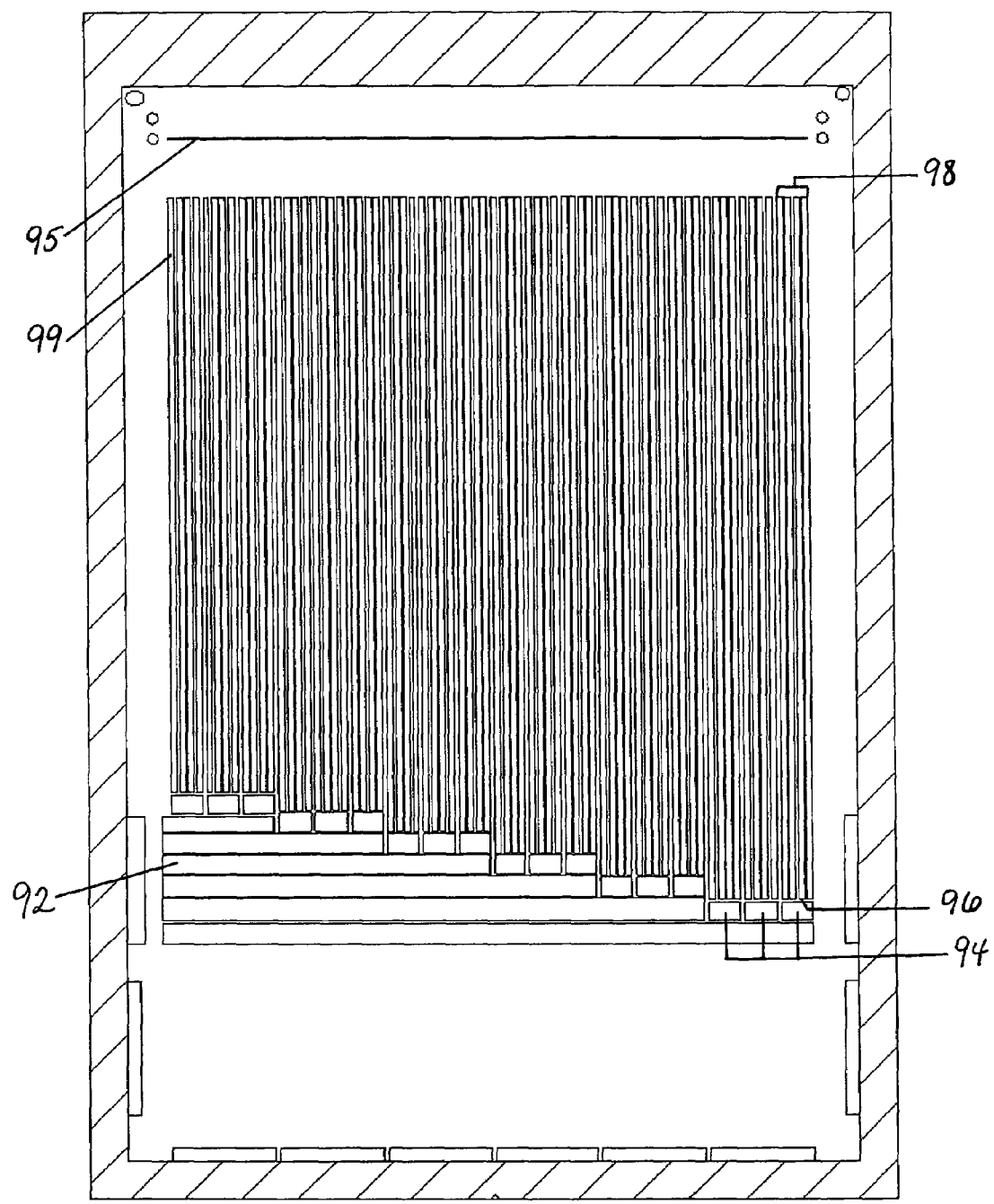

FIG. 9 shows the shim that forms the passage for the air stream. The thickness of the shim is 0.012". The slots on the shims form features for air stream. The air enters from the left end of the shim through 6 inlets 92 (referred as sub-manifolds). The widths of these sub-manifolds perpendicular to the direction of flow, starting from the bottom are 0.60", 0.60", 0.55", 0.50", 0.50" and 0.40". All six sub-manifolds are separated by a 0.060" rib. The lengths of the sub-manifolds in the flow direction, starting from the bottom are 16.93", 14.11", 11.29", 8.47", 5.65", and 2.83". The flow from each sub-manifold distributes into three super-channels 94 as shown in the drawing. The flow goes over 0.060" rib 96 to enter the super-channel from sub-manifolds. The length of super-channels in the direction of flow is 0.50". Each super-channel further divides the flow into four channels. These channels are separated by 0.060" ribs except for every 4th rib which is 0.120". All the channels 99 are 0.160" wide. The flow passes through the heat exchanger zone, receiving heat from exhaust and product stream and enters the combustion zone. In the combustion zone, air flows into the F1 (FIG. 4) and F2 shim (FIG. 5) through orifices 62 to combust the fuel. A continuous 0.050" tall slot 95 is made on the top of the shim to transport combusted fuel (exhaust) over to the exhaust channel.

Figure 10:
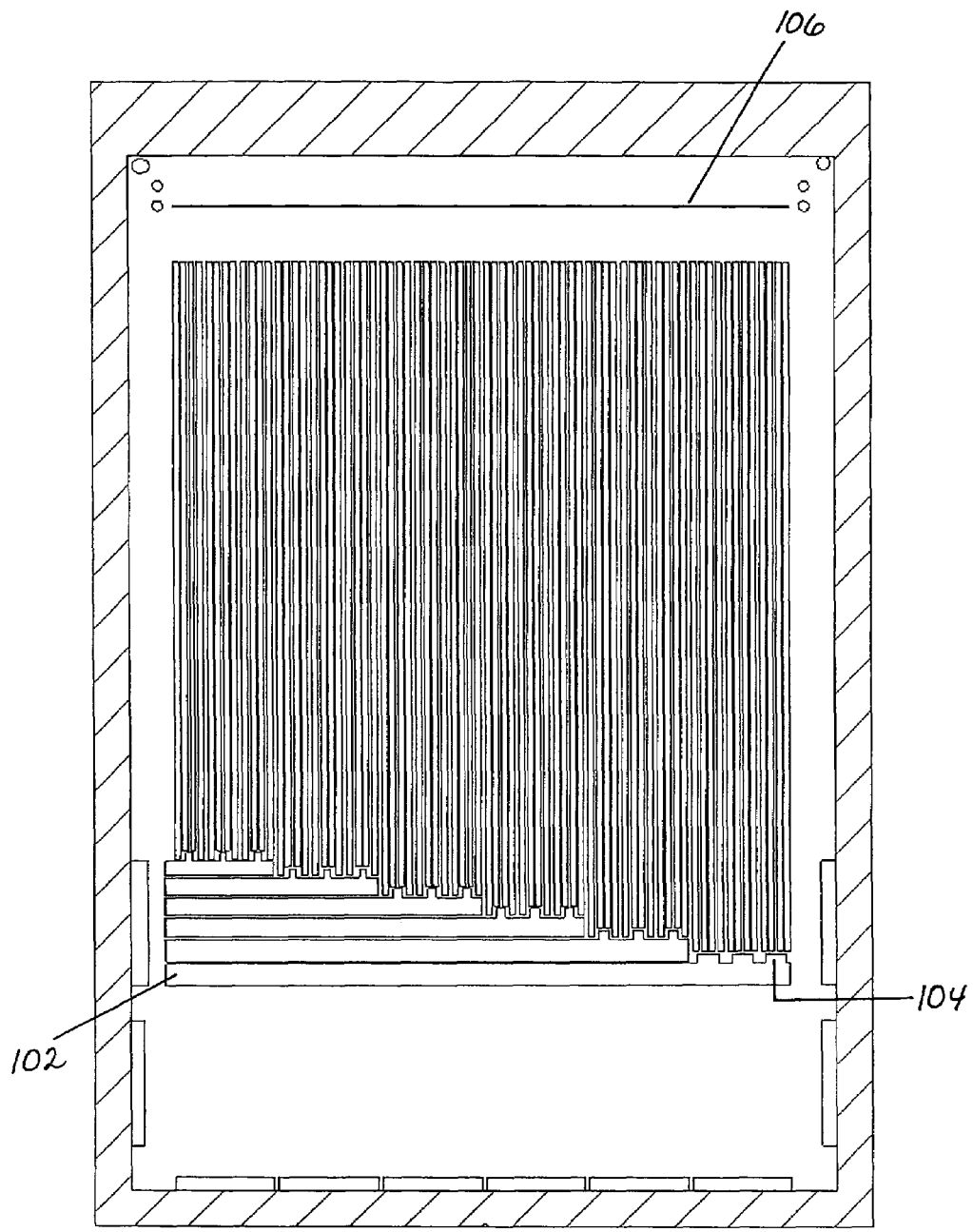

FIG. 10 shows another shim that forms the passage for the air stream in conjunction with the shim shown in FIG. 9. The thickness of the shim is 0.025". The slots on the shims form features for the air stream. The air enters from the left end of the shim through 6 inlets (referred as sub-manifolds). The widths of these sub-manifolds perpendicular to the direction of flow, starting from the bottom are 0.60", 0.60", 0.55", 0.50", 0.50" and 0.40". All six sub-manifolds are separated by a 0.060" rib. The lengths of the sub-manifolds in the flow direction, starting from the bottom are 16.93", 14.11", 11.29", 8.47", 5.65", and 2.83". The sub-manifolds have small openings (gates) to meter the flow into the channels. Each sub-manifold has 3 gates 104. There are total 18 gates to meter the flow into the channels. The length of the gates in the flow direction is 0.060". The widths of the gates starting from the right are −0.188", 0.175", 0.172", 0.165", 0.167", 0.167", 0.240", 0.235", 0.232", 0.260", 0.260", 0.260", 0.277", 0.277", 0.277", 0.590", 0.580", and 0.588". The channels are separated by 0.060" ribs except for every 4th rib which is 0.120". All the channels are 0.160" wide. The flow passes through the heat exchanger zone, receiving heat from exhaust and product stream and enters the combustion zone. In the combustion zone, air flows through the jet shim to react with the fuel in the fuel channels. A continuous 0.050" tall slot 106 on the top of the shim to transports combusted fuel (exhaust) over to exhaust channel.

Figure 11:
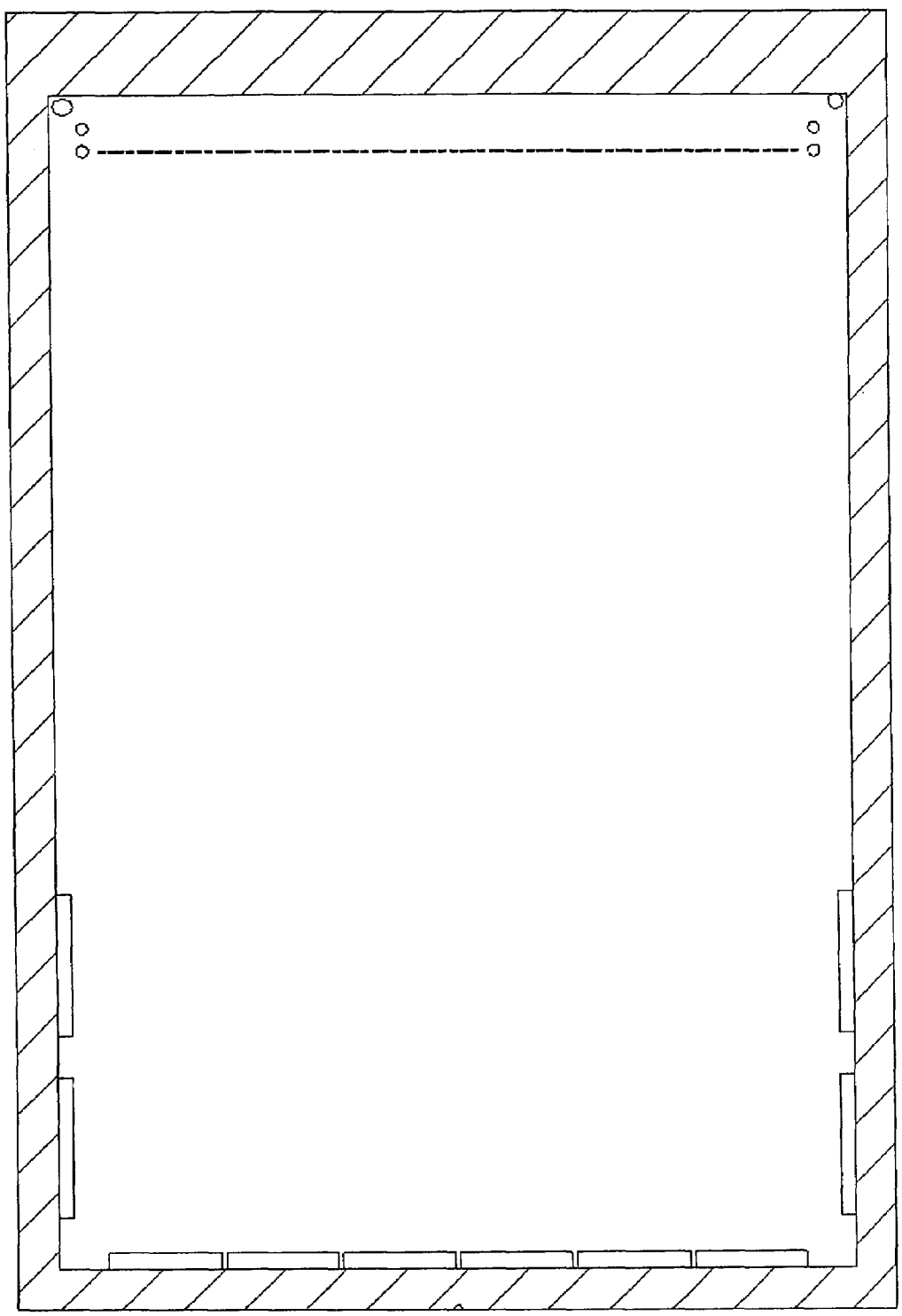

FIG. 11 shows a wall shim that separates the air stream from the exhaust stream. The thickness of the shim is 0.010". On the top of the shim there are slots through which combusted fuel (exhaust) passes over to the exhaust channel.

Figure 12:
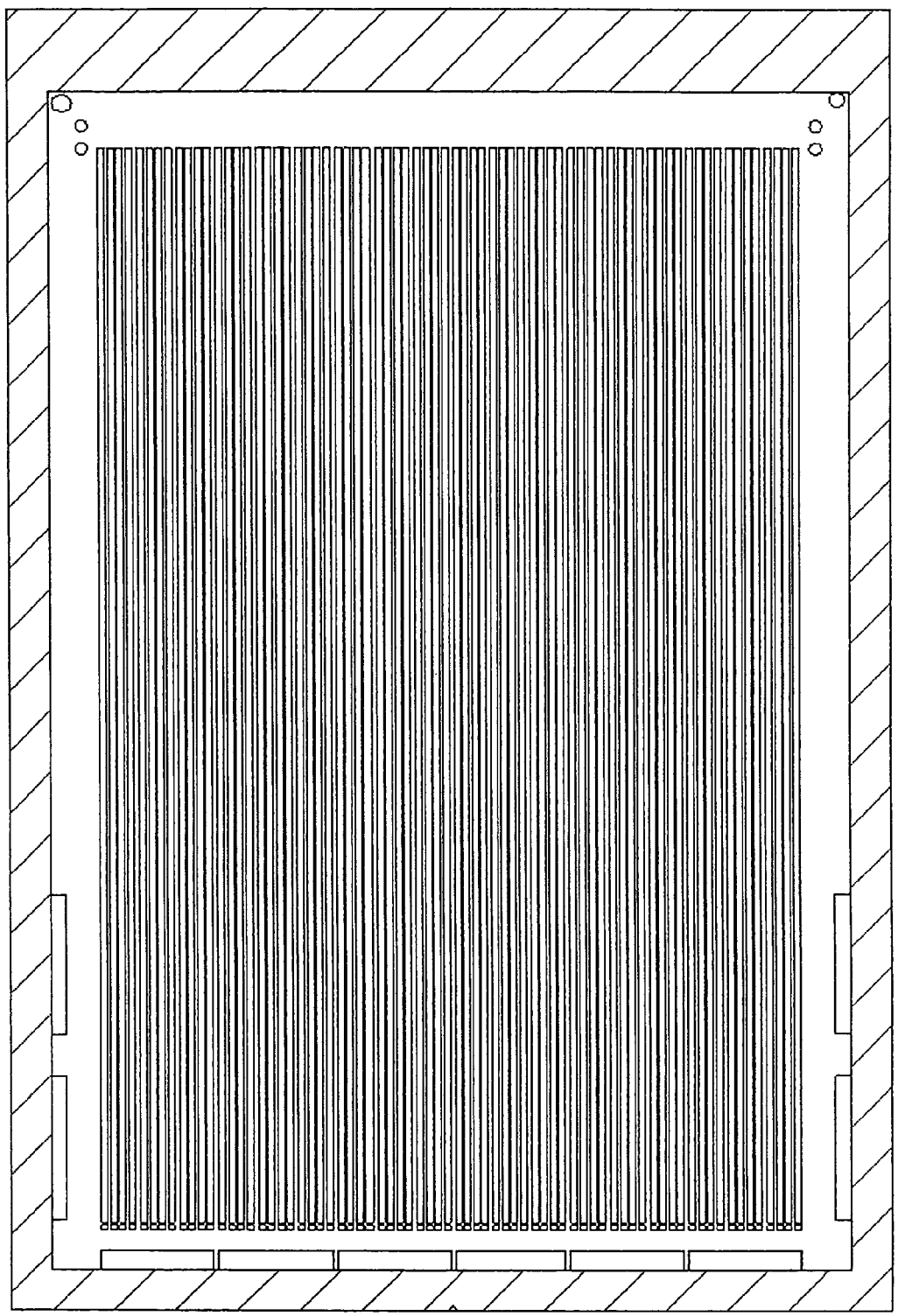

FIG. 12 shows a shim with exhaust stream channels. The thickness of the shim is 0.020". The exhaust stream flows from top of the shim to the bottom of the shim. All the passages for the flow are 0.160" wide and are separated by 0.060" ribs except for every 4th rib which is 0.0120". The exhaust enters a passage from a U-turn at the top of the shim, passes through the heat exchanger zone exchanging heat with fuel and air and flows out at the bottom of the shim.

Figure 13:
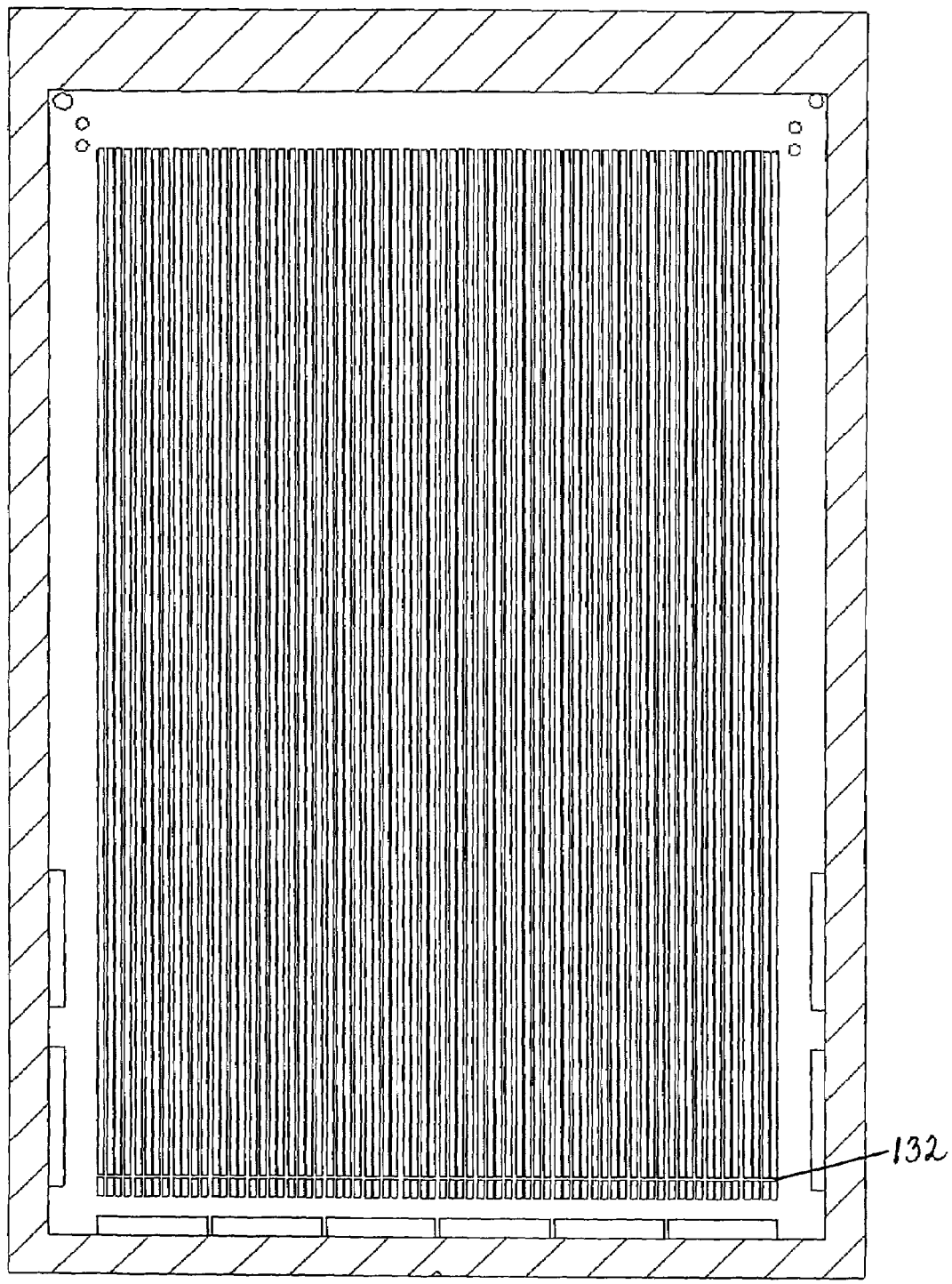

FIG. 13 shows a shim with exhaust stream channels that pair with the channels in the shim shown in FIG. 12. The thickness of the shim is 0.020". The exhaust stream flows from top of the shim to the bottom of the shim. All the passages for the flow are 0.160" wide and are separated by 0.060" ribs except for every 4th rib which is 0.0120". The exhaust enters at the top of the shim in the reactor zone, passes through the heat exchanger zone exchanging heat with fuel and air and flow out at the bottom of the shim. At the bottom, a rib 132 of 0.060" serves as support for bonding.

Another shim identical to the shim in FIG. 12 is stacked over the shim in FIG. 13.

Another shim identical to the shim in FIG. 11 is next in the shim stack. Followed by another shim identical to that shown in FIG. 10. Followed by another shim identical to that shown in FIG. 9. Followed by another shim identical to that shown in FIG. 8. Followed by another shim identical to that shown in FIG. 7. Followed by another shim identical to that shown in FIG. 6. Followed by another shim identical to that shown in FIG. 5. Followed by another shim identical to that shown in FIG. 4B.

Figure 14:
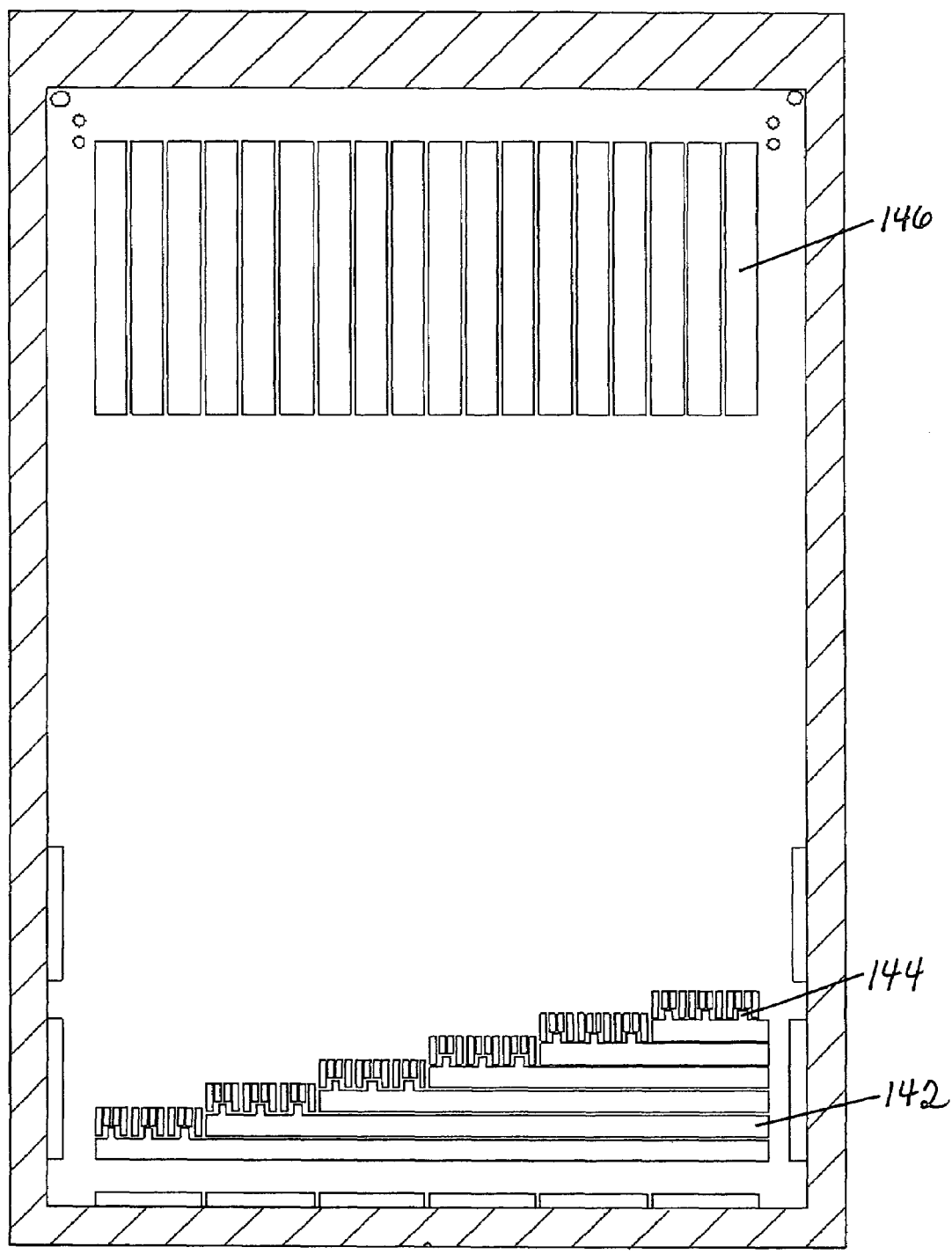

FIG. 14 shows the shim that forms the passage for reactant stream. The thickness of the shim is 0.010". The slots in the shim form passages for the flow of reactant stream. The reactant enters from the right end of the shim through 6 inlets 142 (referred as sub-manifolds). The widths of these sub-manifolds perpendicular to the direction of flow are 0.539". All six sub-manifolds are separated by 0.060" rib. The lengths of the sub-manifolds in the flow direction, starting from the bottom are 16.93", 14.11", 11.29", 8.47", 5.65", and 2.83". The sub-manifolds have small openings 144 (gates) to meter the flow into the channels. Each sub-manifold has 3 gates. There are a total 18 gates to meter the flow into the channels. The length of the gates in the flow direction is 0.060". The widths of the gates starting from the right are —0.229", 0.209", 0.173", 0.229", 0.209", 0.173", 0.229", 0.209", 0.173", 0.229", 0.209", 0.173", 0.229", 0.209", 0.173", 0.229", 0.209", and 0.173". The channels are separated by 0.060" ribs except for every 4th rib which is 0.120". All the channels are 0.160" wide. The length of the flow passage in the shim from the respective sub-manifold is 0.70". In the reactor zone, slots 146 (7.00" long and 0.82" wide) are made. The purpose of these slots is to hold the fins which provide surface area for steam-reforming reaction.

Figure 15:
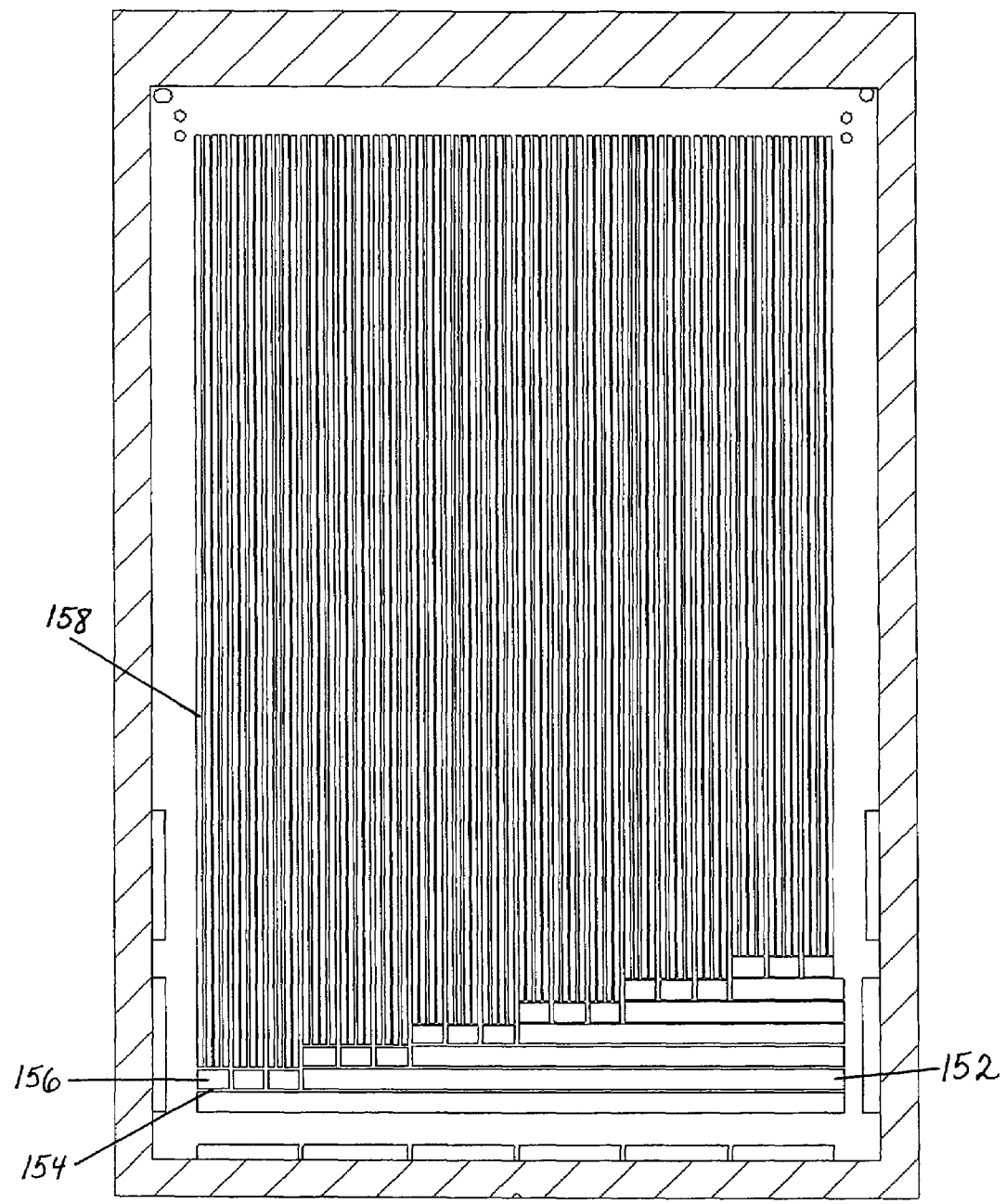

FIG. 15 shows another shim that forms the passage for reactant stream in conjunction with the shim shown in FIG. 15. The thickness of the shim is 0.012". The reactant enters from the right end of the shim through 6 inlets 152 (referred as sub-manifolds). The widths of these sub-manifolds perpendicular to the direction of flow are 0.539". All six sub-manifolds are separated by 0.060" rib. The lengths of the sub-manifolds in the flow direction, starting from the bottom are 16.93", 14.11", 11.29", 8.47", 5.65", and 2.83". The flow from each sub-manifold distributed into three super-channels as shown in the drawing. The flow goes over a 0.060" rib 154 to enter the super-channel 156 from sub-manifolds. The length of super-channels in the direction of flow is 0.539". Each super-channel further divides the flow into four channels 158. Channels are separated by 0.060" ribs except for every 4th rib which is 0.120". All the channels are 0.160" wide. The flow passes through the heat exchanger zone, receiving heat from product and exhaust stream and enters the reactor zone. In the reactor zone, the steam reforming reaction occurs in the presence of combustion heat.

Figure 16:
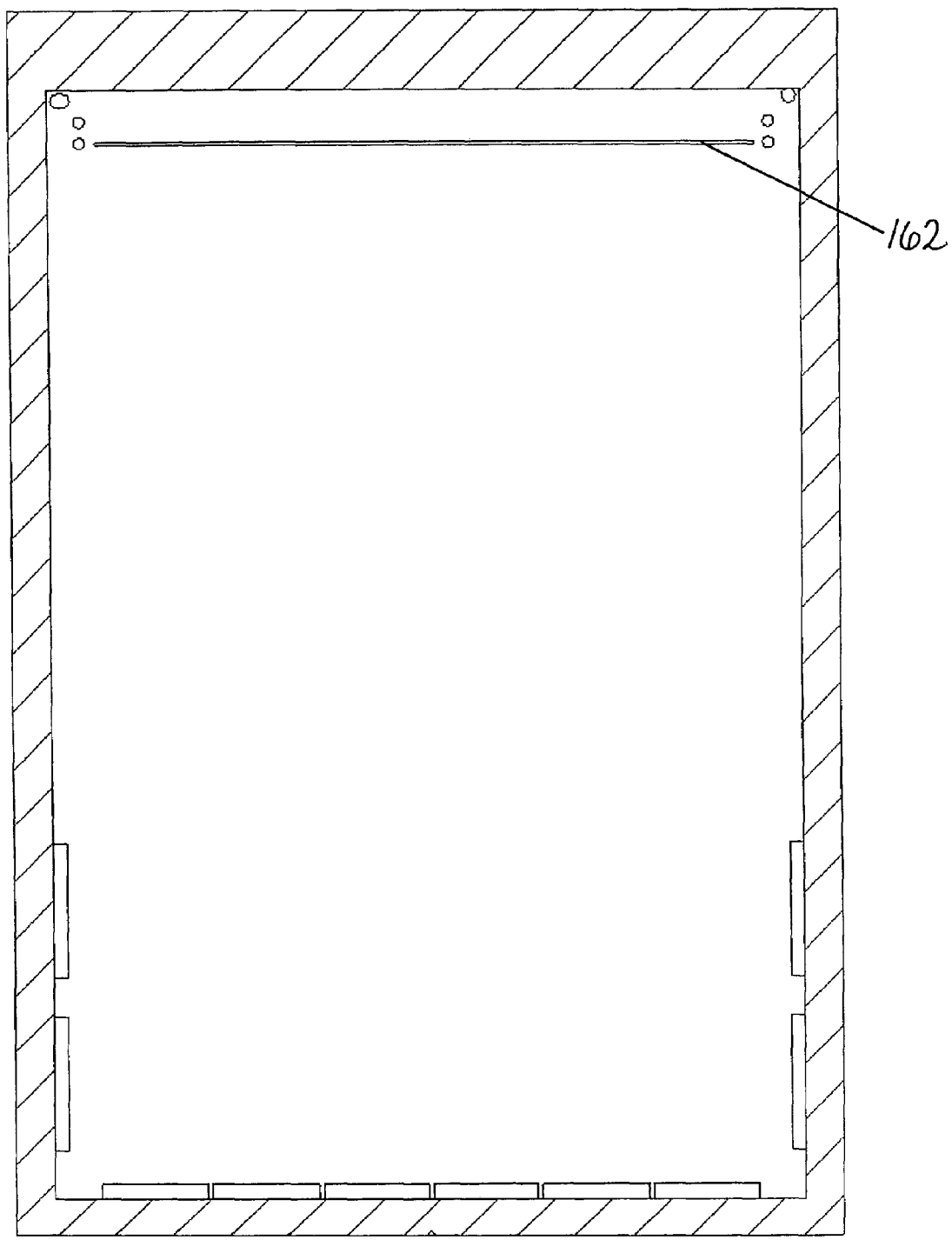

FIG. 16 shows a wall shim that separates the reactant stream from the product stream. The thickness of the shim is 0.010". A continuous 0.050" slot 162 is made on the top of the shim to transport products formed in the reactant channel over to the product channel.

Figure 17:
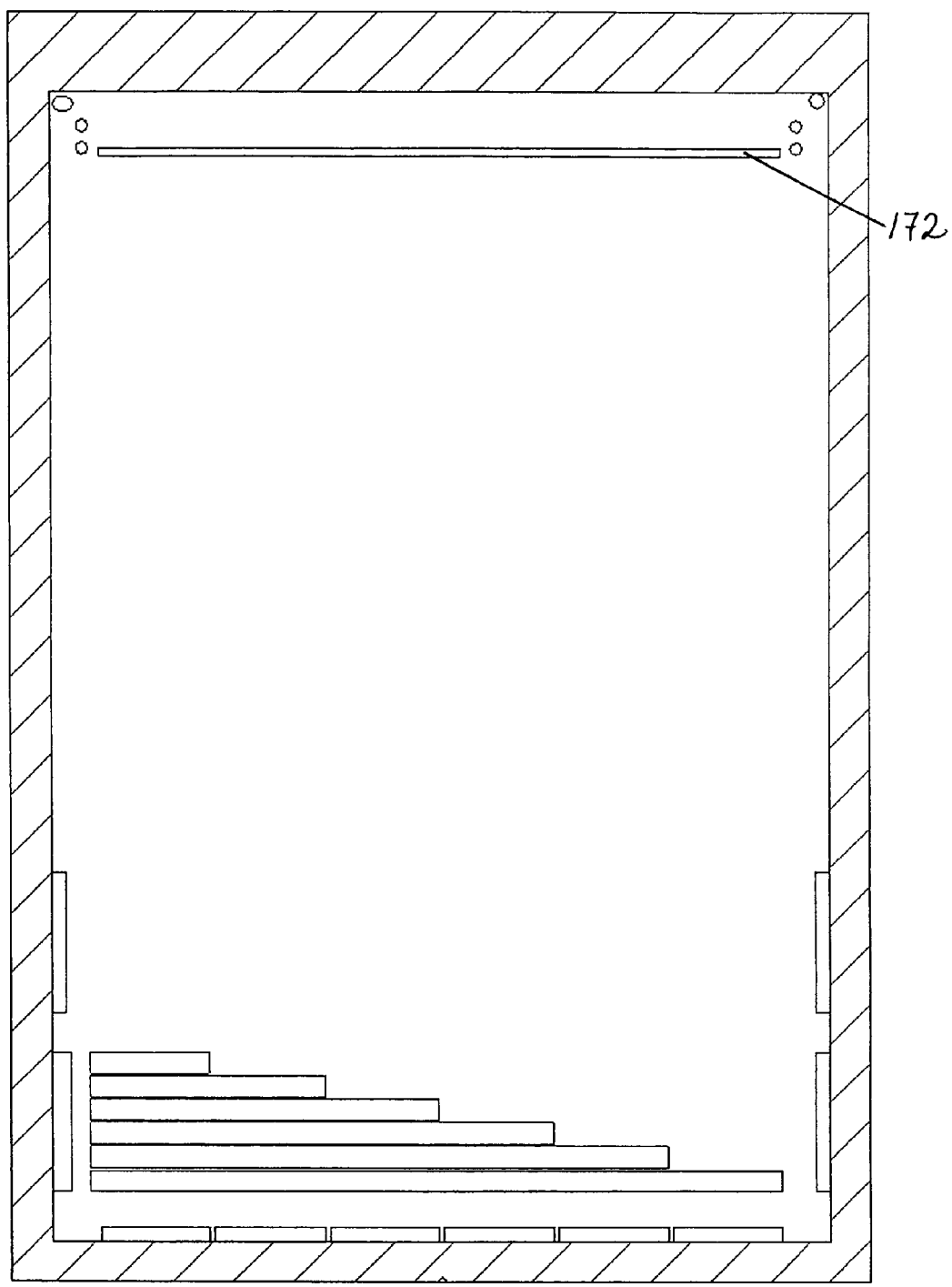

FIG. 17 shows the wall shim and separates the reactant stream from the product stream. The thickness of the shim is 0.010". A continuous 0.21" tall slot 172 is made on the top of the shim serves to transport products formed in the reactant channel over to the product channel.

Figure 18:
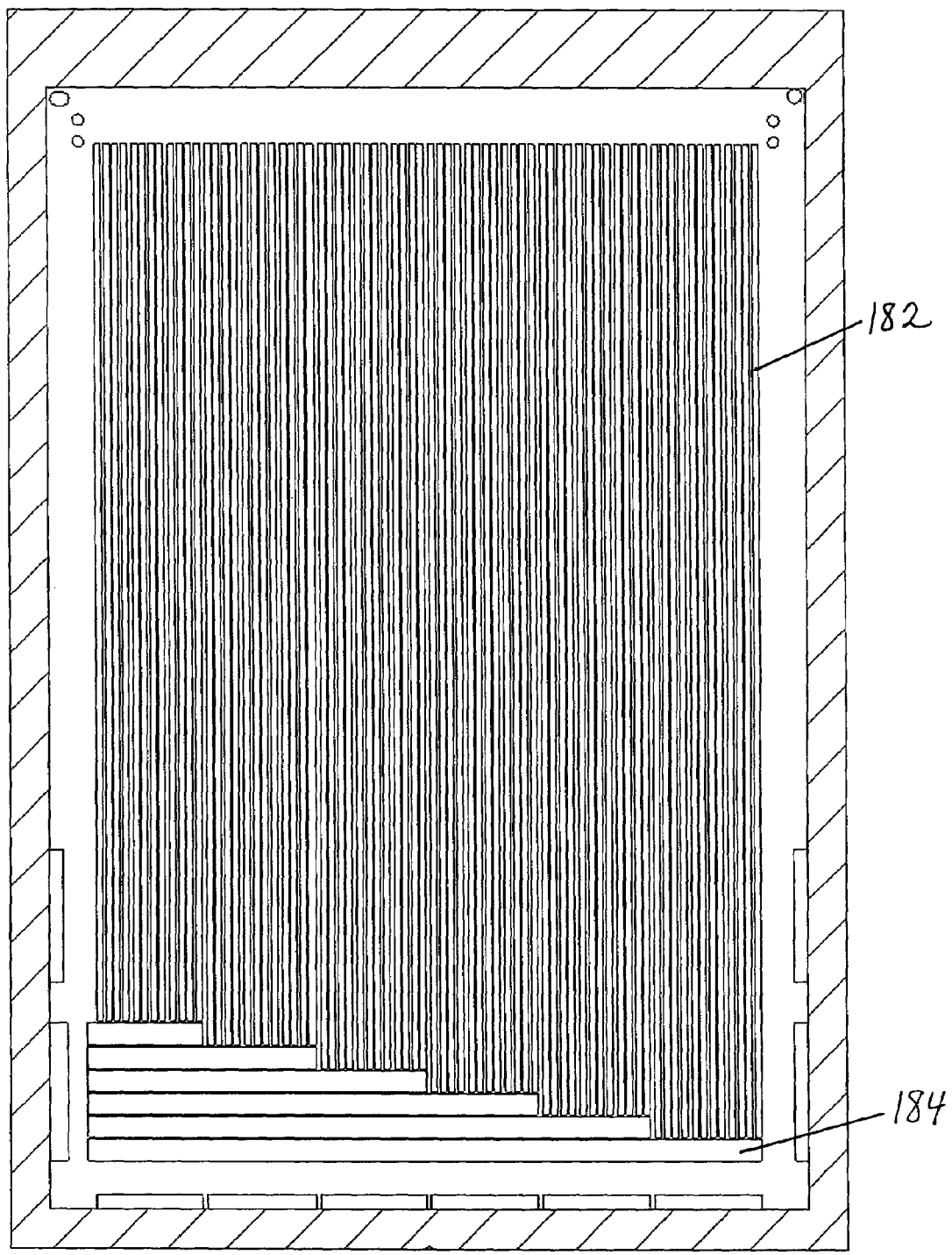

FIG. 18 shows a shim for product flow. The thickness of the shim is 0.018". The product flows in the passages from the top of the shim to the bottom of the shim. Passages are 0.160" wide and are separated by 0.060" rib except for every $4^{th}$ rib which is 0.120" wide. The flow from the passages is then collected in another set of passages 184 (referred as sub-manifold) that run perpendicular to first set of passages. These passages are separated from first set of passages by 0.060" ribs that in conjunction with shims in FIG. 17 and FIG. 19 form "grates". The width of each sub-manifold in the direction perpendicular to flow direction is 0.539". The lengths of sub-manifolds in the flow direction starting from bottom sub-manifold are 16.93", 14.11", 11.29", 8.47", 5.65", and 2.83".

Figure 19:
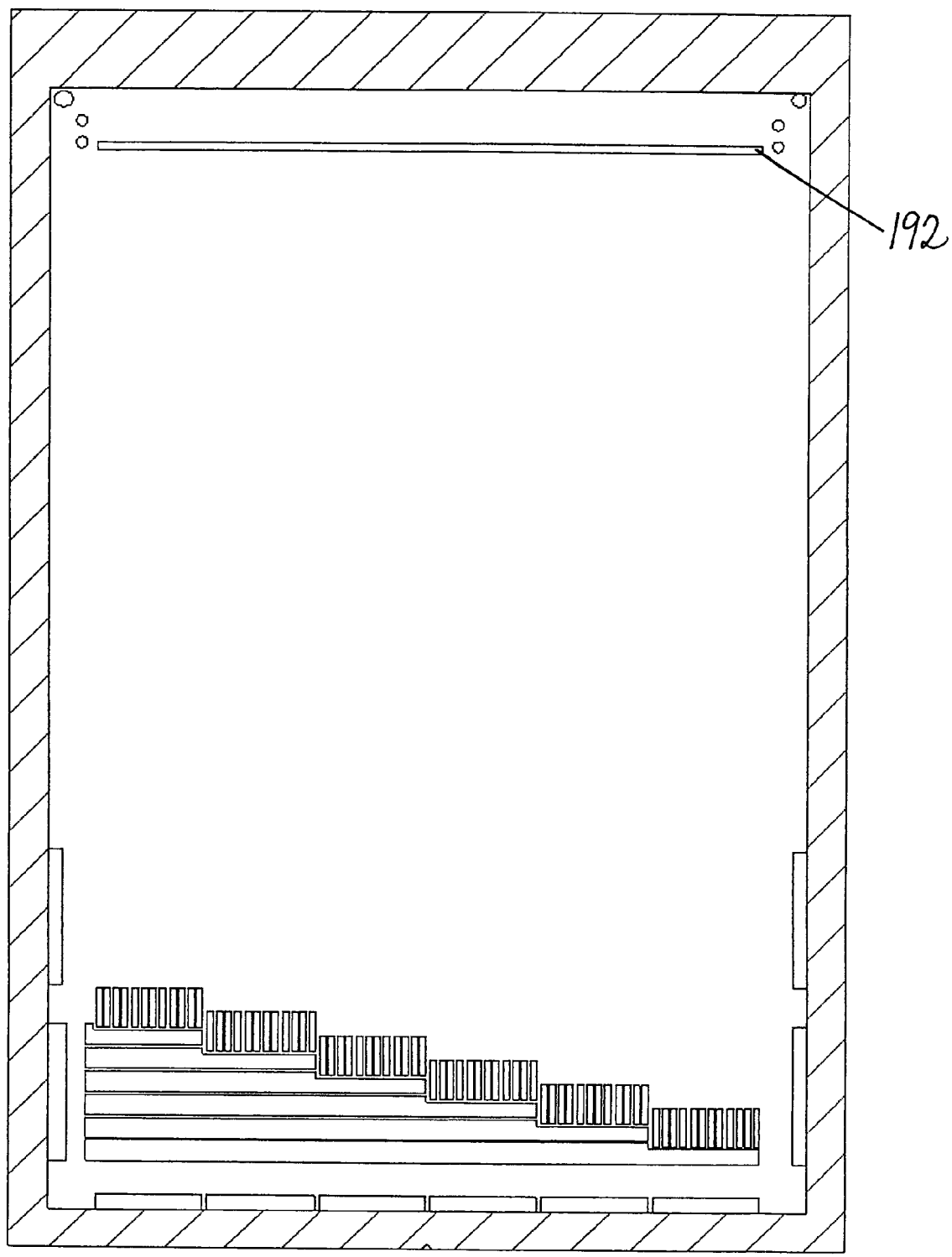

FIG. 19 shows a wall shim that separates reactant stream from product stream. The thickness of the shim is 0.010". A continuous 0.21" tall slot 192 is made on the top of the shim to transport products formed in the reactant channel over to the product channel.

Figure 20:
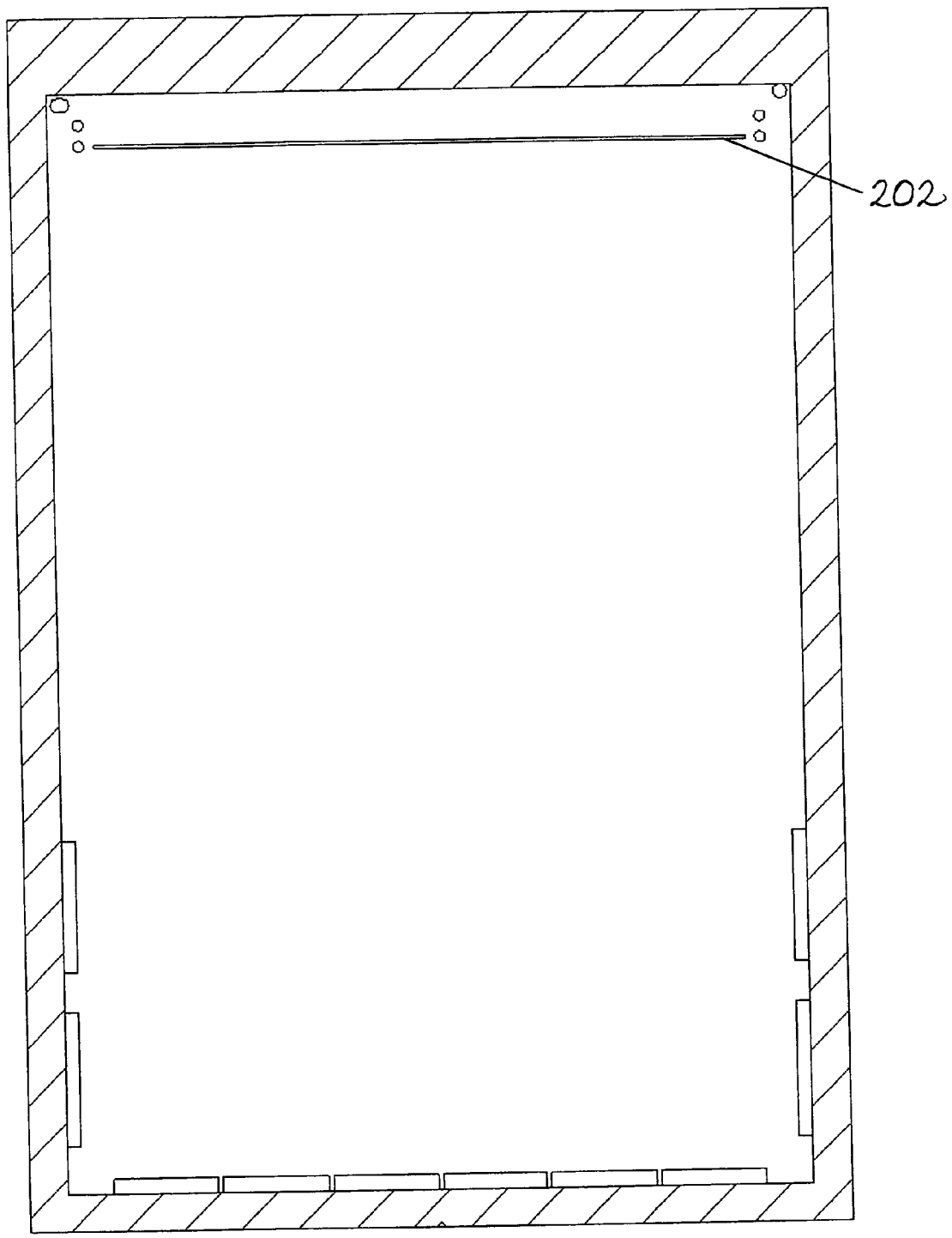

FIG. 20 shows a wall shim and separates reactant stream from product stream. The thickness of the shim is 0.010". A continuous 0.050" tall slot 202 is made on the top of the shim to transport products formed in the reactant channel over to the product channel.

Figure 21:
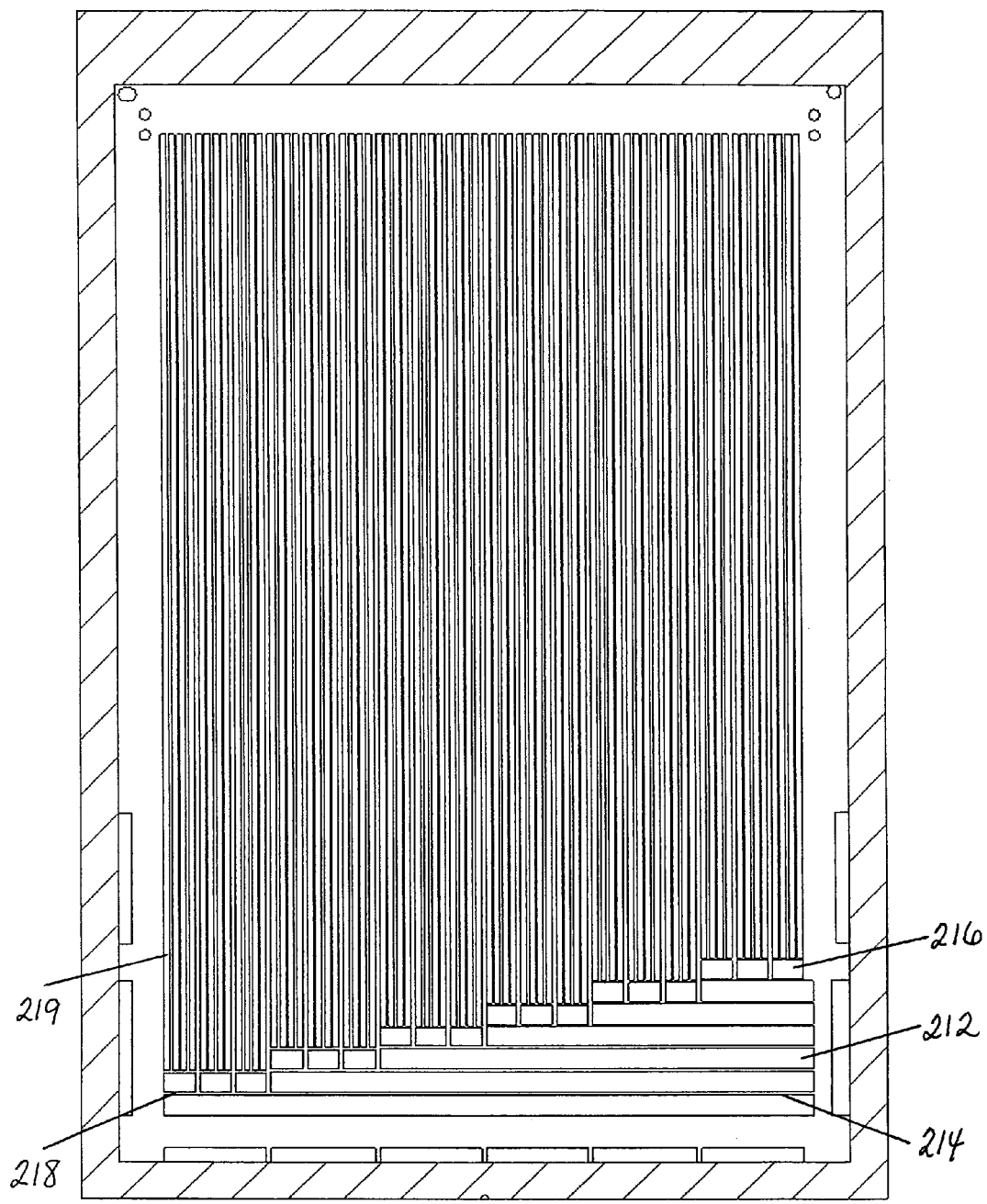

FIG. 21 shows the shim that forms the passage for reactant stream. The thickness of the shim is 0.012". The reactant enters from the right end of the shim through 6 inlets 212 (referred as sub-manifolds). The widths of these sub-manifolds perpendicular to the direction of flow are 0.539". All six sub-manifolds are separated by 0.060" ribs 214. The lengths of the sub-manifolds in the flow direction, starting from the bottom are 16.93", 14.11", 11.29", 8.47", 5.65", and 2.83". The flow from each sub-manifold distributed into three super-channels 216 as shown in the drawing. The flow goes over a 0.060" rib 218 to enter the super-channel from sub-manifolds. The length of super-channels in the direction of flow is 0.539". Each super-channel further divides the flow into four channels 219. Channels are separated by 0.060" ribs except for every 4th rib which is 0.120". All the channels are 0.160" wide. The flow passes through the heat exchanger zone, receiving heat from product and exhaust stream and enters the reactor zone. In the reactor zone, the steam reforming reaction occurs in the presence of combustion heat.

Figure 22:
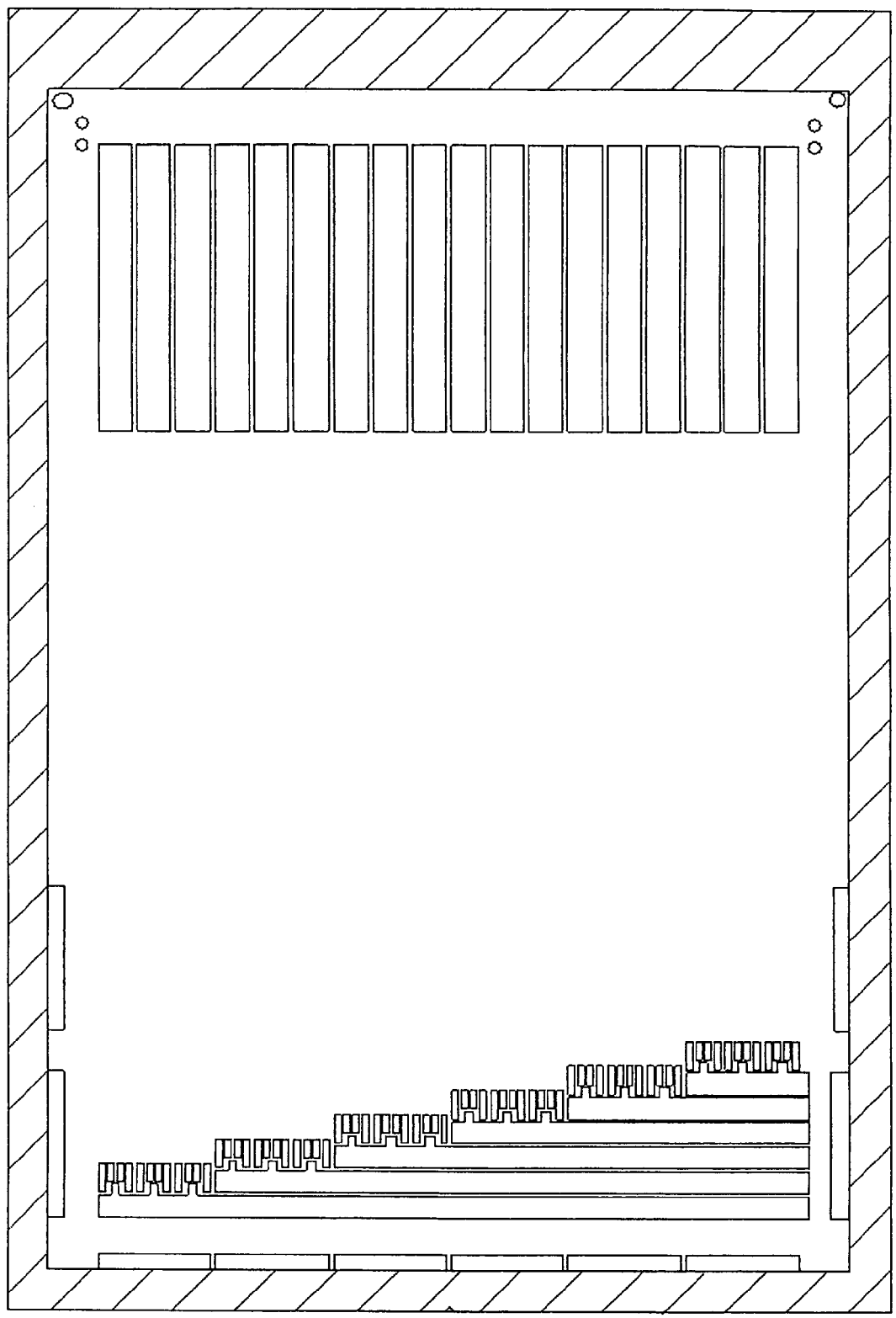

FIG. 22 shows a drawing of a shim that in conjunction with shim in FIG. 21 forms the flow channels for reactant stream. The slots in the shim form passages for the flow of reactant stream. The reactant enters from the right end of the shim through 6 inlets (referred as sub-manifolds). The widths of these sub-manifolds perpendicular to the direction of flow are 0.539". All six sub-manifolds are separated by 0.060" rib. The lengths of the sub-manifolds in the flow direction, starting from the bottom are 16.93", 14.11", 11.29", 8.47", 5.65", and 2.83". The sub-manifolds have small openings (referred as orifices) to meter the flow into the channels. Each sub-manifold has 3 orifices. There are total 18 orifices to meter the flow into the channels. The length of the flow opening in the flow direction is 0.060". The widths of the openings starting from the right are −0.229", 0.209", 0.173", 0.229", 0.209", 0.173", 0.229", 0.209", 0.173", 0.229", 0.209", 0.173", 0.229", 0.209", 0.173", 0.229", 0.209", and 0.173". The channels are separated by 0.060" ribs except for every 4th rib which is 0.120". All the channels are 0.160" wide. The length of the flow passage in the shim from the respective sub-manifold is 0.70". In the reactor zone, slots (7.00" long and 0.82" wide) are made. The purpose of these slots is to hold the fins which provide surface area for steam-reforming reaction.

Manifolding and Microchannel Features

Cross-sectional area restrictions in gates and grates, preferably at the front of connecting channels, can be formed, for example, by: holes through walls, bumps from a lower surface, wall projections, and combinations of these. Features such as rounded bumps can be formed by etching.

Manifold walls can be rounded (such as to appear like a race track). Flow into a manifold can enter from above or below; and, in many preferred embodiments, in-plane, such as from a side header attached to the side of a laminated shim stack. Manifold walls can be solid or with gaps.

Figure 23:
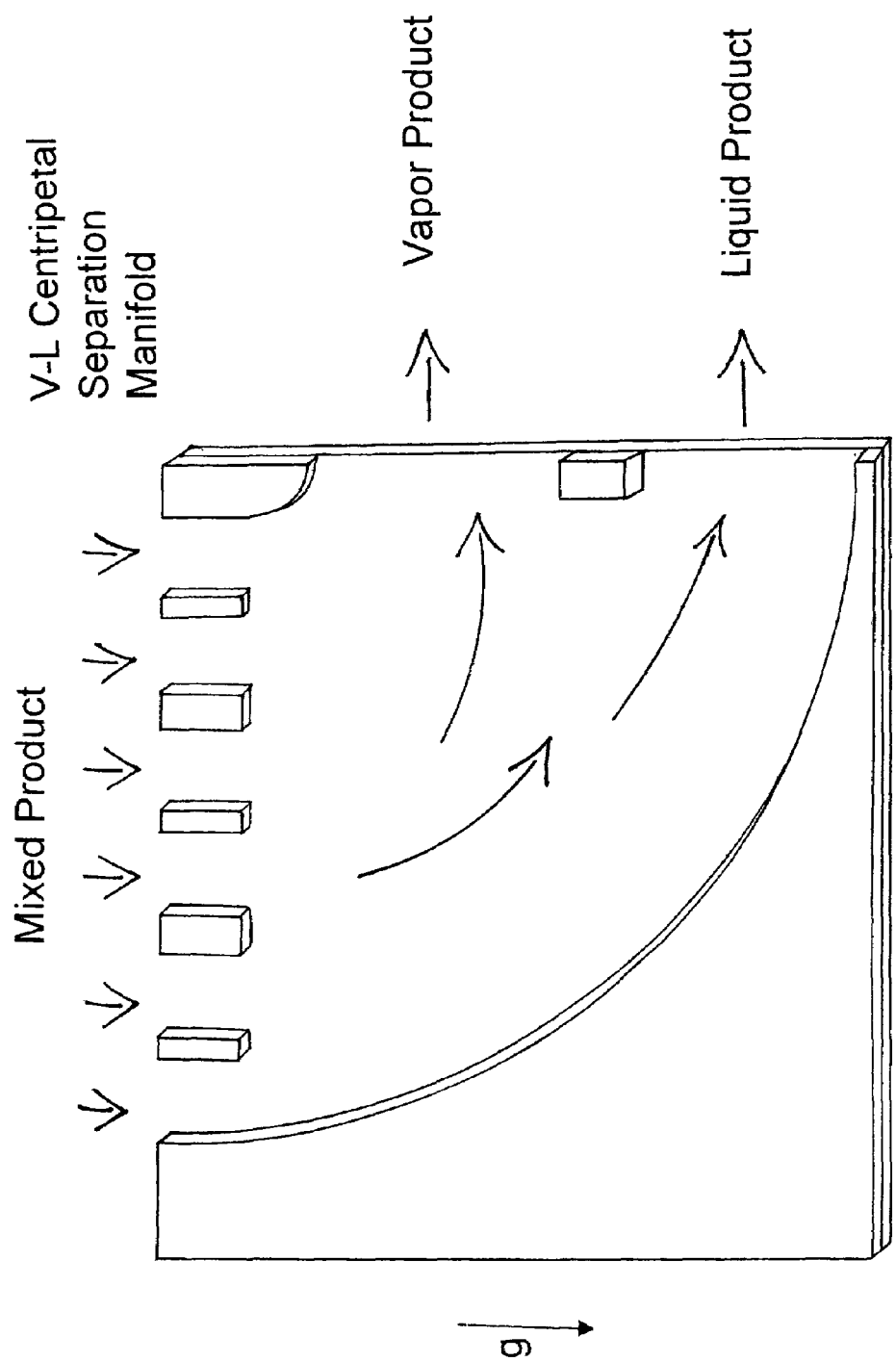
FIG. 23 illustrates a manifold used to separate phases.

In some embodiments (see FIG. 23), a manifold (in the illustrated case, a footer) can be used to separate two phases of differing density in a microchannel device by gravity and/or centrifugal forces.

Walls between connecting channels may be the same or different lengths. Gates to groups of channels can be centered or offset from the center of the gate's connecting channels.

Figure 24:
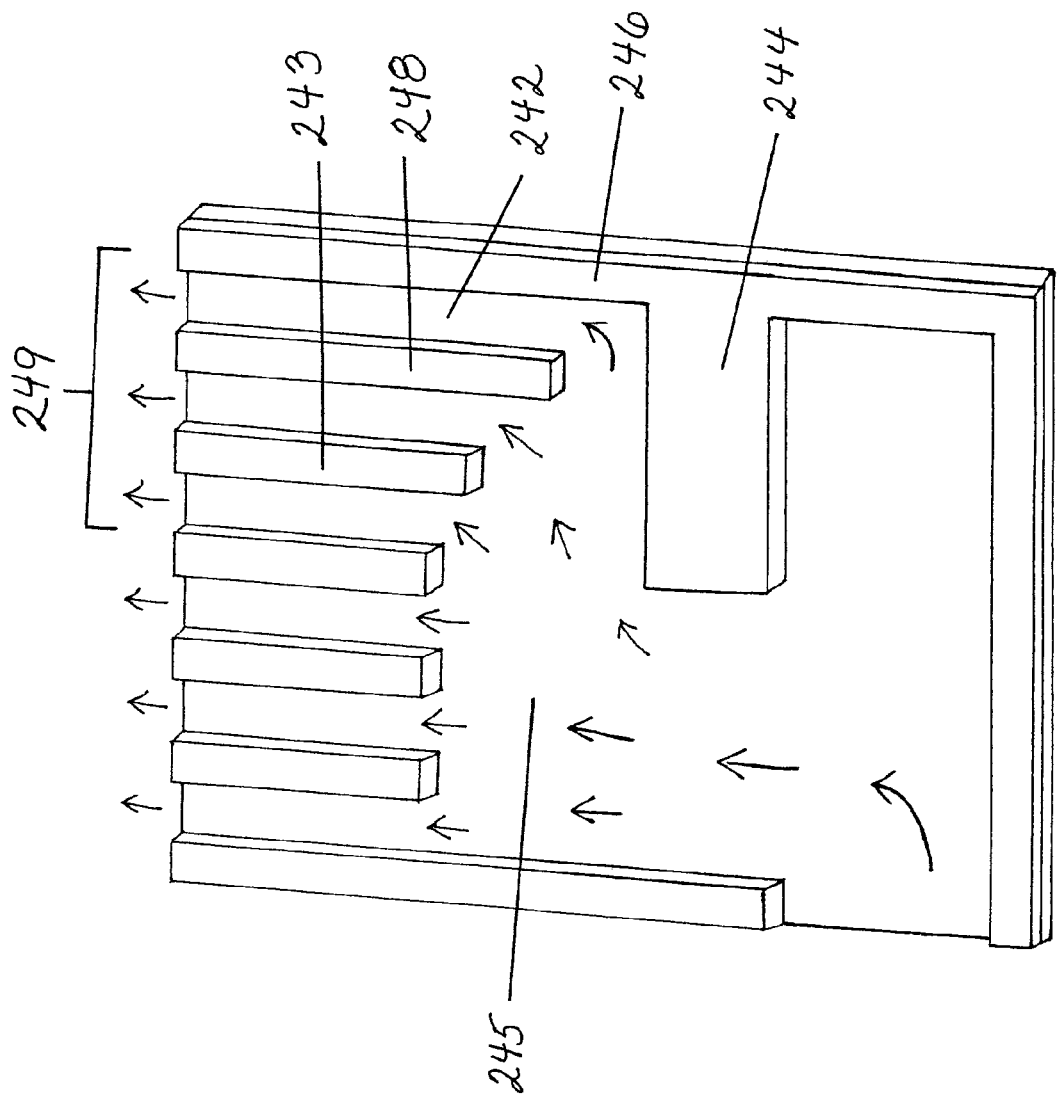
FIG. 24 illustrates a manifold with gates of decreasing channel width in the direction of manifold flow to obtain a more equal flow distribution.

FIG. 24 illustrates a manifold structure with an offset gate and channels of differing lengths. In the illustrated manifold, flow momentum (of a stream entering from the side of the connecting channels) for a centered gate would tend to force the greatest flow through downstream channel 242 on the far right side due to the incoming stream coming from left to right; however, the gate 244 positioned in the downstream portion of the manifold (in the illustrated embodiment, the gate is attached to the downstream manifold wall 246) blocks a portion of the flow. Another feature that can be used independently of or in conjunction with offset gates are longer internal walls 248 (not 246) positioned downstream (relative to the direction of flow into the manifold) to restrict flow. Thus, flow is more equally distributed through the connecting channels. In preferred embodiments, at least one internal channel wall in the downstream section 249 of a connecting channel set is longer than a channel wall in the upstream section. More preferably, at least two (or at least 4) internal channel walls in the downstream section 249 of a connecting channel set are longer than a channel wall in the upstream section. Still more preferably, the downstream section 249 of a connecting channel set contains at least two internal channel walls 243, 248 that project progressively further into a manifold zone 245. Preferably, there are a combination of an offset and at least one internal channel wall in the downstream section 249 of a connecting channel set longer than a channel wall in the upstream section, since this combination can provide more equal flow distribution (smaller $Q_1$ or $Q_2$) for large flow rates than either feature individually. In this embodiment, "longer" means projecting the channel further into a manifold zone 245. A similar design concept can also be used for the footer. When the steams of two or more connecting channel combine at a manifold connection, the stream from the connecting channel farthest from the footer manifold's outlet will have a larger momentum vector in the manifold's flow direction than those connecting channel closer to the manifold's exit. This will lower the flow resistance for the farthest away channel for leaving the manifold connection, so to balance the flow leaving the channels we can then vary the geometry around the channel as described above for 242.

Figure 25A:
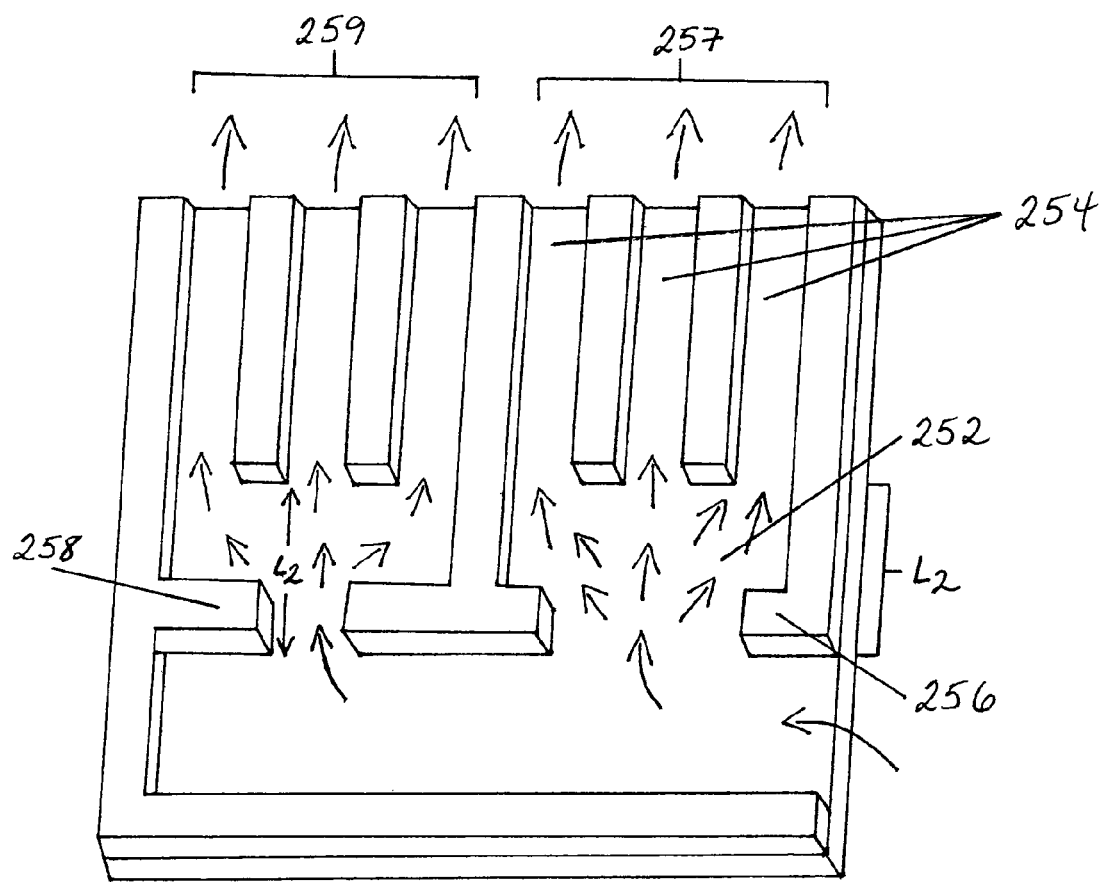
FIG. 25$a$ illustrates a design with gates and submanifold zones.

FIG. 25a illustrates flow straightening in a multiple gate configuration. Flow enters from the side and is momentum biased toward flow through the downstream portion of the connecting channels. Gates 256, 258 can be used to equalize flow between channel sets 257, 259. Flow through connecting channels 254 can be equalized by extending the length of a manifold zone a distance $L_2$ (or, in the case of FIG. 25a, a submanifold zone 252). Preferably, the zone has a length $L_2$ of at least three times longer than the manifold length $L_{M2M}$ (see FIG. 1A) in the flow direction, in some embodiments at least 6 times longer than the manifold length $L_{M2M}$, in some embodiments, to save space $L_2$ is 20 times or less longer than the manifold length $L_{M2M}$. Unless corrected by other means, shorter zones suffer from biased flow while excessively long zones may unnecessarily add cost and reduce performance (for example, by adding frictional losses). Like all features described herein, this feature can be combined with the other designs described herein.

Figure 25B:
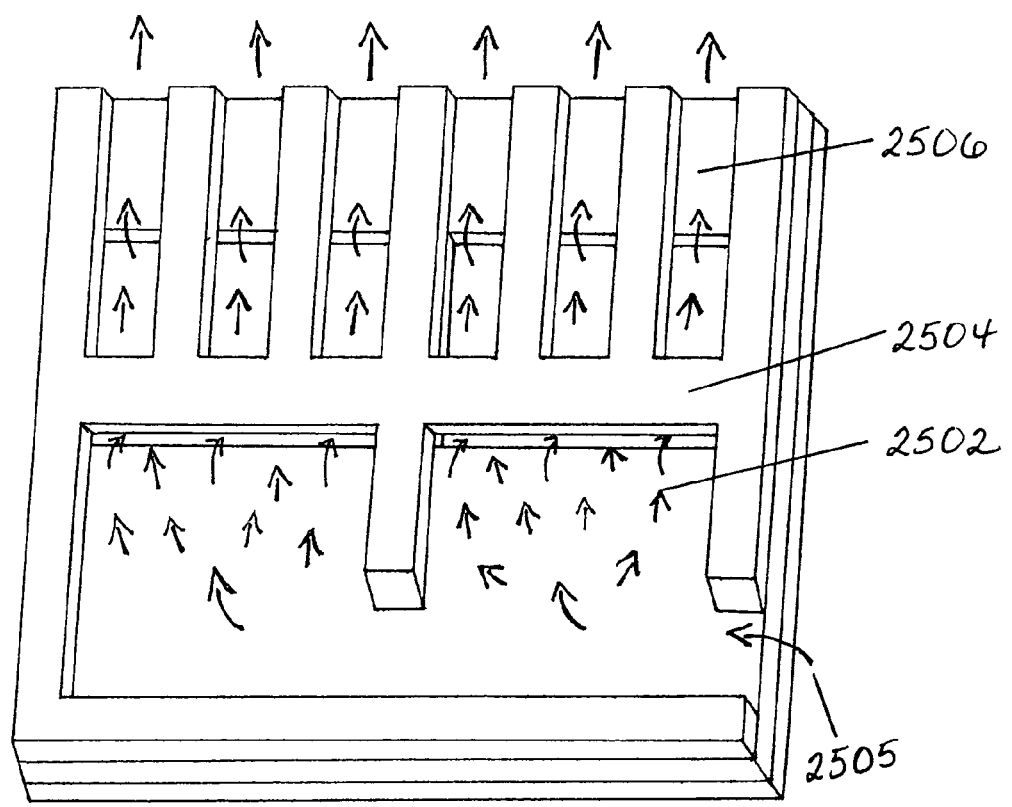
Figure 25C:
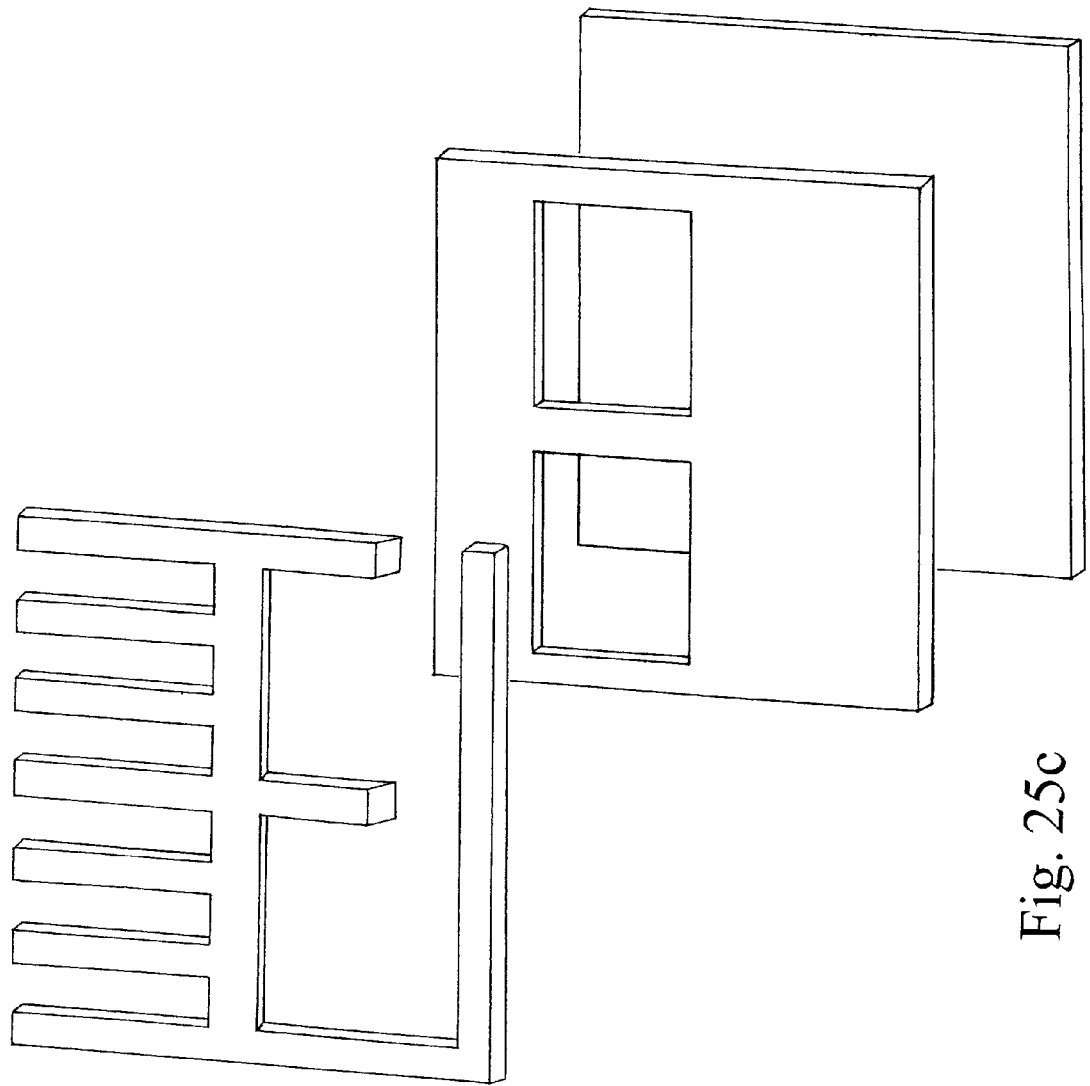

FIG. 25b shows a manifold with a straightening zone 2502 and a flow bump (a grate) 2504 before the entrance of the connecting channels 2506. Entering stream 2505 may come from a side manifold in which flow emanates from above, below, or in the plane. FIG. 25c is an exploded view of sheets that can be used to form the manifold/channel structure.

Figure 26A:
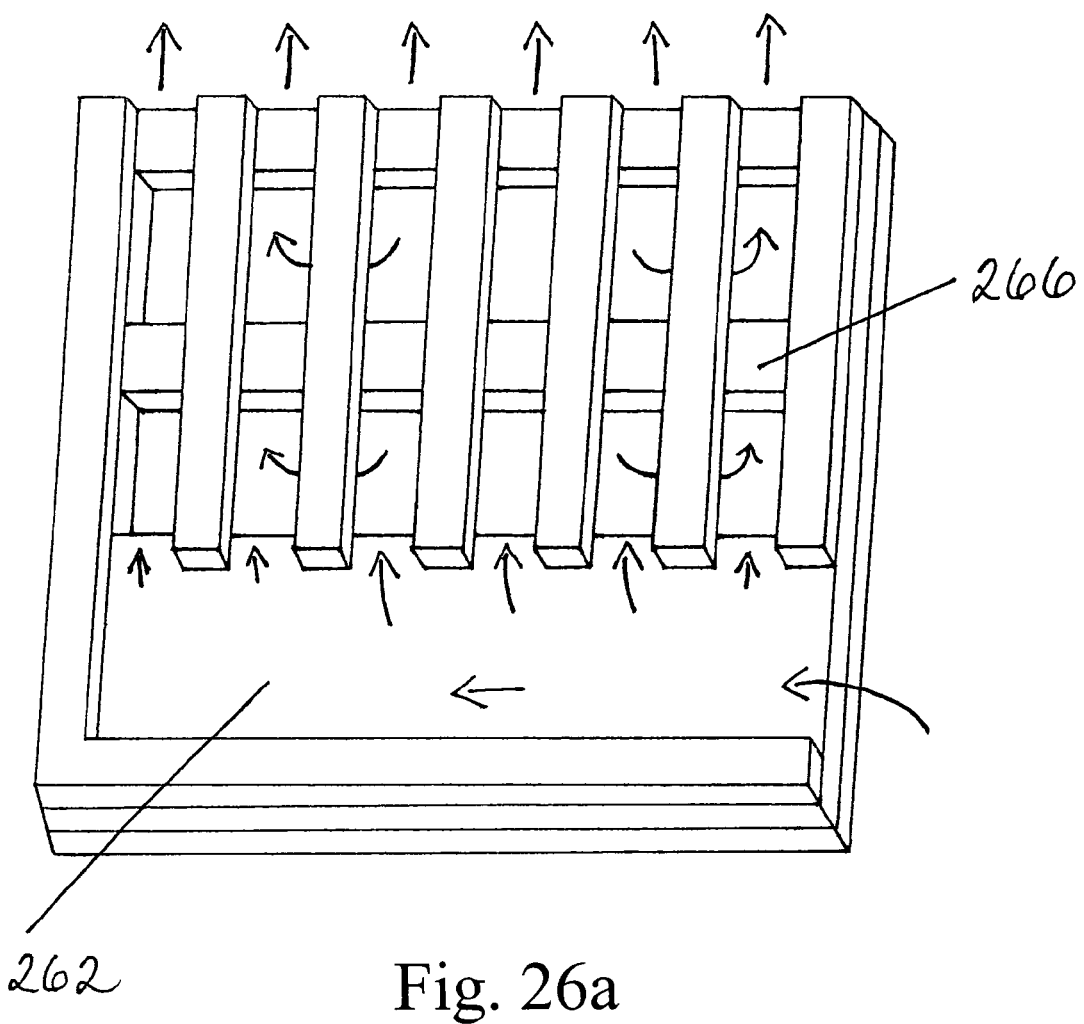
FIGS. 26$a$, 26$b$ and 27 illustrate flow bumps in channels made by a shim construction.
Figure 26B:
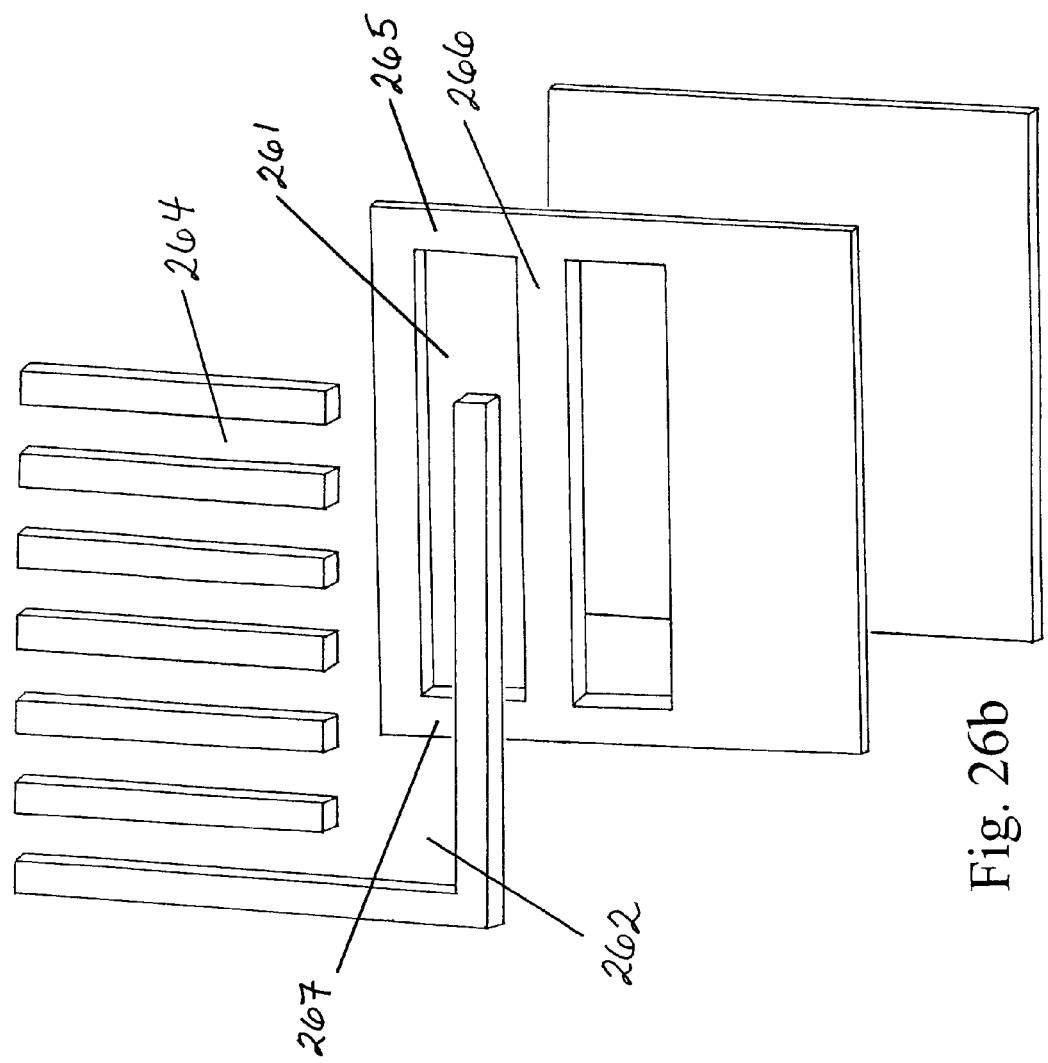

FIGS. 26a and 26b illustrate a manifold 262 with straight connecting channels 264. The connecting channels are partially blocked by flow bumps 266. The flow enters the connecting channels from the manifold, but can redistribute amongst channels through the cross-connecting channels underneath the connecting channels. Two such cross-connecting channels are shown in FIG. 25a, made by the layer 266. The advantage for such a system is that cross-connecting channels in 266 can allow for redistribution of flow should manifold design not allow for acceptable distribution due to space constraints.

A modified version of the structure of FIG. 26 could be microchannel apparatus, comprising: an array of parallel microchannels disposed in a plane; wherein the array of parallel microchannels are connected at one end by an inlet manifold and at their opposite end by an outlet manifold; and at least one channel disposed above or below the array of parallel microchannels and disposed at an angle of at least 20 degrees (preferably substantially 90 degrees) relative to the parallel microchannels and disposed between the inlet manifold and outlet manifold and connected via openings to the parallel microchannels in the array. Such a structure could be obtained by forming connections through the walls 265, 267 of second channel 261. The connections through the walls 265, 267 would connect to an inlet and outlet respectively so that there could be cross flow through the second channel. In some embodiments (not shown) a plate can separate the first and second layers except for an aperture or apertures through the plate to provide communication between the first layer and the second channel. Such a construction could be used, for example, to mix components or as a pathway to add a coating material from one layer to the next.

Figure 27:
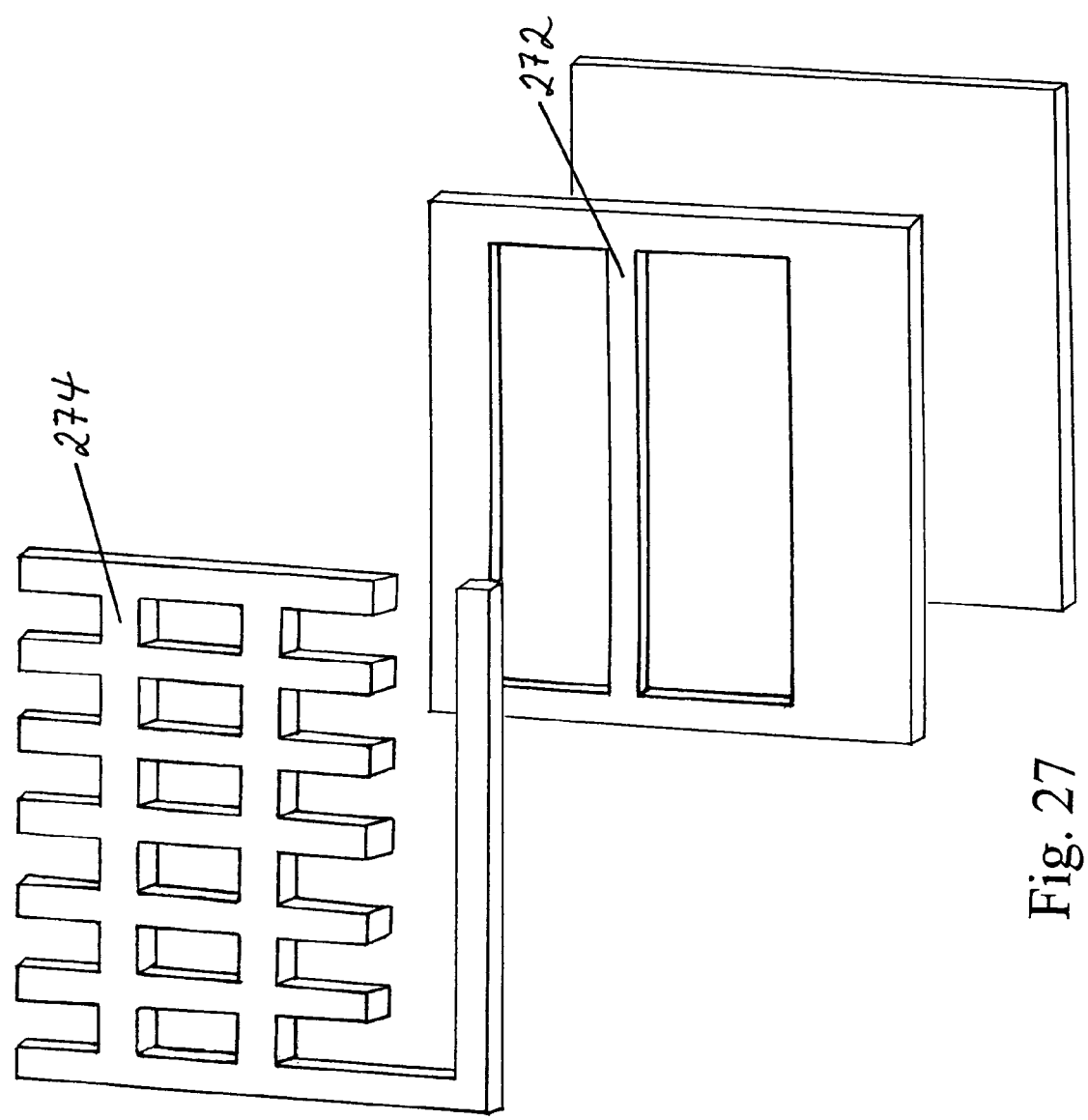

FIG. 27 is an exploded view (also a preassembled view) of an alternative design having flow bumps 272, 274 in an alternating arrangement such that there is no straight flow path through the connecting channels. This structure creates extensive interchannel mixing.

Figure 28:
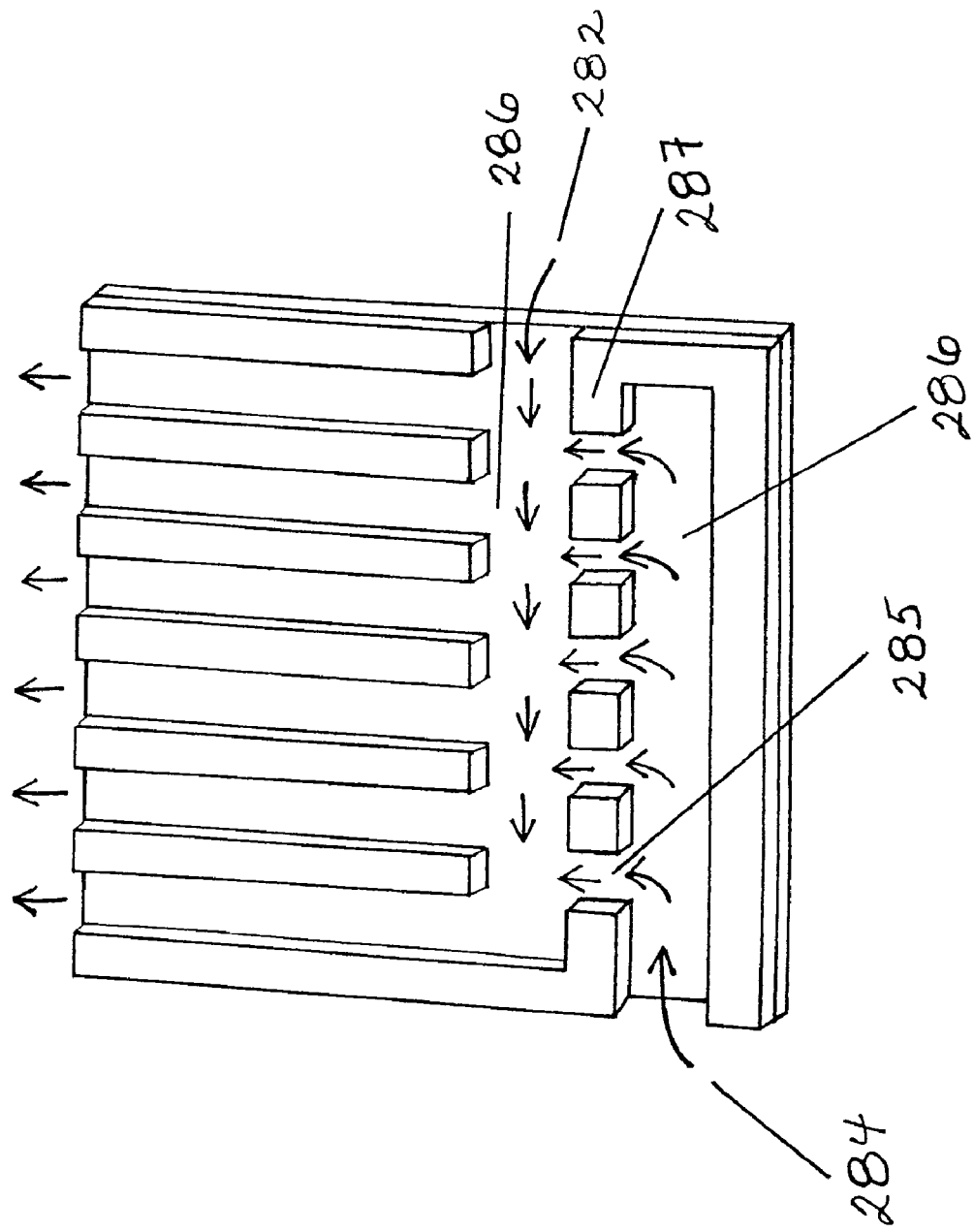
FIG. 28 illustrates a cross flow manifold with openings for mixing.

In addition to flow distribution, manifolds may also perform a mixing function. FIG. 28 illustrates a manifold with cross-current flows 282, 284 that mix over the length of the manifold zone 286 via gaps 285 in dividing wall 287. This cross-flow mixing reduces momentum biased flow into the connecting channels. The mixing can be a single component, two or more reactants, or two phases. In the illustrated embodiment, the in-flows are coplanar; however, it should be appreciated that mixing could alternatively or additionally be accomplished through holes in the sheet above or below the manifold.

Figure 29:
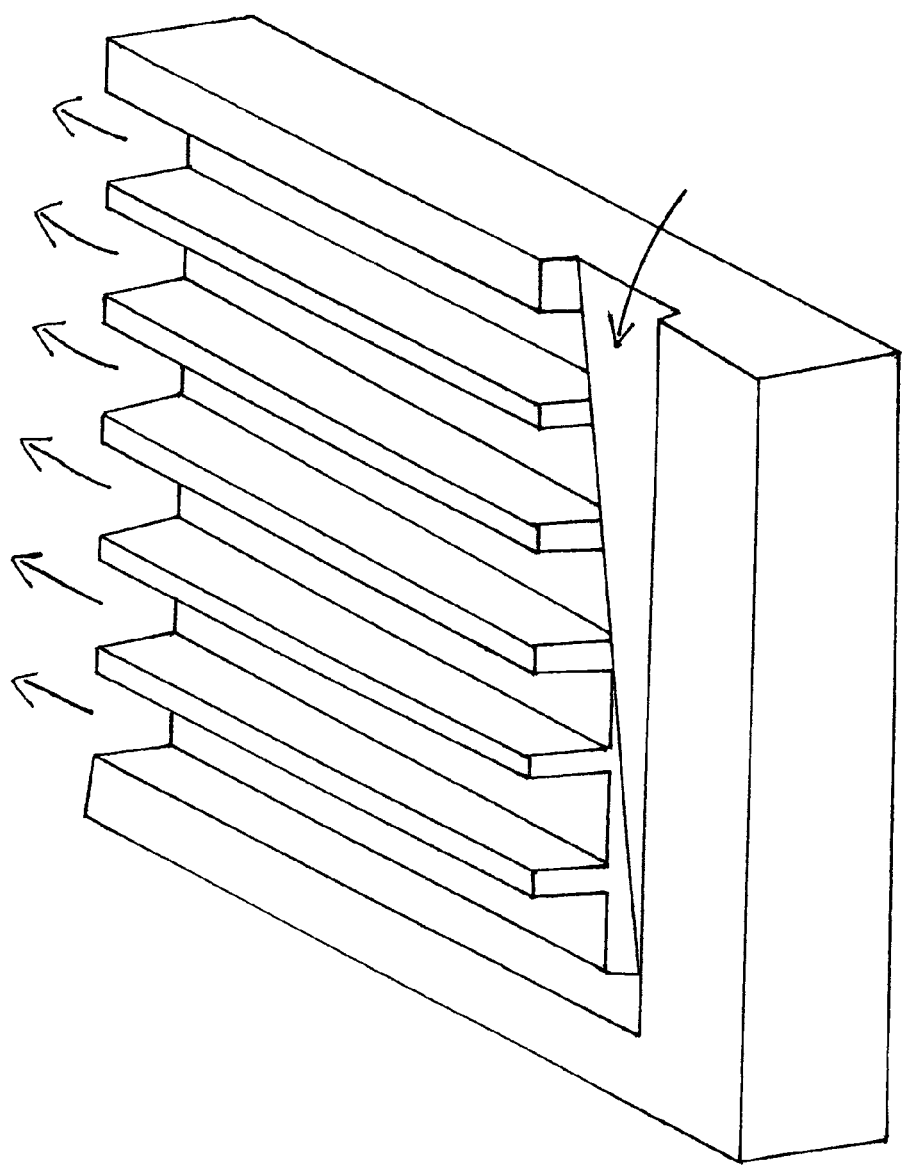
FIG. 29 illustrates an inclined manifold.

As illustrated in FIG. 29, a manifold can be inclined to change the cross-sectional area of the manifold in the direction of flow, which changes the local connecting channel interface to manifold area ratio and the channel M2M manifold aspect ratio. By "inclined" is meant that the height (not merely the width) of the manifold varies. Preferably, the manifold slopes upward so that the smallest volume is adjacent to the connecting channel furthest downstream (i.e., the opposite of the slope in FIG. 29). This structure can be made by etching.

Figure 30:
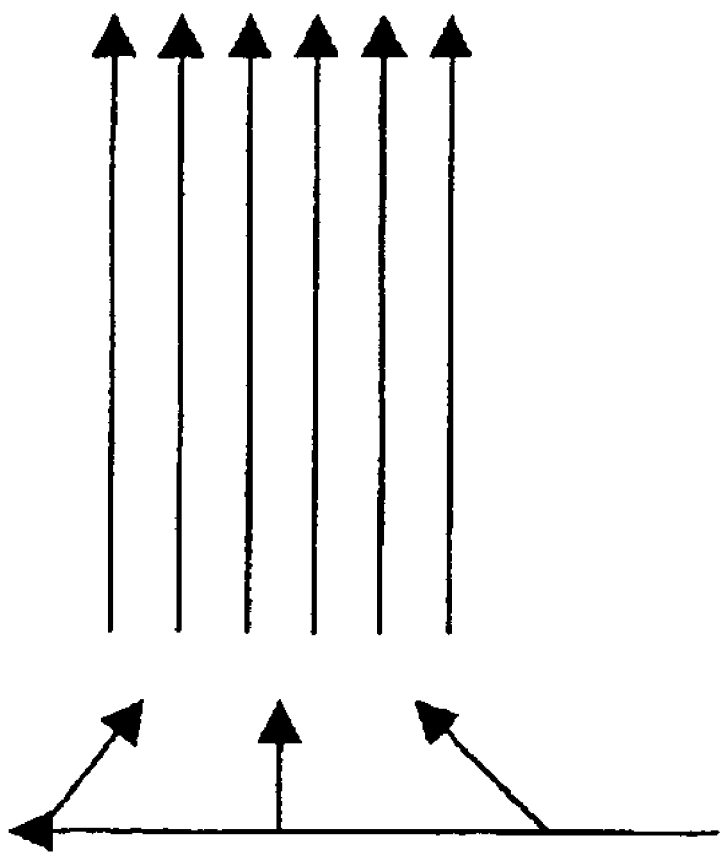
FIG. 30 schematically illustrates angled openings between a manifold and a set of connecting channels.

In some embodiments, the gates from the manifold to the connecting channels can be angled. This is schematically illustrated in FIG. 30. An angled opening can be made by etching. The angled flows can add or subtract from turning loss resistance and can be designed to make flow more equal through the connecting channels. Here, "angled" means that the gate is sloped such that the center line through the gate forms an angle between 2 and 98 degrees or between 92 and 178 degrees, more preferably between 20 and 80 or between 100 and 170 degrees with respect to the center line through the connecting channels. Preferably, the design is as illustrated where at least one channel (or preferably more) that is in the upstream section of the manifold is angled to reduce turning loss (with flow) while at least one channel (or preferably more) that is in the downstream section of the manifold is angled to increase turning loss (against flow).

Figure 31:
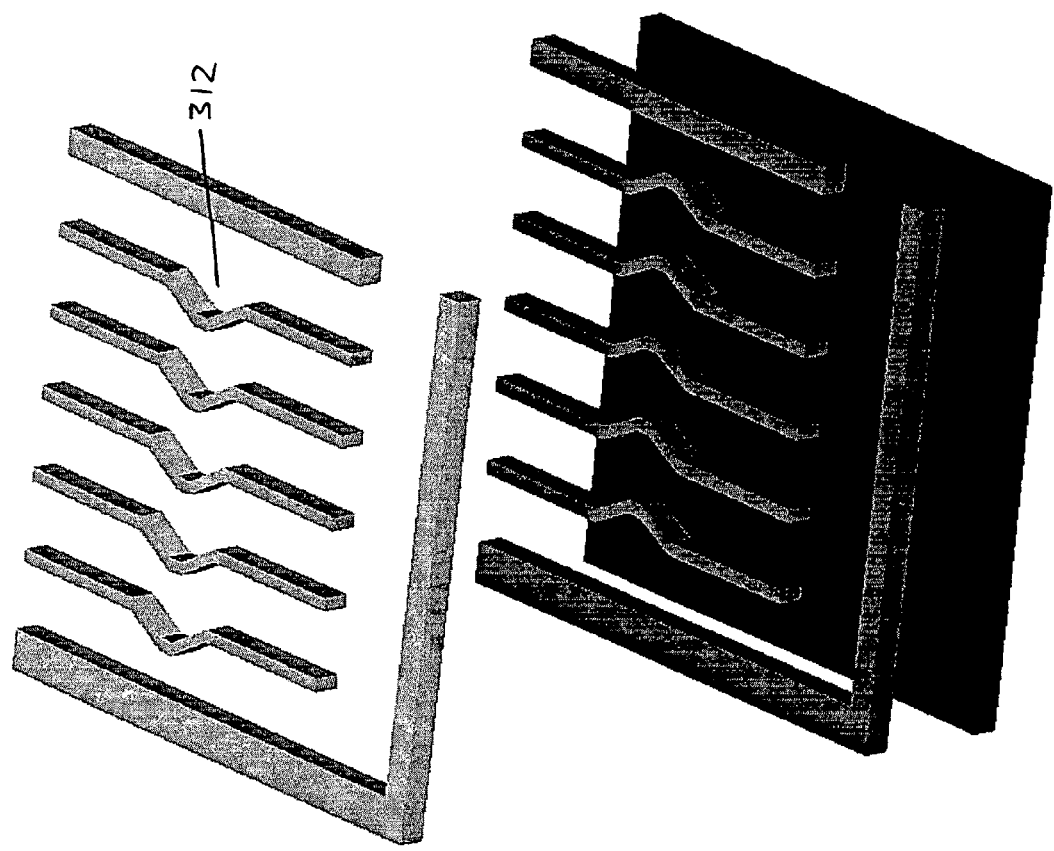
FIG. 31 illustrates a channel design with offset regions for interchannel mixing.

FIG. 31 illustrates an exploded (or preassembly) view of stacked connecting channels that include an offset region 312 that allows interchannel mixing. In an offset configuration, a channel wall or walls in a first layer extend to provide a fluid pathway into a second adjacent layer.

Another option to reduce the effects of flow momentum is to place baffles within the headers (not shown).

Figure 32:
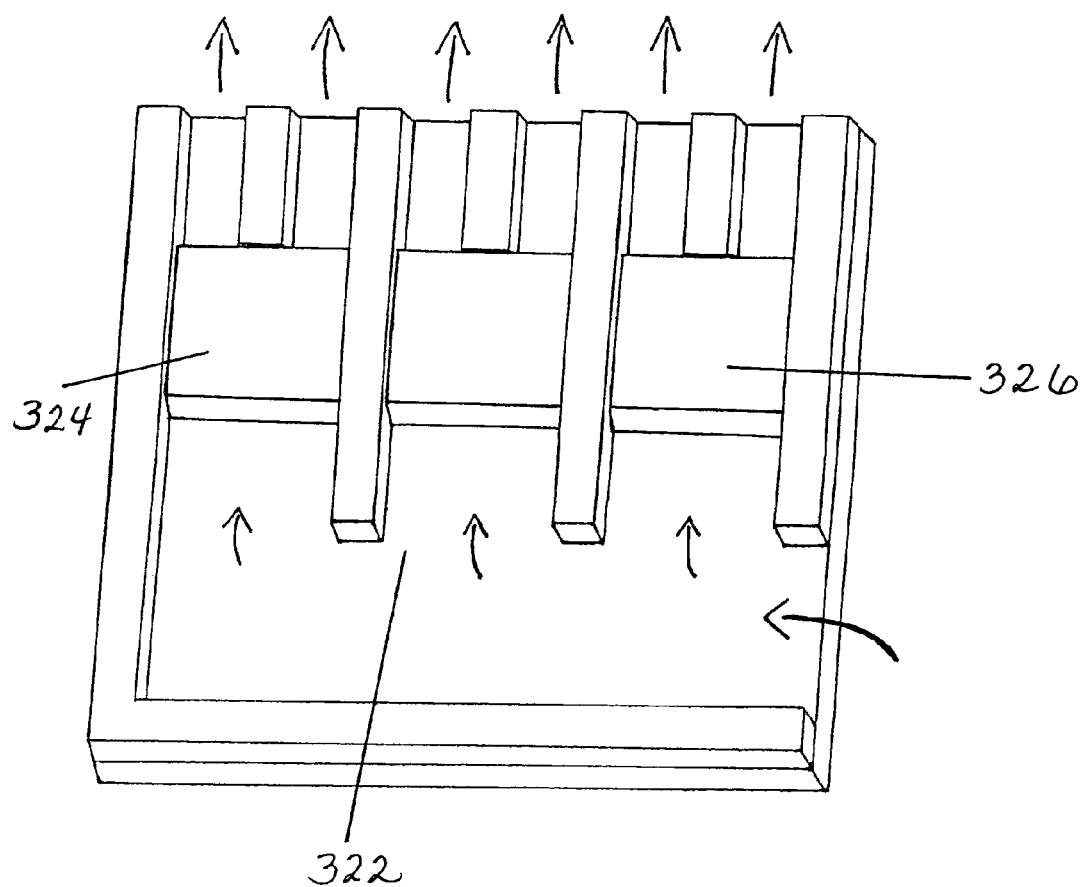
FIG. 32 illustrates a gate design in which porous bodies provide equal flow.

FIG. 32 illustrates an alternative form of gate in which porous bodies are placed between a manifold 322 and connecting channels. Preferably for a header manifold for a Z-manifold or L-manifold the porous bodies are arranged such that the greatest resistance to flow is present in the porous body 324 furthest downstream relative to the manifold while the relatively less resistance to flow is present in upstream porous body 326 for a header manifold with a Mo value greater than 0.05. This puts the highest flow resistance for the zone with the highest static pressure value in the manifold, a product of increasing static pressure from momentum compensation. A header for a U-manifold with a Mo value greater than 0.05 may want the order reversed from that described for the Z-manifold and L-manifold headers to compensate for momentum compensation and friction losses in the footer. More generally, it is preferred that a porous body with a relatively greater resistance to flow is located downstream in the header manifold relative to a porous body with a relatively lesser resistance to flow for a header manifold for a Z-manifold or L-manifold. The reverse is true for the U-manifold. For flow distribution through connecting channels of equal width, at least 3 porous bodies increase in flow resistance with increasing distance downstream in the manifold. The porous bodies can be catalytic (e.g. in a reactor) or noncatalytic. A foam is a preferred example of a porous body.

Figure 33:
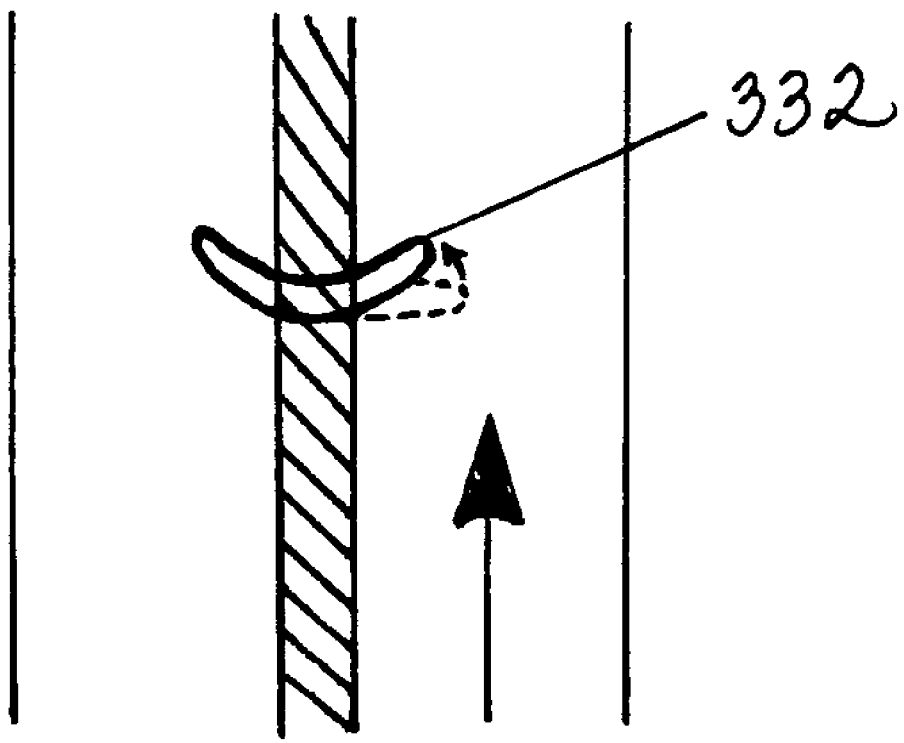
FIG. 33 illustrates a flexible wall projection that alters flow through a channel.

FIG. 33 illustrates an embodiment in which flow is affected by a flexible projection 332 through a channel wall. The flexible projection can project from one side of a wall or through a channel wall and into both adjacent channels.

Multiple microdevices 3402, 3404, each with an internal micro-to-macro manifold may be further connected together with a macromanifold 3405 (see FIG. 34A) to achieve any desired capacity or productivity. This level of manifolding may comprise pipes or ducts that connect streams between microdevices. At least one stream can be in a single pipe 3406 or duct with an inlet 3407 or outlet 3408 to each parallel microdevice. In some embodiments, all streams are connected with a unique pipe or duct. In one embodiment, one or more outlet streams 3409 vents to the atmosphere, such as the case of a combustion exhaust stream.

The pipes or ducts that connect multiple microdevices preferably maintain a hermetic seal around the respective inlet or outlet of a fluid stream for each microdevice. The hermetic seal may be achieved by welding or gasket connections. For a microdevice with multiple inlets or outlets, the connecting macromanifold pipes or ducts may be connected to each other but in a gas-tight manner to prevent cross-stream leaks or connections. As an example, an inner pipe that contains the inlet for one stream, may contain an outer pipe that is attached to the inner pipe around a portion of the circumference of the inner pipe (not shown). Multiple pipes or ducts may be connected in this manner. An advantage of this approach includes a reduced amount of metal weight for the macromanifold, control of the thermal profile along the pipes to reduce stress imposed material thickness limits, and reduced total volume required for the macromanifold system.

The macromanifold represents the first level of flow distribution. Flow enters from a single source and is distributed to two or more microdevices. After flow enters each microdevice it is further optionally segregated into multiple submanifolds. From each submanifold, flow may be further distributed to multiple connecting channels. Finally, an optional embodiment includes a further level of flow distribution to multiple subchannels within each microchannel. Each subchannel may take the form of a fin (either inserted or formed integrally to the device) or other flow distributor housed within a microchannel. There may be three, four, or more levels of flow distribution required for the operation of microdevices that produce a quality index factor of less than 30%, or any of the preferred Q values discussed herein.

Flow Distribution in Two Dimensions

Where there is a need to distribute flow to two-dimensional array of connecting channels, in the stacking direction and in the planes of channels, often there are options that allow for using a single manifold for distribution. These single manifolds can be large ducts or pipes, and they are often used for cross-flow applications. For these cases, the frictional losses play a smaller role as the length of the manifold over hydraulic diameter becomes small (L/D~1). However, the momentum driven phenomena, the momentum compensation and turning losses, become the main driving force for flow distribution and should be accounted for within the design. The manifold physics change from those of the high M2M manifold aspect ratio channel terms discussed in the one dimensional manifold section. The less significant turning losses for the high aspect ratio channel is due to the cross-sections of large ducts that have square perimeters or have pipe or half-pipe perimeters. The turning losses for these cases have less wall shear stress than seen for the high aspect ratio rectangular channels. The next two concepts describe means of improving flow distribution to two dimensional channel arrays.

One problem with flow distribution is maldistribution through a connecting channel matrix due to the momentum of incoming flow. A central feed inlet and central feed outlet can lead to channeling through the center of the matrix, as seen in cross-flow heat exchangers. See Lalot et al, Applied Thermal Engineering, v.19, pp. 847-863, 1999; Ranganayakulu and Seetharamu, Heat and Mass Transfer, v.36, pp. 247-256, 2000).

Also, a single inlet tangent to the direction of flow can result in a stream that distributes the bulk of the flow to the channels opposite to the inlet and could induce large recirculation zones in the header and footer, recirculation from the header to the footer and recirculation or stagnant zones in the device.

Figure 34:
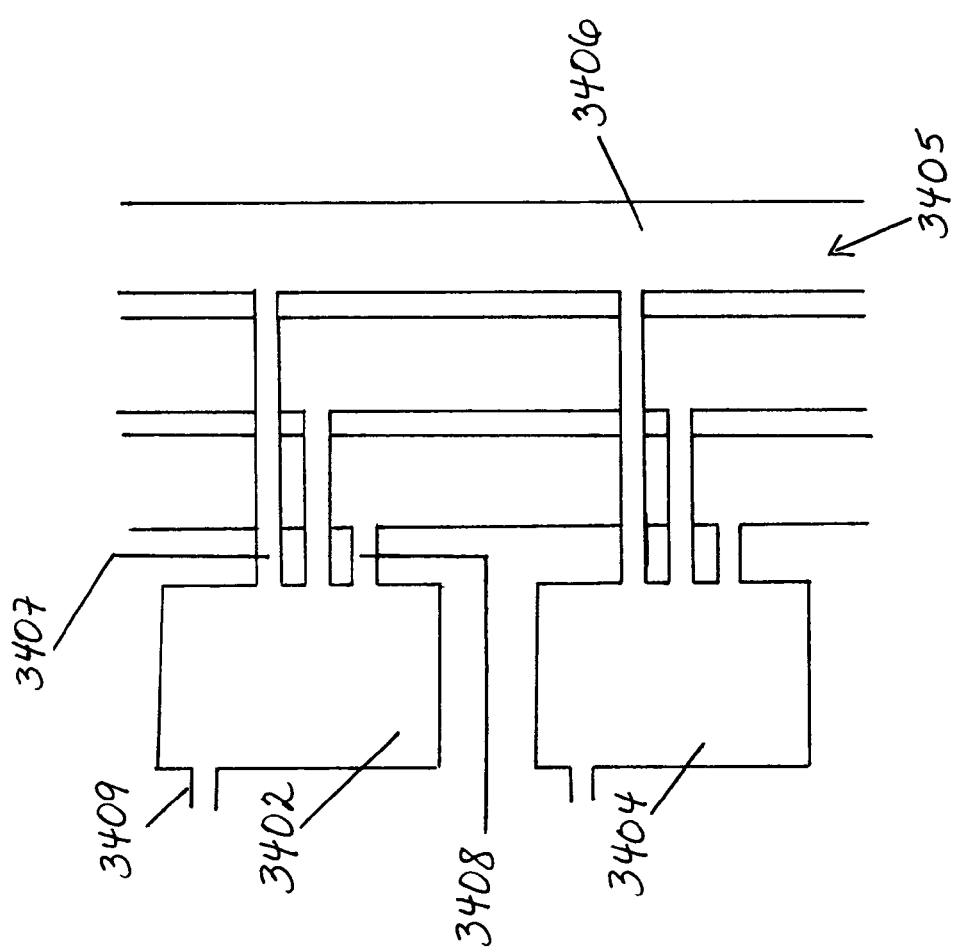
FIG. 34A schematically illustrates a macromanifold connected to two microdevices.
FIG. 34B illustrates a non-divergent header with convergent footer and multiple inlets and outlets parallel the direction of flow. Louvers can be used to direct flow.
Figure 34:
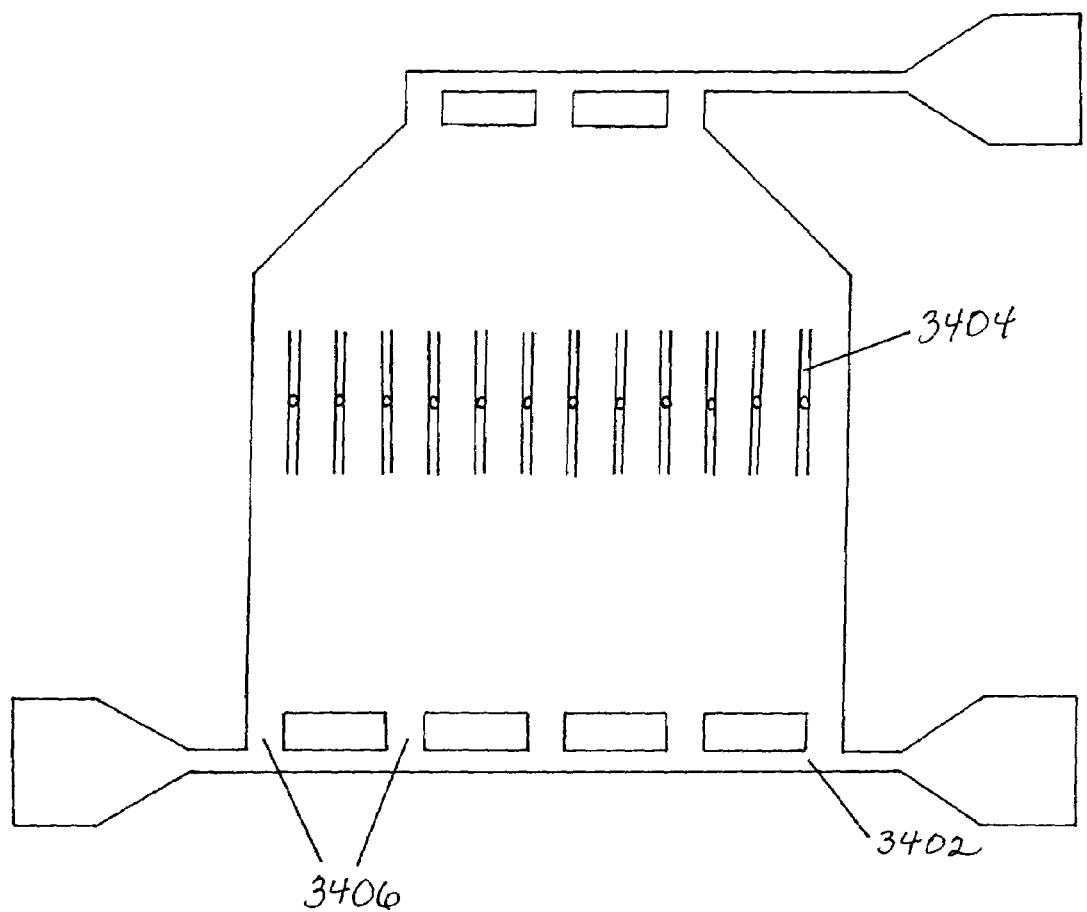

A device that ameliorates these problems is illustrated in FIG. 34B which is a top-down view inside a channel in a device having multiple inlets 3406 parallel to the direction of flow. In the illustrated design, inlet flow is introduced from both sides of a sub-manifold 3402. If flow is introduced from only one side, the bulk of the flow would leave via the header inlet farthest from the main inlet. A simulation indicated that that this arrangement was successful in eliminating recirculation zones, recirculation from the footer to header and stagnant areas in the device. The basic distribution for this option is biased to the center but to a greatly reduced extent as compared to other options.

Also illustrated in FIG. 34B are optional flow directors 3404 that can direct flow through a chamber. These flow directors can be louvers (or paddles) that can be collectively or individually rotated to direct flow in a desired direction. A louver system was designed where all of the louvers are attached together by an adjoining rod, which will allow all of the louvers to move and rotate at the same time, same direction and to the same position. The use of louvers provides a convenient way of changing flow directions within a device. The louvers are able to shift the flow such that it can be biased to the left, middle and right. Thus, in one example, the flow directors are rotatable louvers.

In some preferred embodiments, a heat exchange fluid is passed through the chamber with the heat exchange fluid biased. Stacked adjacent to the illustrated heat exchange chamber, either above and/or below, is a reaction chamber (not shown) in which reactants pass in a cross-flow relationship relative to the heat exchange fluid. This orientation is advantageous if the reaction rate is greatest at the front or back of the reaction chamber and this high-reacting-rate portion is matched to the biased flow through the heat exchanger such that the highest flow of heat exchange fluid is directly adjacent to the highest reaction rate in the adjacent reaction chamber.

Flow Distribution Plates

Figure 35:
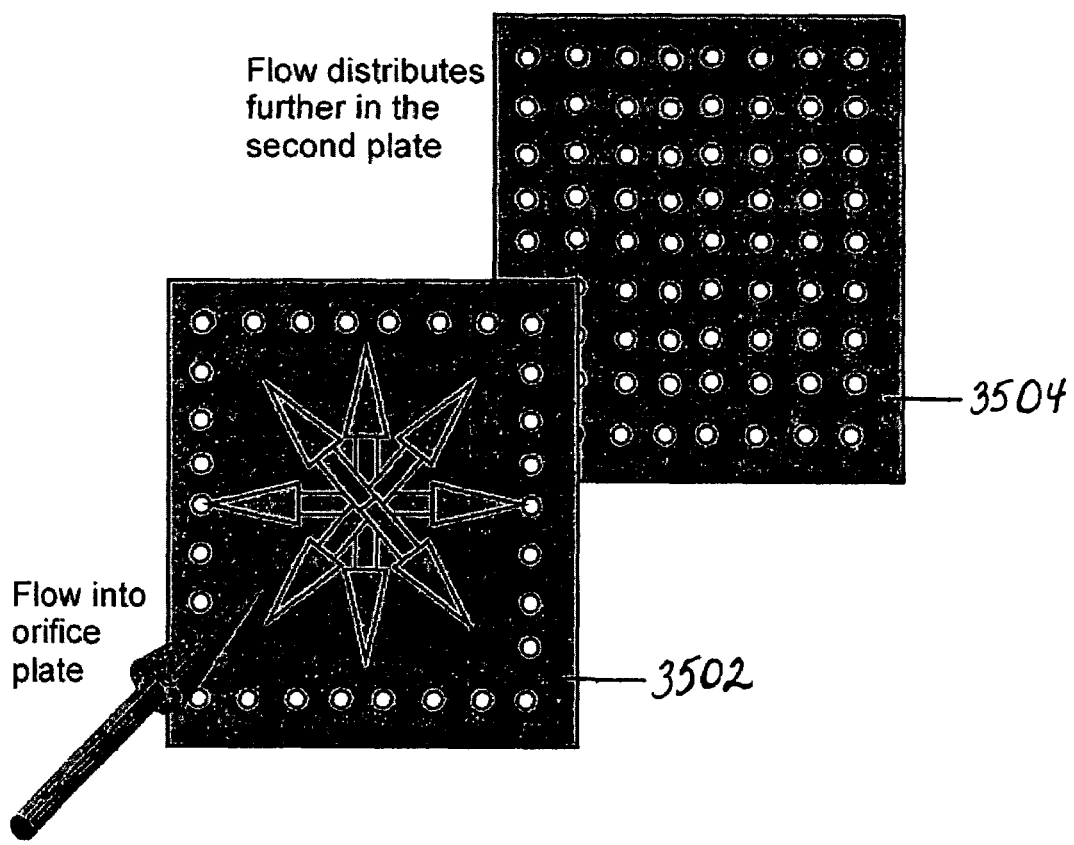
FIG. 35 illustrates a central flow redistributed by a flow distribution plate.
Figure 36:
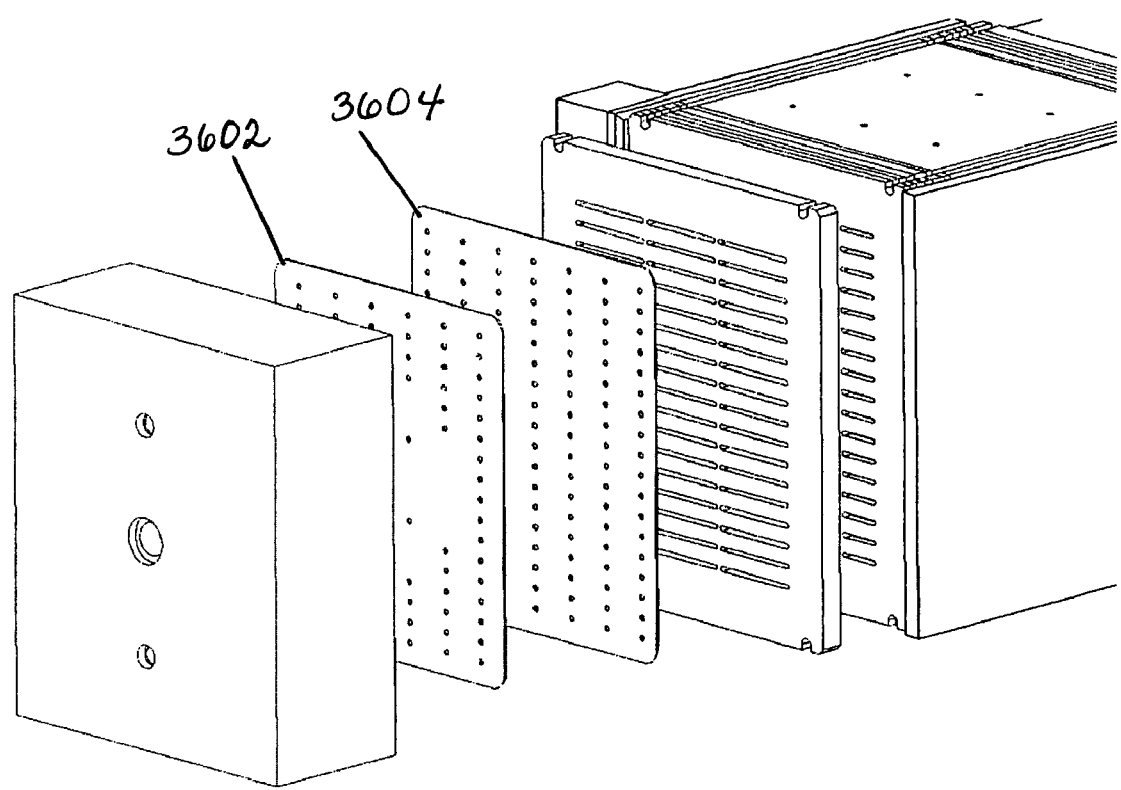
FIG. 36 illustrates an exploded view schematic of a high-pressure vaporizer showing the center-fed inlet, the first and second plates and a two-dimensional channel array in orthogonal shims. Flow is collected on the opposite side of the channel array with a centrally located outlet pipe, directly opposite the inlet pipe entrance.

In some multichannel design embodiments, at low flow rates, friction losses may dominate causing flow to primarily pass through the center of a multichannel array. One solution to this problem is to place a flow distribution plate prior to a multichannel array. This concept is illustrated in FIG. 35 which shows flow being forced to the periphery of a distribution plate 3502. Generally, this can be accomplished by a plate with orifices preferentially distributed nearer the periphery of the plate than to the center. Preferably, a second orifice plate 3504 with a two-dimensional array of equally distributed holes follows the first plate. The combination of the first and second plates, preferably in further combination with an open redistribution zone (not shown) following the first plate, equalizes pressure over the front surface of an array and reduces flow maldistribution through a multichannel array. A partially exploded view of a multichannel device using the combination of first and second flow redistribution plates 3602, 3604 is shown in FIG. 36.

Figure 37:
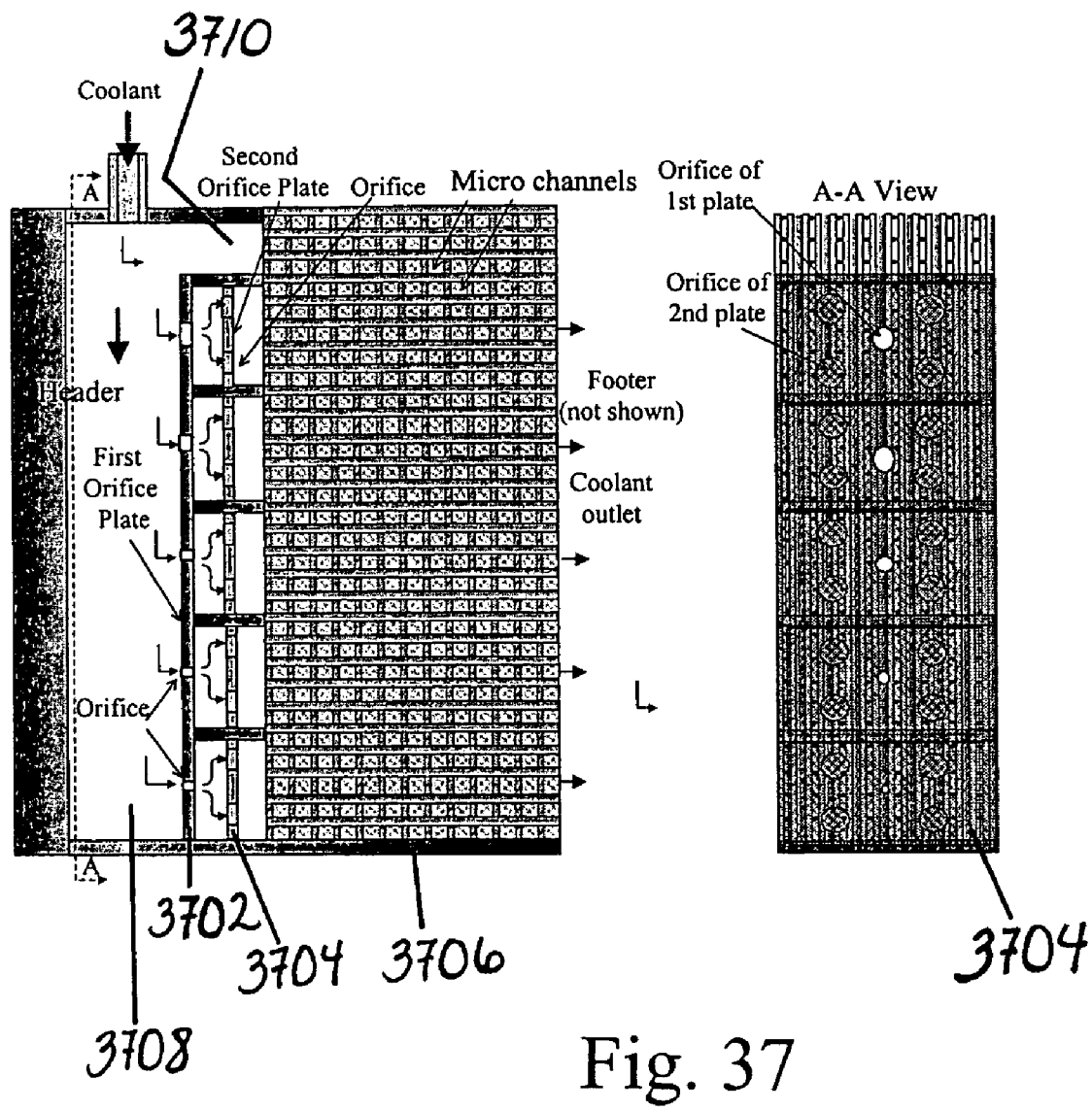
FIG. 37 illustrates a manifold design with nonaligned orifice plates.

Cross sectional and side views of another design with first and second flow distribution plates is illustrated in FIG. 37. In this design, the first orifice plate 3702 has differing gate sizes to control flow. The varying gate sizes can either be used to equalize flow, or to provide a nonuniform flow for instances in which nonuniform flow is desired. In the cases when local flow maldistribution (within the segment) would occur using one orifice plate, for example, if the frictional loss is too small in the microchannels (too short of a channel) or velocity in the orifice is very high, a second orifice plate 3704 with a number of large orifices offset from the orifice position of the first plate (i.e., nonaligned) is needed to divert the flow stream from the single orifice and ensure a uniform distribution within the segment of microchannels (i.e., connecting channel matrix 3706). In some embodiments, because of the difference in turning losses, equal flow can be obtained with a portion 2710 of the connecting channel matrix in direct contact with the manifold 3708 without intervening orifice plates.

Figure 38:
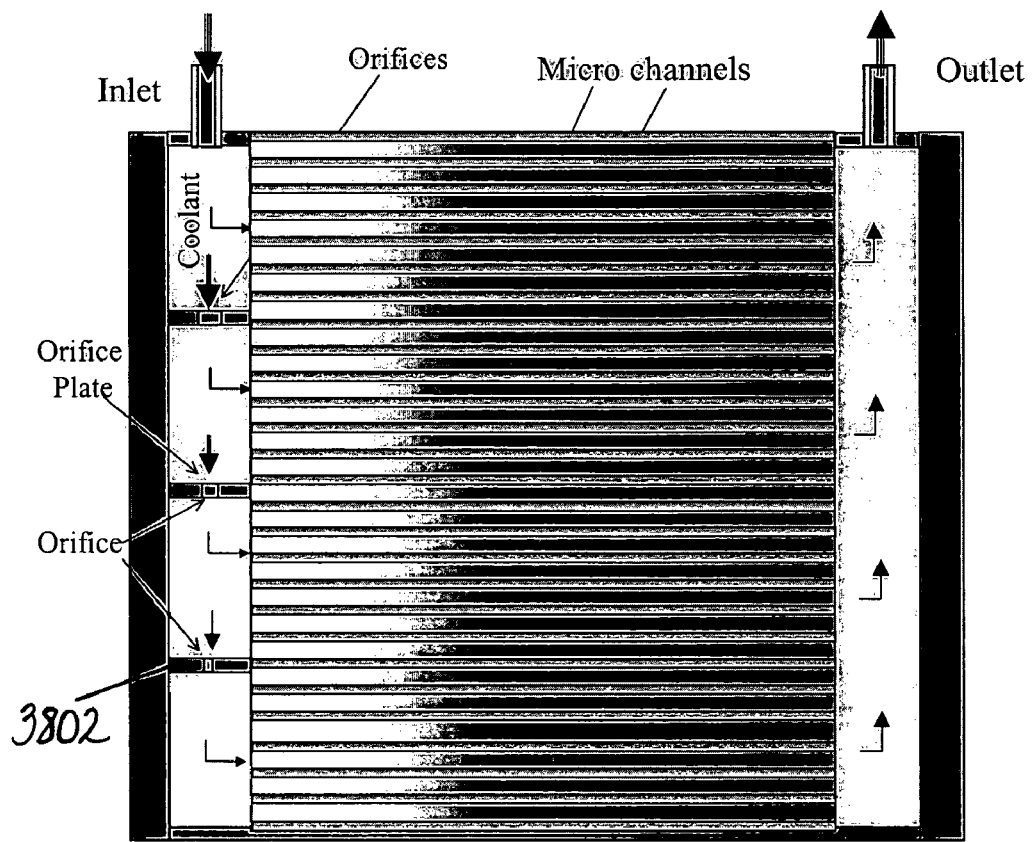
FIG. 38 is a cross-sectional, top down view of a device in which the header contains orifice plates.

In some embodiments, plates containing one or more orifice are disposed within the header. See FIG. 38. In the illustrated device, plates 3802 with one or more orifices are of a shape that fits in the header cross section and can be mounted (sealed or welded) inside the header so as to separate the header of a microchannel device into several segments. The orifice sizes are designed according to the desired flow rate and pressure drop for the corresponding group (arrays) of the microchannels to realize a designed stepwise profile of flow rate and pressure drop over the whole device. As the pressure varies from segment to segment, the segment-averaged flow rate in the microchannels can be different from segment to segment or can also be the same for a uniform flow distribution. The illustrated design contains 6 microchannels within each segment; however, it should be realized that any number of channels may be present in a segment, for example, in some preferred embodiments, 2 to 100 channels, and in some embodiments 10 to 50 channels. The illustrated design has orifice plates with decreasing orifice sizes in the direction of flow to compensate for momentum and provide more equal flow through the connecting channels. The illustrated plates are parallel to the connecting channels. By selecting the number of orifice plates, the orifice size or number, the flow rate difference between the microchannels of a single segment can also be designed and limited within an allowable range. As such, a stepwise flow distribution can be achieved. As one example, if the illustrated layer were a coolant layer in an integrated reactor containing an adjacent reactor layer (not shown) in cross-flow relationship, coolant flow is concentrated in the area immediately adjacent to the front (hottest part) of the reactor layer.

Figure 39A:
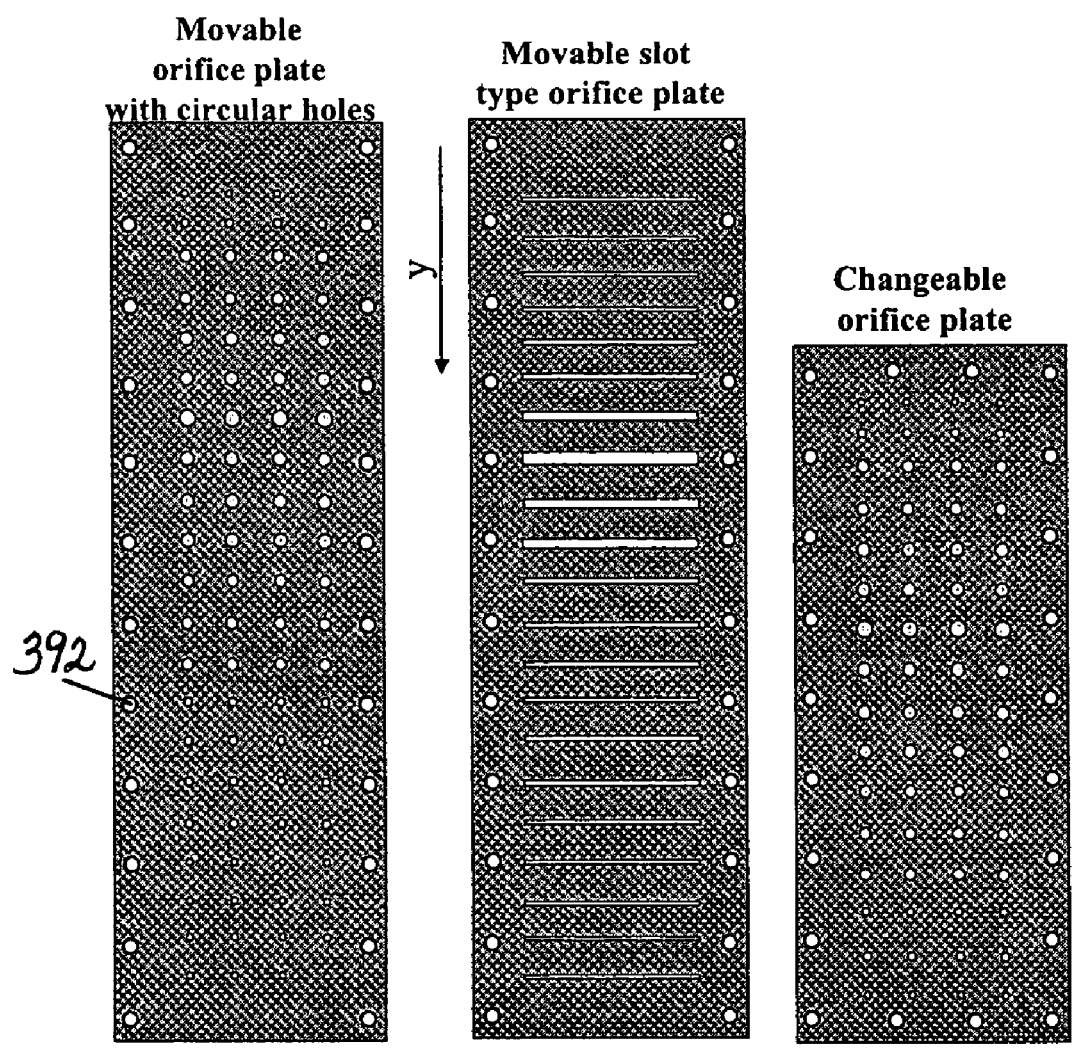
FIGS. 39A and 39B illustrate a cross-flow reactor utilizing a moveable distribution plate.
Figure 39B:
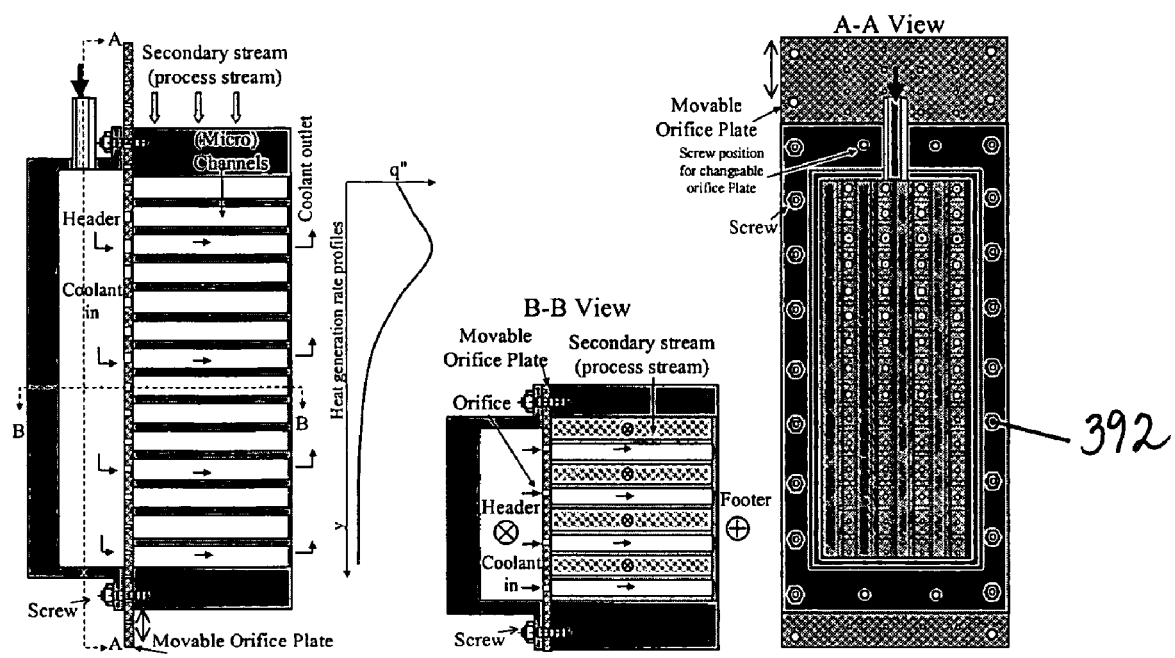

Orifice plates can have equally distributed orifices of similar or identical sizes, monotonically increasing or decreasing open areas, or can be designed with any desired orifice distribution. For example, FIG. 39A shows orifice plates with holes or slots that increase to a maximum area then decrease down their length. In general, a moveable orifice plate between a manifold and connecting channels can be used to vary flow rate into connecting channels. For example, the plates in FIG. 39B have optional screw holes 392 for use as moveable plates. As shown in the A-A view, the orifice plate can be moved up or down to vary flow. The plate can be mounted and sealed between the header of the device and the channel inlet face using screws. When a flow distribution profile change is needed, the relative position between the plate and the channels can be changed by unscrewing the plate and moving the plate to a position corresponding to the designed new distribution profile. Thus, different flow distribution profiles within the same device can be obtained, and flow rates optimized for varying conditions.

Device Fabrication

Sheets and strips for forming laminated devices can be formed by processes including: conventional machining, wire EDM, plunge EDM, laser cutting, molding, coining, water jet, stamping, etching (for example, chemical, photochemical and plasma etch) and combinations thereof. For low cost, stamping to cut apertures through a sheet or strip is especially desirable. Any shaping or forming process can be combined with additional steps. Some of the inventive methods can also be characterized by the absence of certain forming techniques; for example, some preferred methods do not utilize etching, casting, melting a powder, molding, chemical or physical deposition, etc.

To form a laminated device, a sheet or strip is stacked on a substrate. For purposes of the present invention, a substrate is broadly defined to include another sheet or strip or a thicker component that could be, for example, a previously bonded sheet stack. Preferably, multiple sheets and/or strips are aligned in a stack before bonding. In some embodiments, a brazing compound is placed on one or more surfaces of a sheet or strip (or plural sheets and/or strips) to assist bonding. Sheets and strips should be aligned in a stack. Alignment can be achieved by making sheets and/or strips with alignment apertures and then using alignment pins to align the sheets and/or strips in a stack. A stack (including a subassembly that does not include all the components of a final device) can be lifted from pins, or the pins can be removed (such as by burning or by pulling out pins), or the pins can become bonded in the stack. Another alignment technique utilizes molds for aligning sheets and/or strips; this technique can be especially useful for positioning flow modifiers such as ribs. In some embodiments, molds remain in place while the stack components are attached in place such as by welding, heating an adhesive, or diffusion bonding; subsequently, the molds are removed. In other embodiments, the mold can be removed before the components are bonded. Molds can be reusable or can be single use components that could be removed, for example, by burning out.

The sheets, strips and subassemblies may be joined together by diffusion bonding methods such as ram pressing or hot isostatic pressing (HIPing). They may also be joined together by reactive metal bonding, brazing, or other methods that create a face seal. Welding techniques, such as TIG welding, laser welding, or resistance welding, may also be used. Devices can alternatively be joined by the use of adhesives.

In cases where a full length seal is desired to provide fluid containment, seam welding can be employed to form a complete seal between a substrate, strip and/or flow modifier. Tack or spot welding can be used to hold strips, flow modifiers or subassemblies in place, without creating a complete seal along an entire edge. Usually, the tack welded assemblies will be subjected to a subsequent bonding step.

Brazing techniques and compositions are known and can be employed in forming devices of the present invention. Braze cycles longer than about 10 hours can result in better devices that show less distortion and have better bonding.

Techniques for assembly and/or bonding of devices can use the same techniques or a mixture of techniques. For example, a subassembly could be welded together and then welded to a second subassembly that itself was formed by welding. Alternatively, for example, a subassembly could be spot welded together, brazed to a second subassembly, and the combined assembly diffusion bonded.

Numerous microchannel, laminated devices can be made with the components described herein and/or structures described herein and/or made using the methods described herein. Such laminated devices can be, for example, heat exchangers, reactors (integrated combustion reactors are one preferred type of reactor), separators, mixers, combinations of these, and other microchannel, laminated devices that are capable of performing a unit operation. The term "laminated articles" encompasses laminated devices as well as laminated subassemblies.

While the individual laminae are quite thin, the device dimensions are not particularly limited because numerous laminae (of a desired length and width) may be stacked to any desired height. In some preferred embodiments, the inventive articles contain at least 5 laminae, more preferably at least 10, and in some embodiments, more than 50. In some preferred embodiments, the articles contain at least 2, in some embodiments at least 5 repeating units (with each repeating unit containing at least 3 different laminae).

In some embodiments, at least one fluid is flowing through the manifold, and in some embodiments, this fluid is a gas. The header or footer can be shaped to fit an end of a subassembly, for example a square end on a header/footer to match one side of a cubic subassembly.

The articles may be made of materials such as plastic, metal, ceramic, glass and composites, or combinations, depending on the desired characteristics. In some preferred embodiments, the articles described herein are constructed from hard materials such as a ceramic, an iron based alloy such as steel, or monel, or high temperature nickel based superalloys such as Inconel 625, Inconel 617 or Haynes alloy 230. In some preferred embodiments, the apparatuses are comprised of a material that is durable and has good thermal conductivity. In some embodiments, the apparatuses can be constructed from other materials such as plastic, glass and composites. Materials such as brazes, adhesives and catalysts are utilized in some embodiments of the invention.

The present invention may include chemical reactions that are conducted in any of the apparatus or methods of conducting reactions that are described herein. As is known, the small dimensions can result in superior efficiencies due to short heat and mass transfer distances. Reactions can be uncatalyzed or catalyzed with a homogenous or heterogeneous catalyst. Heterogeneous catalysts can be powders, coatings on chamber walls, or inserts (solid inserts like foils, fins, or porous inserts). Catalysts suitable for catalyzing a selected reaction are known in the art and catalysts specifically designed for microchannel reactors have been recently developed. In some preferred embodiments of the present invention, catalysts can be a porous catalyst. The "porous catalyst" described herein refers to a porous material having a pore volume of 5 to 98%, more preferably 30 to 95% of the total porous material's volume. The porous material can itself be a catalyst, but more preferably the porous material comprises a metal, ceramic or composite support having a layer or layers of a catalyst material or materials deposited thereon. The porosity can be geometrically regular as in a honeycomb or parallel pore structure, or porosity may be geometrically tortuous or random. In some preferred embodiments, the support of the porous material is a foam metal, foam ceramic, metal felt (i.e., matted, nonwoven fibers), or metal screen. The porous structures could be oriented in either a flow-by or flow-through orientation. The catalyst could also take the form of a metal gauze that is parallel to the direction of flow in a flow-by catalyst configuration.

Alternatively, a catalyst support could be formed from a dense metal shim, fin or foil. A porous layer can be coated or grown on the dense metal to provide sufficient active surface sites for reaction. An active catalyst metal or metal oxide could then be washcoated either sequentially or concurrently to form the active catalyst structure. The dense metal foil, fin, or shim would form an insert structure that would be placed inside the reactor either before or after bonding or forming the microchannel structure. A catalyst can be deposited on the insert after the catalyst has been inserted. In some embodiments, a catalyst contacts a wall or walls that are adjacent to both endothermic and exothermic reaction chambers.

The invention also includes processes of conducting one or more unit operations in any of the designs or methods of the invention. Suitable operating conditions for conducting a unit operation can be identified through routine experimentation. Reactions of the present invention include: acetylation, addition reactions, alkylation, dealkylation, hydrodealkylation, reductive alkylation, amination, ammoxidation aromatization, arylation, autothermal reforming, carbonylation, decarbonylation, reductive carbonylation, carboxylation, reductive carboxylation, reductive coupling, condensation, cracking, hydrocracking, cyclization, cyclooligomerization, dehalogenation, dehydrogenation, oxydehydrogenation, dimerization, epoxidation, esterification, exchange, Fischer-Tropsch, halogenation, hydrohalogenation, homologation, hydration, dehydration, hydrogenation, dehydrogenation, hydrocarboxylation, hydroformylation, hydrogenolysis, hydrometallation, hydrosilation, hydrolysis, hydrotreating (including hydrodesulferization HDS/HDN), isomerization, methylation, demethylation, metathesis, nitration, oxidation, partial oxidation, polymerization, reduction, reformation, reverse water gas shift, Sabatier, sulfonation, telomerization, transesterification, trimerization, and water gas shift. For each of the reactions listed above, there are catalysts and conditions known to those skilled in the art; and the present invention includes apparatus and methods utilizing these catalysts. For example, the invention includes methods of amination through an amination catalyst and apparatus containing an amination catalyst. The invention can be thusly described for each of the reactions listed above, either individually (e.g., hydrogenolysis), or in groups (e.g., hydrohalogenation, hydrometallation and hydrosilation with hydrohalogenation, hydrometallation and hydrosilation catalyst, respectively). Suitable process conditions for each reaction, utilizing apparatus of the present invention and catalysts that can be identified through knowledge of the prior art and/or routine experimentation. To cite one example, the invention provides a Fischer-Tropsch reaction using a device (specifically, a reactor) having one or more of the design features described herein.

EXAMPLES

Example 1

Comparative Calculated Example

Calculations have been conducted based on a design shown in FIGS. 51 to 64 of Golbig published patent application US 2002/0106311A1. In this design, a fluid flows into two separate headers of the same dimensions. The header intersects at a right angle with the ends of connecting channels of varying widths; the widths varying from widest at the start of the header to the narrowest channel at the end. The object of this design was to enable "viscous fluids to be processed in parallel fluid channels with substantially equivalent residence time distributions." The varying channel width tailors the connecting channel flow resistance to compensate for the differences between the header and footer pressure for a given fluid viscosity and flow rate, adding resistance to channels with larger pressure difference driving forces and less resistance to those with lower pressure difference driving force.

While the publication does not specifically describe all the dimensions of the design, approximate dimensions can be surmised from the text. From paragraph 292, the shims have a thickness of 0.3 mm, and paragraph 295 shows the relative channel widths in units which appear to be a multiplicative factor of channel height. Measuring channel widths from the figure, and comparing to the unit dimensions in paragraph 295, we calculate that 0.1 cm of measured distance is equal to 0.393 mm in the design. Similarly, the connecting channel lengths are measured to be 13.8 cm, correlating to an actual design length of 54.3 mm, with ribs between channels of 0.59 mm, header width of 0.39 mm, and footer width of 2.55 mm. In paragraph 138 it is stated that limiting openings to a maximum of 2 mm enhances the bonding process—this limit is consistent with our calculated range of channel openings. The preferred embodiment of this invention is desired to have substantially equivalent residence times.

Golbig et al. use an analogy to circuit theory, and use the laminar flow regime to describe flow. Thus, we calculate pressure drop as $$\Delta P = \frac{4fL}{D}\frac{G^2}{2\rho} \quad (20)$$

$$= \frac{4L}{D}\left(\frac{C}{Re}\right)\frac{G^2}{2\rho}$$

$$= \frac{4L}{D}\left(\frac{\mu C}{GD}\right)\frac{G^2}{2\rho}$$

$$= \left(\frac{2\mu CL}{D^2}\right)\frac{G}{\rho} = \left(\frac{2\mu CL}{D^2}\right)U$$

where

C [dimensionless]=Coefficient, a function of channel dimensions and perimeter f [dimensionless]=C/Re=Fanning friction factor D [m]=Hydraulic diameter=4(cross-sectional area)/(channel perimeter)

L [m]=length of channel

G [kg/m²/s]=Mass flux rate

ρ [kg/m³]=Density

Re [dimensionless]=Reynolds number=GD/μ

U [m/s]=Mean channel velocity

μ [kg/m/s]=Dynamic viscosity of the fluid

The resistance for any section becomes $$R = \frac{2\mu CL}{D^2} \quad (21)$$

The equation (1.3) assumes fully developed laminar flow, meaning the boundary layer in the channel has fully developed over the channel length L. Using the definition of dimensionless hydrodynamic length $x^+$, $$x^+ = \frac{L}{D\,Re} \quad (22)$$

the flow is approaching fully developed flow around a $x^+$ value of 0.05, and is much closer to developed flow at a $x^+$ value of 1[1]. If resistance path lengths L are small, either the hydraulic diameter D or Re must become small to get reasonable $x^+$ values. To meet the limitation of $x^+$>0.05 to 1 for given channel hydraulic diameters, we will look at low Reynolds number values.

[1] R. K. Shah and London, A. L. "Advances in Heat Transfer. Supplement 1. Laminar flow forced convection in ducts—A source book for compact heat exchanger analytical data." Academic Press, New York, 1978, p. 212.

The system we used for analysis has the same dimensions as described above, with the following assumptions and factors:

Two header inlet mass flow rates of equal flow rate, and the distributions of the two headers are assumed to be the same.

The reactant streams have the mass flux rates from the header, while the product stream mass flux rate have the combined flow of the two header inputs for channel i $$2G_{react}[i] = G_{prod}[i] \quad (23)$$

Ignore the pressure drop losses in the transitions for the streams between shims and on mixing, as the first will be a small addition and the latter because the stream momentums are so low.

Use air at room temperature (20° C.) and have the footer outlet at 101325 Pascals [Pa] or 1.01325 bar. Golbig's preferred process doesn't specify a specific temperature rise or species change, so we are arbitrarily setting the conditions.

Quality index factor will be based upon mass flux rates with the $Q_2$ equation $$Q_2 = \frac{G_{max} - G_{min}}{G_{max}} \times 100\%$$

The system had two options for the header laminar Fanning friction factors f,

Fully developed flow

Developing flow, with the L in the $x^+$ equation (0.17) based on the distance away from the entrance in the header and the distance from the beginning of the manifold in the footer.

Figure 40:
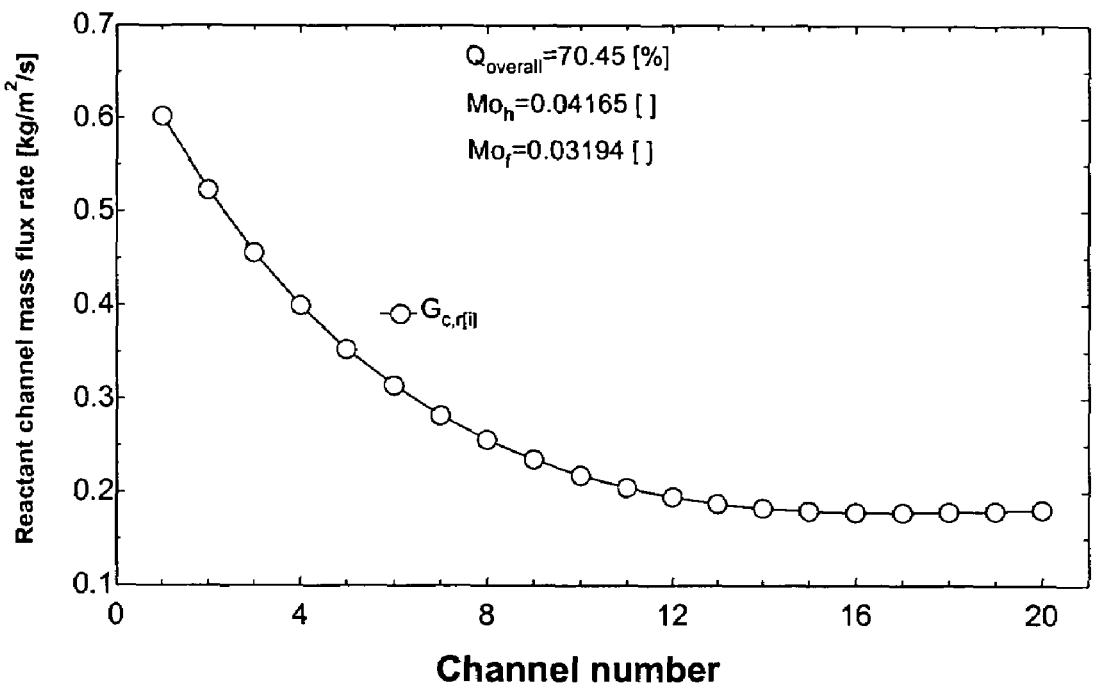
FIG. 40 shows channel mass flux rates in connecting channels according to the analysis in comparative Example 1 using $10^{-06}$ kg/s of air.
Figure 41:
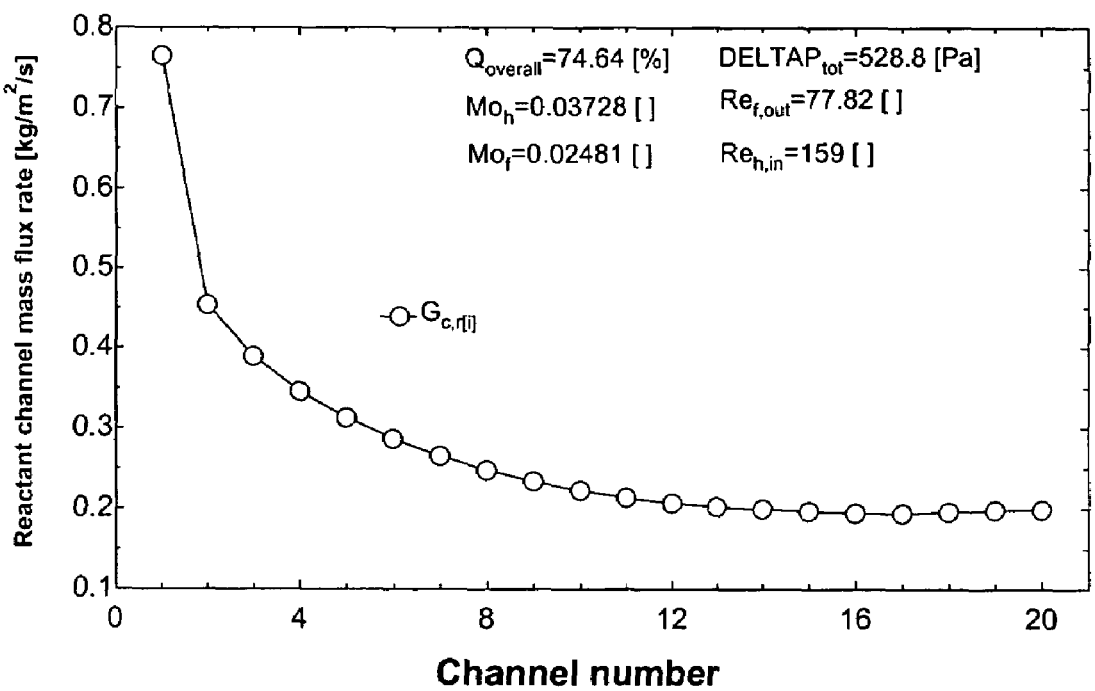
FIG. 41 shows channel mass flux rates in connecting channels according to the analysis in comparative Example 1 using $10^{-06}$ kg/s of air at room temperature and pressure with developing flow and all momentum terms included.

The first case that was investigated was for a flow rate of $10^{-06}$ kg/s flow to each header, with fully developed flow in the manifolds, and all turning losses-and momentum compensation effects removed. The channel mass flux rates for the case are plotted in FIG. 40. The $Q_2$ factor is almost 71%. The mass flux rate varies from 0.2 to 0.6 kg/m²/s in the channels, with flow favoring the first (i.e. widest) channels. The header and footer Mo values are on the order of 0.04 and 0.03, respectively. The pressure drop for the system was on the order of 350 Pa (3.5×10⁻³ bar) and the header inlet and footer outlet Reynolds numbers were 159 and 78, respectively. When the momentum compensation, turning losses and laminar developing flows are added, we get worse results, as seen in FIG. 41.

Figure 42:
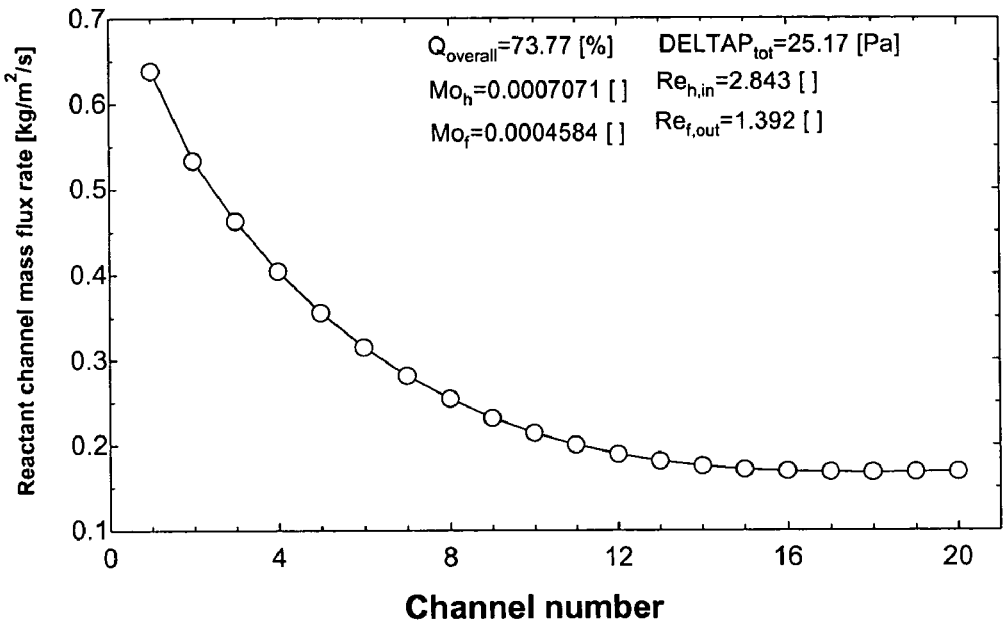
FIG. 42 shows channel mass flux rates in connecting channels according to the analysis in comparative Example 1 using $10^{-06}$ kg/s of water at room temperature with developing flow and all the momentum terms included.

As mentioned in the published application, the system dimensions are a function of the viscosities of the reactants and the products of the reaction system. The case with water at the same mass flow rate was run and the results in FIG. 42 show the results are just as poor.

Figure 43:
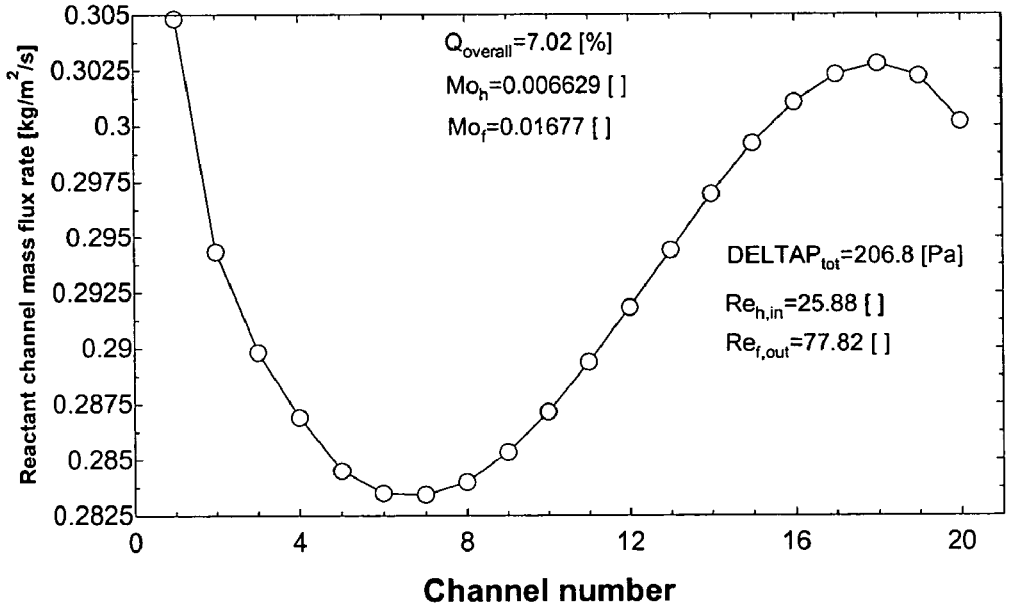
FIG. 43 shows channel mass flux rates in connecting channels according to the analysis in comparative Example 1 using $10^{-06}$ kg/s of water with wider header and footer widths with developing flow and all momentum terms included.
Figure 44:
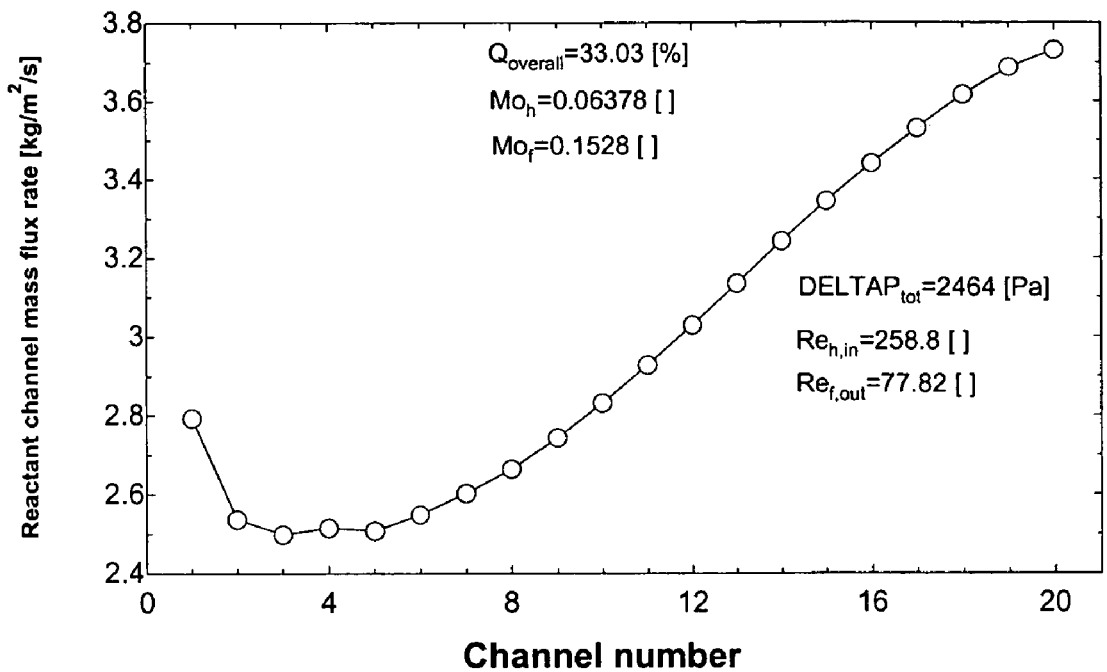
FIG. 44 shows channel mass flux rates in connecting channels according to the analysis in comparative Example 1 using $10^{-05}$ kg/sec (10× that of FIG. 43) with wider header and footer widths with developing flow and all momentum terms included.

Doing some optimization of header and footer widths, the Q factor comes down to 7% by setting the header and footer manifold widths to 0.004 mm and 0.003 mm, respectively. The results are shown in FIG. 43. The Mo values for the header and footer are low, on the order of 0.01. When the flow rates for this case are increased 10 fold to $10^{-05}$ kg/sec per header manifold, the performance drops precipitously in Q factor, as seen in FIG. 44. The Q factor increases to 33%, and the results show typical Z-manifold behavior for high momentum flows: higher flux rate at the last connecting channel in the header compared to the first channel. Note that the header and footer Mo values are higher than 0.05, despite low Reynolds numbers. Thus, turbulent Reynolds numbers are not required to have a high Mo value—high Mo can occur in low laminar flow.

The methodology in Golbig's patent application doesn't show equal flow distribution (low Q) for fully developed laminar flow at low head values, much less so at higher heads that lead to substantial manifold turning loss and momentum compensation terms. The reason may be the relationship between channel flow resistance and the degree to which the connecting channel's aspect ratio leads to that resistance. This is shown in Examples 4 and 5.

Example 2

This example describes the predicted performance of the SMR module flow distribution discussed earlier in the application.

In this design, the gate widths grow wider as the length of a sub-manifold's upstream length increases, and the width of a sub-manifold increases as the sub-manifold's upstream length increases. By using the widths of both sub-manifolds and gates within sub-manifolds, the overall pressure drop seen in each sub-manifold was equalized in both air and fuel header M2M manifolds. The sub-manifold with the shortest path length (#1) across the shim has the thinnest sub-manifold width and the thinnest gates, while the sub-manifold with the longest path across the shim (#6) has the widest sub-manifold width and widest gates. The relative dimensions for the manifolds are given below in Table 1.

TABLE 1

Dimensions for the combustion M2M air and fuel sub-manifolds listed per sub-manifold number. Gate number is given in the order that the manifold stream sees the gate, i.e. #1 for the first gate seen in the sub-manifold and #3 for the last gate seen.

| Sub-manifold number | M2M channel width (in) | Width of air Gates (inches) | | | Width of Fuel Gates (inches) | | |
|---|---|---|---|---|---|---|---|
| | | #1 | #2 | #3 | #1 | #2 | #3 |
| 1 | 0.400 | 0.188 | 0.175 | 0.172 | 0.105 | 0.102 | 0.094 |
| 2 | 0.500 | 0.165 | 0.167 | 0.167 | 0.122 | 0.119 | 0.103 |
| 3 | 0.500 | 0.240 | 0.235 | 0.232 | 0.143 | 0.142 | 0.127 |
| 4 | 0.550 | 0.260 | 0.260 | 0.260 | 0.160 | 0.161 | 0.145 |
| 5 | 0.600 | 0.277 | 0.277 | 0.277 | 0.299 | 0.230 | 0.152 |
| 6 | 0.600 | 0.590 | 0.580 | 0.588 | 0.560 | 0.555 | 0.550 |

Figure 45:
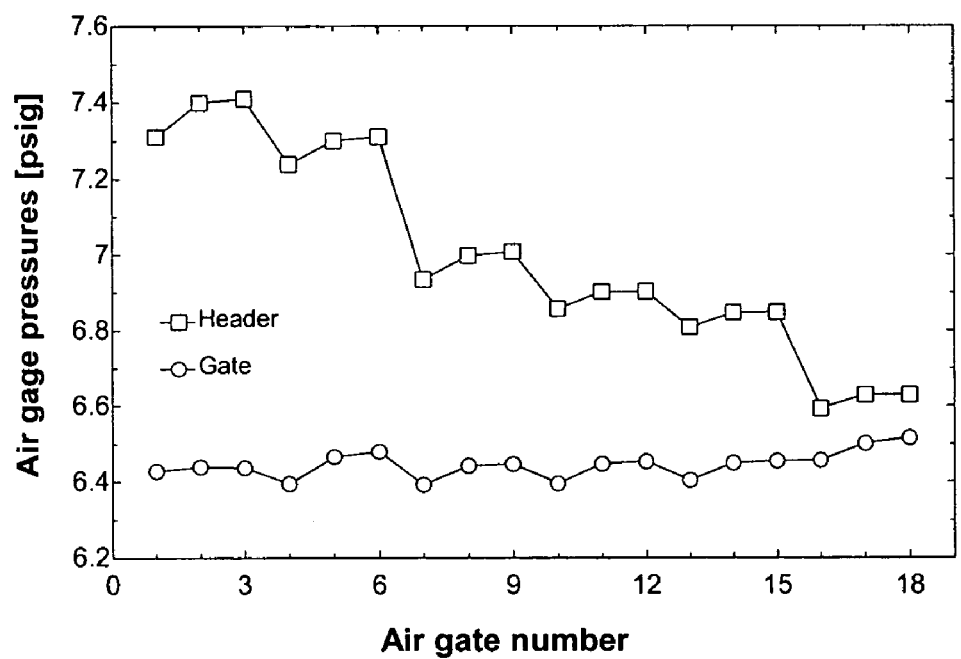
FIG. 45 shows predicted static gage pressures in an air M2M manifold for the header and in the gate plotted versus fuel gate number from Example 2. Air gate number 1 corresponds to air sub-manifold 1, gate 1, while fuel gate number 18 corresponds to sub-manifold 6, gate 3.
Figure 46:
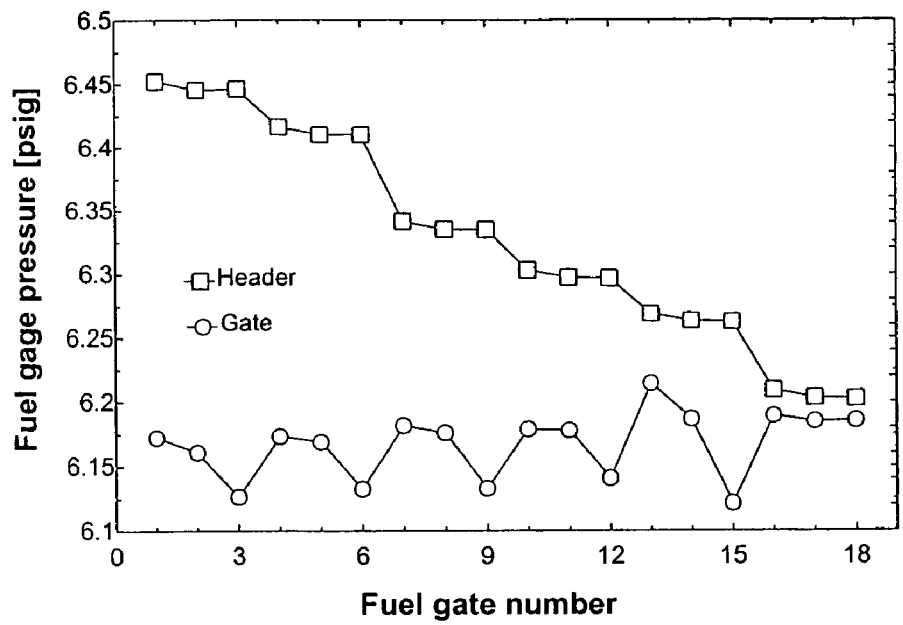
FIG. 46 shows predicted static gage pressures in an fuel M2M manifold for the header and in the gate plotted versus fuel gate number from Example 2. Fuel gate number 1 corresponds to fuel sub-manifold 1, gate 1, while fuel gate number 18 corresponds to sub-manifold 6, gate 3.

As fluid leaves the sub-manifold's distribution zone into the gates, the constant width of the section leads to a static pressure increase to compensate the loss of dynamic pressure, minus whatever frictional losses occur in that zone. With each gate, the static pressure has the potential to increase or stay steady in this high momentum (dynamic pressure) flow, but the turning losses aren't constant over the manifold. The use of gate widths, such as in Table 1, allow us to tailor the local pressures in the device for better flow distribution. In general, decreasing the gate width with increasing gate number in a sub-manifold overcomes the momentum compensation factors in the header. FIGS. 45 and 46 show the model results for the header and gate static pressures plotted versus the gate number (18 total per manifold) for air and fuel respectively. The lower number gates add additional back pressure to compensate for shorter upstream manifold lengths. The use of the gates achieves an even pressure at the gates across the module, equalizing the pressure drop driving force to the exhaust outlet at 0.25 psig. The DPR3 ratios for both fuel and air manifolds are high for gates one through three in the first sub-manifold, but the average value is about 0.5 because the turning losses decrease as the sub-manifold number increases.

Figure 47:
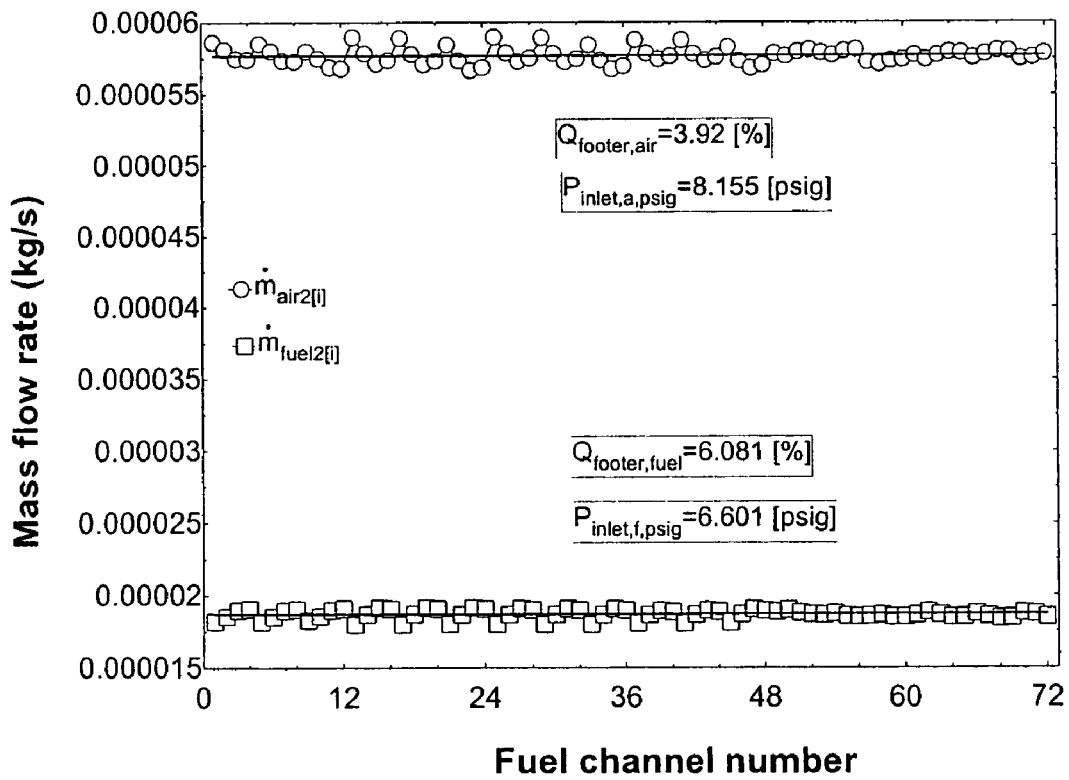
FIG. 47 shows predicted channel mass flow rates for the air and fuel channels plotted versus fuel channel number for Example 2. Fuel channel 1 is channel 1 of sub-manifold 1 and fuel channel 72 is channel 12 of sub-manifold 6.

Results of the coupled combustion manifold are seen in FIG. 47, showing the model predictions of the 72 channel flow rates for air and fuel plotted versus the fuel channel number. The overall results are listed below.

Total air M2M mass flow rate: 14.96 kilograms per hour

Total fuel M2M mass flow rate: 4.84 kilograms per hour (Natural gas and air)

Total air M2M quality index factor: 3.9%

Total fuel M2M quality index factor: 6.1%

Air M2M sub-manifold to sub-manifold quality index factor: 0.2%

Fuel M2M sub-manifold to sub-manifold quality index factor: 0.5%

Inlet air M2M pressure (including turning loss from macro manifold): 8.16 psig

Inlet fuel M2M pressure (including turning loss from macro manifold): 6.61 psig

Example 3

This example is a calculated example based on a sub-manifold that has the following features: L-manifold header, like that described; constant width, height of M2M manifold; 3 "gates", each serving four connecting channels downstream of the distribution section; and high momentum flow (Entrance Mo=0.7>>0.05). The conditions are: an outlet pressure of 1 atm (101325 Pa); air flow of 38.22 SLPM; and 20° C.

The header M2M manifold dimensions are:
 0.041" height, made from a 0.017" and a 0.023" shims and a 0.001" tall gasket
 0.400" wide for the entire manifold ($W_m$)
 $A_M = 1.04 \times 10^{-5}$ m$^2$
 Lengths:
  From macro manifold connection to first gate: 1.250" ($=L_{u,1}$)
  From macro manifold connection to end of the manifold 3.700"
  Lengths for friction losses:
   $L_{c,1}=0.270"$
   $L_{c,2}=0.250"$
   $L_{c,3}=0.245"$
   $L_{u,1}=1.250"$
   $L_{u,2}=0.680"$
   $L_{u,3}=0.692"$
Gate and distribution section dimensions:
Center position of gates from macro manifold:
 $1^{st}$: 1.410"
 $2^{nd}$: 2.350"
 $3^{rd}$: 3.290"
Gate channel height: 0.024"
Length of gate opening in flow direction: 0.060"
Gate widths:
 $1^{st}$: 0.270" ($A_{c,1}=0.0000041$ m$^2$)
 $2^{nd}$: 0.250" ($A_{c,2}=0.0000039$ m$^2$)
 $3^{rd}$: 0.245" ($A_{c,3}=0.0000038$ m$^2$)
Dimensions of each gate downstream distribution section:
 Length: 0.500"
 Height: 0.040" total −0.017" is in the open "picture frame" shim
 Width: 0.820"
Connection to downstream connecting channels
 Through the 0.024" wide channel
 0.060" total length to connecting channel Connecting channel dimensions
Twelve channels, 0.160" wide
Four channels per gate, each separated by 0.060" wide ribs (3 per gate)
Two 0.120" wide ribs separating the channels (2 total)
2.700" wide connecting channel matrix
Heights and widths
    For 1.000" downstream of the gate distribution section
        0.041" channel height
        $A_{cc}=0.0000042$ m$^2$
    For the last 11.500" of the channel
        0.018" channel height
        $A_{cc}=0.0000018$ m$^2$
The channel flows end abruptly, exiting out to ambient pressure.

Equations:

Same as described in the Discussion section, but with the following additions to the downstream resistance. The gate distribution section has a resistance term for each of the four downstream channels, dependent upon gate Reynolds number. The gate has a mass flow rate continuity equation to distribute the flows. The connecting channel pressure drop has two major resistances: friction losses for the 1.000" long section downstream of the gate, friction losses for the last 11.500" of the channel; and the sudden contraction losses and the exit losses are ignored.

Figure 48:
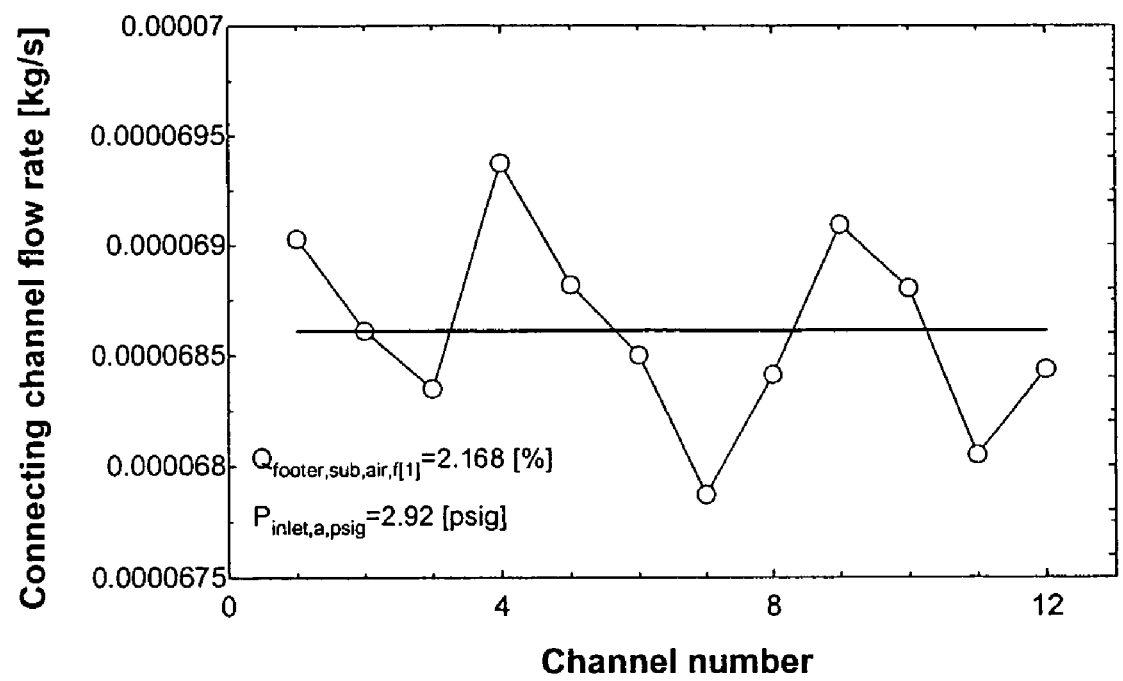
FIG. 48 shows mass flow rate distribution for the air manifold test piece of Example 3 plotted versus channel number. Channel 1 is closest to the manifold entrance while channel 12 is the farthest away.
Figure 49:
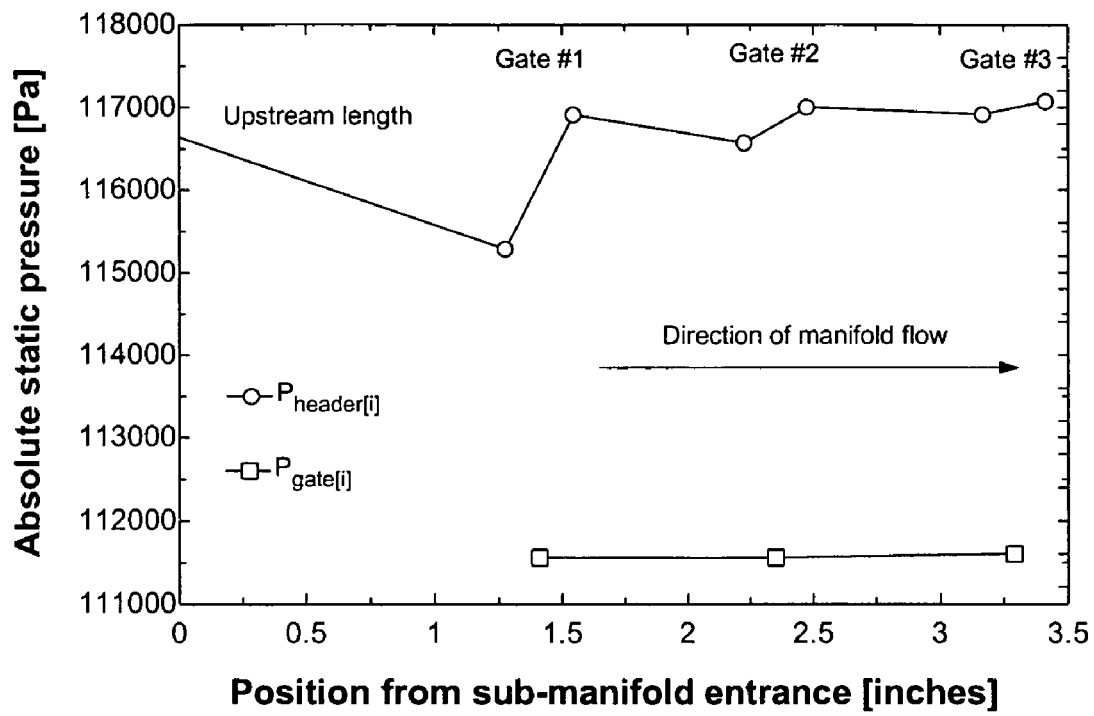
FIG. 49 is a plot of static pressure as a function of distance of the channel position from the submanifold entrance.

Results:

FIG. 48 shows the mass flow rates in each connecting channel. The predicted quality index factor $Q_1$ is 2.2%. FIG. 49 shows the predicted pressures in the header and the gates across the manifold. The header pressure profile shows the effect of frictional losses over the first 1.25" inches prior to the first gate, with the Reynolds number in the 8000 range (turbulent). The static pressures climb from the beginning of each gate (lower position value) to the end of the gate, despite friction losses. There are friction losses in the header between gates. The use of decreasing gates cross-sectional area in the direction of flow in the header to compensate for the changes in the header static pressure leads to the good distribution from gate to gate. FIG. 49 shows the pressure profile from Example 3 in the header (round dots) and in the gates (squares) plotted versus position from the inlet of the channel.

The gate turning losses are needed to compensate for the pressure profile created by the changes in flow regime. At the first gate the upstream and downstream Reynolds numbers are 8054 and 5386, respectively, well into turbulent flow regimes. The static pressure increase for the first gate in that section is dramatic, 1600 Pa, making up for the friction losses of the channel up to that point. The second gate has upstream and downstream Reynolds numbers of 5386 and 2699, which start in the turbulent range and drop into the transition range. The pressure gain at the second gate is 400 Pa, a substantial drop from the turbulent case. The third gate has upstream and downstream Reynolds numbers of 2699 and 0, which implies the flow starts in the transition flow range and end in laminar range. The pressure gain at the third gate is on the order of 160 Pa, a substantial drop from the second and first gate's static pressure gains of 400 Pa and 1600 Pa, respectively. This example shows that the effect of momentum compensation on the static pressure profile, and in turn illustrates the need to use turning losses to equalize the pressures across the gates. It also illustrates the high flow rates needed to supply millisecond contact time microchannel reactors can lead to very large Reynolds numbers in the M2M manifold when multiple channels must have high overall flow rates that are in the transition and turbulent ranges. These flow regimes have large head values that give rise to substantial momentum compensation and turning loss terms, as this example shows.

Example 4

M2M Patent—Manifold Performance Comparison

In the following discussion, inventive manifolds are compared with designs of the type disclosed by Golbig et al. in WO 03/043730 A1. The manifold options for a L-manifold with a 72 connecting channel matrix were evaluated using a manifold design tool. The three options were as follows: a manifold split into sub-manifolds with gate connecting channel interfaces, a grate design with one large manifold width and constant channel opening and channel matrix dimensions, and a grate design with one large manifold width and channel widths varying from channel to channel (like those discussed in Golbig et al). All the designs had the same inlet mass flow rate and target mass flux rate distribution (akin to contact time). Some results follow:

The sub-manifold design using variable width gates for sub-manifold flow distribution had the lowest quality index factor ($Q_1=6.03\%$), but had a relatively high manifold pressure drop over inlet head ratio (8.8) due to the gate M2M turning losses. The pressure drop was estimated at 3.25 psid from the macro manifold to the outlet. The final width of the manifold was 3.45", with 3.15" actual open space. It is possible to further improve this design for lower quality index factors.

The option of a grate design with a single M2M manifold and constant connecting channel width dimensions had poor quality index factors for most gate widths, obtaining values of $Q_1=41.08\%$ to 29.03% for M2M widths of 2.5 inches to 3.5 inches.

The third option was a grate design with a single M2M manifold with the option of varying the connecting channel width as that used by Golbig et al. This design was not able to match the low quality index factor of the sub-manifold and gate design. It reached a low of $Q_2=12.8\%$ with a 2.00" wide manifold, which greatly lowered the manifold pressure drop to head ratio down to 3.9. Large changes in channel width are needed to obtain reasonable control, i.e. large values of Ra were needed to obtain good flow distribution.

Common Manifold Features

There are 72 channels, whose total width must add up to 11.52" ($=72\times0.160$") The walls (i.e ribs) in between the channels make the total manifold length add up to 16.800". The matrix channels are 0.017" in height, while the manifold-to-connecting channel opening is 0.023" tall. In between these two zones there is a short length 0.040" tall. There is a 1" long zone upstream of the manifold and all systems have a common macro-to-M2M turning loss. All manifold sections have a total height of 0.040" (1.016 mm). The grate systems assume a 0.023" zone (shim) lies beneath the 0.040" tall manifold section, with the grate extending across the entire M2M manifold width. A total of 0.00494 kg/second of air was sent through all three systems at 20° C., with an outlet pressure of 101.325 kPa.

Sub-manifolds with Gate System

The sub-manifold system dimensions, both M2M channel widths and gate widths, are given in Table 1.

TABLE 1

The sub-manifold and gate design dimensions.

| Sub-manifold number | M2M channel width (in) | Width of Gates (inches) | | |
|---|---|---|---|---|
| | | #1 | #2 | #3 |
| 1 | 0.400 | 0.270 | 0.250 | 0.245 |
| 2 | 0.500 | 0.272 | 0.255 | 0.251 |
| 3 | 0.500 | 0.352 | 0.330 | 0.325 |
| 4 | 0.550 | 0.390 | 0.363 | 0.358 |
| 5 | 0.600 | 0.368 | 0.349 | 0.342 |
| 6 | 0.600 | 0.580 | 0.440 | 0.430 |

The resulting manifold parameters for this case are: The height of the M2M channel ($h_{M2M}$) is 1.016 mm. The total length of the manifold is 16.800" in total, and each $L_{M2M}$ value is 2.700" for each sub-manifold. The ratio of the length of the channels between the end of the gate and the 11.5 inch long section to $L_{M2M}$ is 0.23-1.66, based upon sub-manifold lengths. The sub-manifold Mo values ranged from 0.70 to 0.77. The $Q_1$ values for the connecting channel and sub-manifolds are 6.0% and 0.3%, respectively. The Ra value for the system's gates are 2.36 and the manifold's pressure drop is 8.83 times its inlet head.

The Grate with Constant Channel Widths

Performance was calculated with all channel widths set to 0.160 inch. The results are shown in Table 2. The table shows improvement in the quality index factor with increasing channel width, but the overall Q factors are very large. The major driving force for the poor distribution is the turning losses from the M2M manifold to the channels. These turning loss values are large at the entrance of the manifold due to the large flow rates seen there, adding substantial flow resistance to these channels. This in turn causes flow to skew to the channels at the end of the manifold.

TABLE 2

Constant channel width results for various manifold widths

| Manifold Width (inches) | Quality index factor Q (%) | Manifold pressure drop Over inlet head ratio | Mo value |
|---|---|---|---|
| 2.50 | 41.08 | 5.886 | 0.141 |
| 2.75 | 37.95 | 5.983 | 0.137 |
| 3.00 | 34.82 | 6.064 | 0.134 |
| 3.15 | 33.12 | 6.102 | 0.132 |
| 3.25 | 31.85 | 6.131 | 0.131 |
| 3.50 | 29.03 | 6.191 | 0.128 |

Grate Design with Channel Widths Varying from Channel to Channel

Channel widths distribution added up to a total width of 11.52 inches of total channel width. Basing the channel width on channel number i $$\text{Width}[i] = M + L \left[ \frac{|i - 36.5|}{36.5 - 1} \right]^B \quad (1)$$

where M is the median channel width value, L [inches] is the offset from the medium width, i is the channel number, and B is the power factor for changing the channel distribution. L is positive for $i \leq 36$ and negative for $i > 36$. This equation (11) allows the distribution to be varied from linear to various curves from the median value of 0.160".

Figure 50:
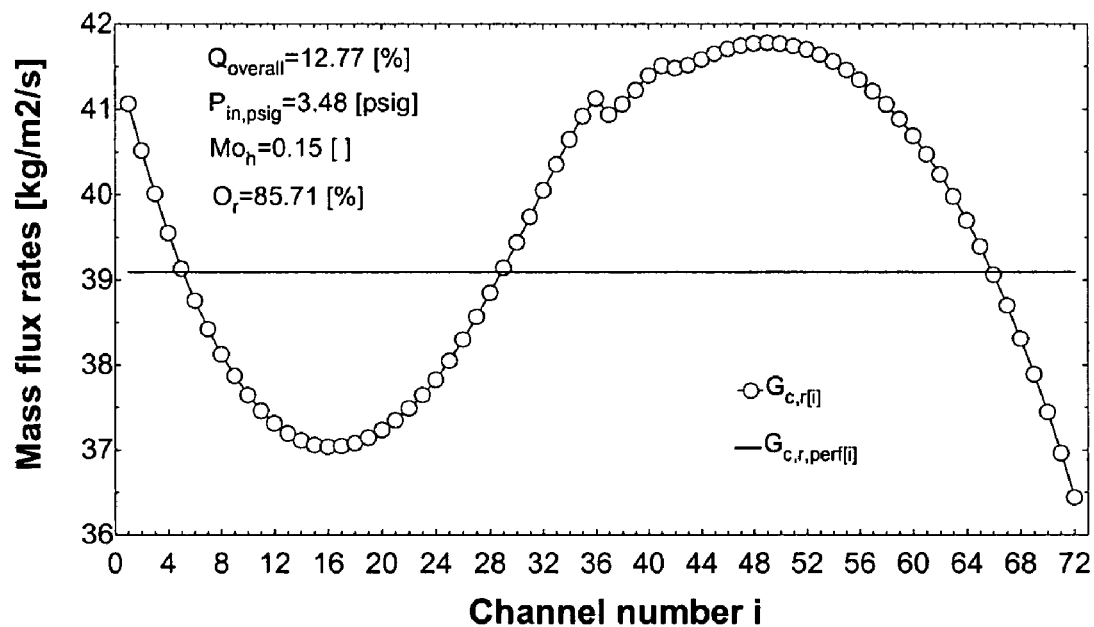
FIG. 50 illustrates channel flow distribution from Example 4 for a 2.00" wide M2M channel with M=0.160", L=0.120" and B=0.5.

The results are shown in Table 3 for various M2M channel widths. An interesting trend appears—as the M2M channel width decreases, better control of the streams is obtained, up to a minimum value of about 2.00". This is due to the larger connection to manifold cross-sectional area ratios (connection openings to manifold) seen at thinner M2M manifold widths. As the connection to manifold cross-sectional area ratio increases, the turning losses decrease in pressure drop. That coupled with the relative decrease in connecting channel matrix flow resistance as the channels approach parallel plates for a set channel height, the net effect is less resistance to flow for the first channels in the system. FIG. 50 shows the mass flux rate distribution versus channel position in the manifold for the best case at 2.0" wide. For smaller M2M widths the momentum compensation static pressure increases eroded the control that the changing width provided.

TABLE 3

Varying channel width results

| M2M Manifold Width (inches) | M (inches) | L (inches) | B | Quality Index Factor $Q_2$ (%) | Mo | Manifold Pressure Drop Over Inlet head ratio | Ratio of widest to thinnest channels, Ra |
|---|---|---|---|---|---|---|---|
| 1.75 | 0.160 | 0.100 | 0.50 | 16.83 | 0.156 | 3.7 | 4.3 |
| 2.00 | 0.160 | 0.120 | 0.50 | 12.77 | 0.150 | 3.9 | 7.0 |
| 2.25 | 0.160 | 0.120 | 0.50 | 14.81 | 0.145 | 4.2 | 7.0 |
| 2.50 | 0.160 | 0.120 | 0.75 | 17.35 | 0.141 | 4.5 | 7.0 |
| 2.75 | 0.160 | 0.120 | 0.75 | 18.79 | 0.137 | 4.7 | 7.0 |
| 3.00 | 0.160 | 0.120 | 0.75 | 19.15 | 0.134 | 4.9 | 7.0 |
| 3.15 | 0.160 | 0.120 | 0.75 | 18.73 | 0.132 | 5.0 | 7.0 |

The channel width distribution shown in the Ra ratio was high for all of the cases. To get a good distribution with changing channels widths, you would need a large change in channel width. This may not be feasible for all processing cases or for fabrication of large numbers of these manifolds.

In summary, the quality index factors, Ra and Mo ratios for the three cases discussed above are listed in Table 4.

TABLE 4

Summary of case comparison for the 72 channel L-manifold

| Case | Connecting channel quality index factor (%) | Ra ratio | Mo ratio |
|---|---|---|---|
| Sub-manifolds with varying gates widths and constant connecting channel widths | $Q_1$ = 6.0% | 2.4 | 0.74 |
| Single grate manifold with constant connecting channel widths | $Q_1$ = 29.0% | 1.0 | 0.13 |
| Single grate manifold with varying connecting channel widths | $Q_2$ = 12.8% | 7.0 | 0.15 |

Example 5

For a variable width connecting channel M2M manifold, what is the relationship between the connecting channel quality index factor Q2 and the Ra and pressure drop ratio? Based on the variable channel width design shown in Golbig, WO 03/043730, Quality index factor was calculated as a function of the ratio of the area of the largest to the smallest channel (Ra) and two values of manifold pressure drop ratio discussed in the glossary section. While Example 4 was based upon a fixed connecting channel length, the results shown below reflect changing length which in turn changes the connecting channel back pressure. The results show the effect of channel width change upon flow distribution as a function of channel back pressure.

Figure 51:
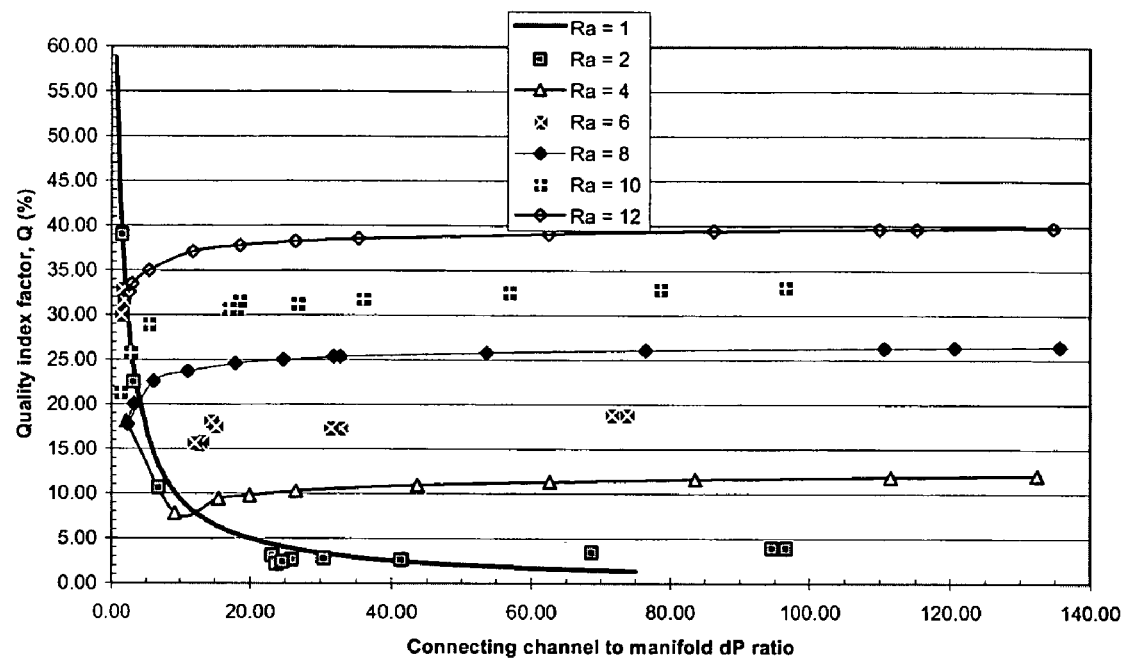
FIG. 51 illustrates minimum quality index factors plotted versus connecting channel to manifold pressure drop ratio (PDR$_2$) as explained in Example 5.

FIG. 51 shows the minimum quality index factors, based upon the dimensions discussed in Example 4, plotted versus connecting channel pressure drop over manifold pressure drop.

The Ra=1 curve shows constant channel width Q2 values, and predictably you can achieve small $Q_2$ factors for this system as the pressure drop in the channel increases. If the connecting channel pressure drop is large enough, special manifold designs may not be necessary.

As the Ra value increases from unity the Q factors for the pressure drop ratio increasing from zero fall to a minimum below the Ra=1 value. Thus, for a given back pressure, there may be a non unity Ra value that gives a better Q factor than the Ra=1 value However, as values of the pressure drop ratio increase, the $Q_2$ curves of constant Ra cross over the Ra=1 curve and to asymptote to values higher than the Ra=1 values. However, if the lengths of the channels of varying width get long enough, a maldistribution will occur due to differing resistance in the channel flow resistance.

Figure 52:
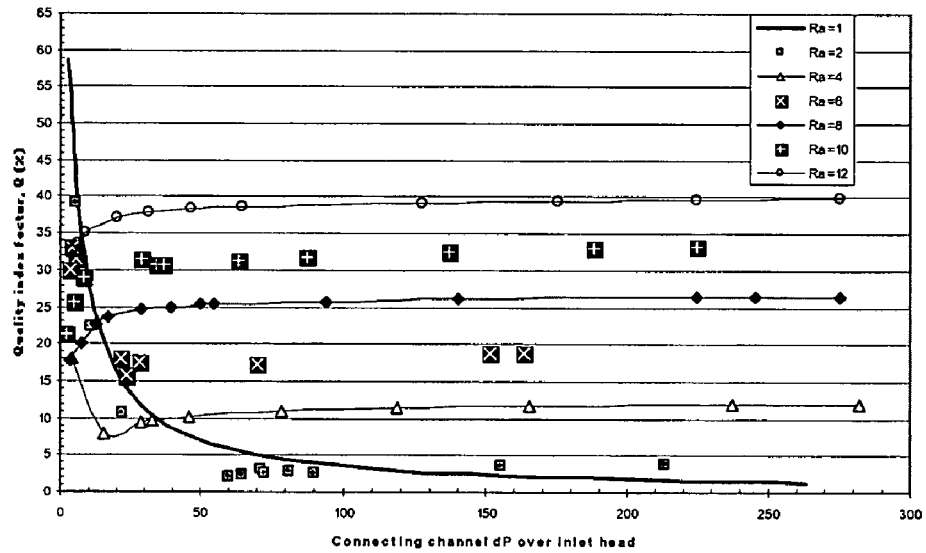
FIG. 52 illustrates minimum quality index factors plotted versus connecting channel to manifold pressure drop ratio (PDR$_1$) as explained in Example 5.

FIG. 52 shows the same quality index factor data plotted versus the ratio of connecting channel pressure drop over the manifold inlet head, and while the curves change slightly, the general trends stay the same. The $Q_2$ surface in FIG. 2 based upon Ra and $DPR_1$ is made by the constant Ra values correlations based on the curves in FIG. 52 and Lagrangian interpolation between these values to get a representative curve of best cases $Q_c$:

$$Q_c(Ra, DPR_1) = E1 + E2 + E4 + E6 + E8 + E10 + E12$$

where $$E1 = \frac{112.9 + 1.261 DPR_1}{1 + 0.3078 DPR_1 + 0.00353 DPR_1^2}$$

$$\left[ \frac{(Ra-2)(Ra-4)(Ra-6)(Ra-8)(Ra-10)(Ra-12)}{(1-2)(1-4)(1-6)(1-8)(1-10)(1-12)} \right]$$

$$E2 = \frac{91.73 - 1.571 DPR_1 + 0.01701 DPR_1^2}{1 + 0.2038 DPR_1 + 0.00193 DPR_1^2}$$

$$\left[ \frac{(Ra-1)(Ra-4)(Ra-6)(Ra-8)(Ra-10)(Ra-12)}{(2-1)(2-4)(2-6)(2-8)(2-10)(2-12)} \right]$$

$$E4 = \frac{24.27 - 4.943 DPR_1 + 0.3982 DPR_1^2}{1 - 0.2395 DPR_1 + 0.03442 DPR_1^2 - 0.000006657 DPR_1^3}$$

$$\left[ \frac{(Ra-1)(Ra-2)(Ra-6)(Ra-8)(Ra-10)(Ra-12)}{(4-1)(4-2)(4-6)(4-8)(4-10)(4-12)} \right]$$

$$E6 = \frac{29.23 - 2.731 DPR_1 + 0.09734 DPR_1^2}{1 - 0.1124 DPR_1 + 0.005045 DPR_1^2}$$

$$\left[ \frac{(Ra-1)(Ra-2)(Ra-4)(Ra-8)(Ra-10)(Ra-12)}{(6-1)(6-2)(6-4)(6-8)(6-10)(6-12)} \right]$$

$$E8 = \frac{25.98 + 11.26 DPR_1 + 0.02201 DPR_1^2 + 0.5231 DPR_1^3}{1 - 0.8557 DPR_1 + 0.00887 DPR_1^2 + 0.02049 DPR_1^3 - 0.000002866 DPR_1^4} \times$$

-continued $$\left[ \frac{(Ra-1)(Ra-2)(Ra-4)(Ra-6)(Ra-10)(Ra-12)}{(8-1)(8-2)(8-4)(8-6)(8-10)(8-12)} \right]$$

$$E10 = \frac{20.75 - 3.371 DPR_1 + 0.9026 DPR_1^2 + 0.01277 DPR_1^3}{1 - 0.1514 DPR_1 + 0.03173 DPR_1^2 + 0.0003673 DPR_1^3}$$

$$\left[ \frac{(Ra-1)(Ra-2)(Ra-4)(Ra-6)(Ra-8)(Ra-12)}{(10-1)(10-2)(10-4)(10-6)(10-8)(10-12)} \right]$$

$$E12 = \frac{51.67 + 18.94 DPR_1 + 21.57 DPR_1^2 + 21.57 DPR_1^3}{1 + 1.183 DPR_1 + 0.5513 DPR_1^2 - 0.00004359 DPR_1^3}$$

$$\left[ \frac{(Ra-1)(Ra-2)(Ra-4)(Ra-6)(Ra-8)(Ra-10)}{(12-1)(12-2)(12-4)(12-6)(12-8)(12-10)} \right]$$

We claim:

1. A method of passing a fluid through a manifold of a microchannel device, comprising:
   flowing a first fluid stream into a manifold and then through a first channel in a first direction;
   flowing a portion of the first fluid stream to a second channel; and
   flowing a portion of the first fluid stream through the second channel;
   wherein the second channel extends at a nonzero angle relative to the first direction;
   wherein the second channel comprises a microchannel and comprises at least one dividing wall that separates the second channel into at least a first and a second subchannel;
   wherein the first layer and the manifold are each substantially planar; wherein the manifold is substantially contained within the first layer, and wherein the first layer and the manifold are substantially coplanar, and wherein the first channel is disposed in the first layer and flow through the first channel is substantially parallel to the plane of the first layer;
   wherein the first channel and the manifold are about the same height;
   wherein the second layer is substantially planar, and wherein the second channel is disposed in the second layer and flow through the second channel is substantially parallel to the plane of the second layer; and
   wherein the first layer and the second layer are substantially parallel and the nonzero angle refers to an angle within the second layer.

2. The method of claim 1 wherein a plate comprising an opening is disposed between the first and second layers and flow from the first layer passes through the opening into the second layer.

3. The method of claim 2 wherein the first layer comprises multiple adjacent parallel microchannels separated by channel walls; and
   wherein the second layer comprises multiple adjacent parallel microchannels separated by continuous channel walls wherein the continuous channel walls traverse the width of the multiple adjacent parallel microchannels in the first layer.

4. The method of claim 2 wherein the second layer is made from a sheet containing slots.

5. The method of claim 2 wherein the first layer comprises multiple adjacent parallel microchannels separated by channel walls; and
   wherein the second layer comprises multiple adjacent parallel microchannels separated by continuous channel walls;
   wherein a portion of the flow through the first layer passes into the second layer where it is redistributed into the microchannels in the first layer.

6. The method of claim 5 wherein the presence of the second layer tends to equalize flow through the multiple adjacent parallel microchannels in the first layer.

7. The method of claim 5 wherein the multiple adjacent parallel microchannels comprise a crossbar that forces flow into the second layer; and wherein, other than contact with the first layer, the second layer does not have any inlets or outlets.

8. The method of claim 1 wherein the second layer is adjacent to the first layer and the only flow into the second layer is from the first layer.

9. The method of claim 1 wherein the first layer comprises multiple adjacent parallel microchannels separated by channel walls; and wherein the second layer comprises multiple adjacent parallel microchannels separated by continuous channel walls wherein the continuous channel walls traverse the width of the multiple adjacent parallel microchannels in the first layer.

10. The method of claim 1 wherein the second layer is made from a sheet containing slots.

11. The method of claim 1 wherein the first layer comprises multiple adjacent parallel microchannels separated by channel walls; and wherein the second layer comprises multiple adjacent parallel microchannels separated by continuous channel walls;

wherein a portion of the flow through the first layer passes into the second layer where it is redistributed into the microchannels in the first layer.

12. The method of claim 11 wherein the presence of the second layer tends to equalize flow through the multiple adjacent parallel microchannels in the first layer.

13. The method of claim 1 wherein the multiple adjacent parallel microchannels comprise a crossbar that forces flow into the second layer; and wherein, other than contact with the first layer, the second layer does not have any inlets or outlets.

14. The method of claim 1 wherein the second channel comprises a catalyst.

15. The method of claim 1 wherein a chemical reaction occurs in the second channel.

16. The method of claim 15 wherein the chemical reaction comprises a Fischer-Tropsch reaction.

* * * * *